(12) United States Patent
Kwak et al.

(10) Patent No.: US 10,554,461 B2
(45) Date of Patent: Feb. 4, 2020

(54) METHOD FOR TRANSMITTING UPLINK SIGNALS IN WIRELESS COMMUNICATION SYSTEM FOR SUPPORTING SHORT TRANSMISSION TIME INTERVAL, AND DEVICE FOR SUPPORTING SAME

(71) Applicant: LG ELECTRONICS INC., Seoul (KR)

(72) Inventors: Kyuhwan Kwak, Seoul (KR); Daesung Hwang, Seoul (KR); Yunjung Yi, Seoul (KR); Suckchel Yang, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 25 days.

(21) Appl. No.: 16/060,876

(22) PCT Filed: Dec. 9, 2016

(86) PCT No.: PCT/KR2016/014453
§ 371 (c)(1),
(2) Date: Jun. 8, 2018

(87) PCT Pub. No.: WO2017/099524
PCT Pub. Date: Jun. 15, 2017

(65) Prior Publication Data
US 2019/0342135 A1 Nov. 7, 2019

Related U.S. Application Data

(60) Provisional application No. 62/265,435, filed on Dec. 10, 2015, provisional application No. 62/273,448, (Continued)

(51) Int. Cl.
*H04L 27/26* (2006.01)
*H04L 1/18* (2006.01)
*H04L 1/16* (2006.01)
*H04B 1/713* (2011.01)

(52) U.S. Cl.
CPC .......... *H04L 27/2607* (2013.01); *H04B 1/713* (2013.01); *H04L 1/1671* (2013.01);
(Continued)

(58) Field of Classification Search
CPC ... H04L 5/0055; H04L 5/0048; H04L 5/0053; H04L 1/1812; H04W 72/0413
See application file for complete search history.

(56) References Cited

U.S. PATENT DOCUMENTS 9,184,869 B2 11/2015 Han et al.
2012/0057487 A1 3/2012 Ahn et al.
(Continued)

FOREIGN PATENT DOCUMENTS

EP 2187549 A1 5/2010
JP 5089804 B2 12/2012
(Continued)

OTHER PUBLICATIONS

Munda, "LTE Physical Layer : LTE Protocal Stack," LTE Development, Conformance Test, Optimization Certification Course—Amateur Level (3PCA-L1), Jul. 31, 2013, pp. 1-120.
(Continued)

*Primary Examiner* — Jung H Park
(74) *Attorney, Agent, or Firm* — Birch, Stewart, Kolasch & Birch, LLP

(57) ABSTRACT

The present specification relates to a method for transmitting uplink signals in a wireless communication system, the method being performed by a UE and comprising the steps of: receiving, from a base station, information on a cyclic shift (CS) index configuration, which indicates the configuration of an index group for a CS related to uplink signal transmission; determining a CS index for generating a particular uplink signal in the CS index group; generating the particular uplink signal by using the determined CS
(Continued)

index and a base sequence having a particular length; and transmitting the generated particular uplink signal to the base station via an uplink control channel.

9 Claims, 38 Drawing Sheets

Related U.S. Application Data filed on Dec. 31, 2015, provisional application No. 62/292,163, filed on Feb. 5, 2016, provisional application No. 62/308,820, filed on Mar. 15, 2016, provisional application No. 62/316,605, filed on Apr. 1, 2016, provisional application No. 62/335,693, filed on May 13, 2016, provisional application No. 62/405,974, filed on Oct. 9, 2016, provisional application No. 62/420,718, filed on Nov. 11, 2016.

(52) U.S. Cl.
CPC .......... *H04L 1/1812* (2013.01); *H04L 1/1861* (2013.01); *H04B 2201/698* (2013.01)

(56) References Cited

U.S. PATENT DOCUMENTS

| | | |
|---|---|---|
| 2012/0093090 A1 | 4/2012 | Han et al. |
| 2013/0034126 A1 | 2/2013 | Nakao et al. |
| 2013/0058302 A1 | 3/2013 | Kim et al. |
| 2014/0078941 A1 | 3/2014 | Seo et al. |
| 2014/0362804 A1 | 12/2014 | Han et al. |
| 2015/0146604 A1 | 5/2015 | Kim et al. |
| 2016/0065347 A1 | 3/2016 | Nakao et al. |
| 2017/0374658 A1 | 12/2017 | Kim et al. |

FOREIGN PATENT DOCUMENTS

| | | |
|---|---|---|
| KR | 10-1497850 | 3/2015 |
| WO | WO 2011/004948 A1 | 1/2011 |

OTHER PUBLICATIONS

International Search Report (Form PCT/ISA/210), dated Mar. 24, 2017, for International Application No. PCT/KR2016/014450, is attached.
Korean Office Action, dated Jul. 11, 2018, for Korean Application No. 10-2018-7014297, is attached.
Korean Notice of Allowance, dated Mar. 12, 2019, for Korean Application No. 10-2018-7014297, is attached.
"3GPP TSG RAN WG1 Meeting #83", R1-156540, Anaheim, USA, Nov. 15-22, 2015, 6.2.9.2, Intel Corporation, Discussion on TTI Shortening, Discussion, pp. 1-4.
"3GPP TSG-RAN WG1 #83", Tdoc R1-157136, Anaheim, USA, Nov. 16-20, 2015, 6.2.9.2, InterDigital Communications, Support for Short TTIs and Processing Times in LTE, Discussion, Decision, pp. 1-6.

【Fig. 1】
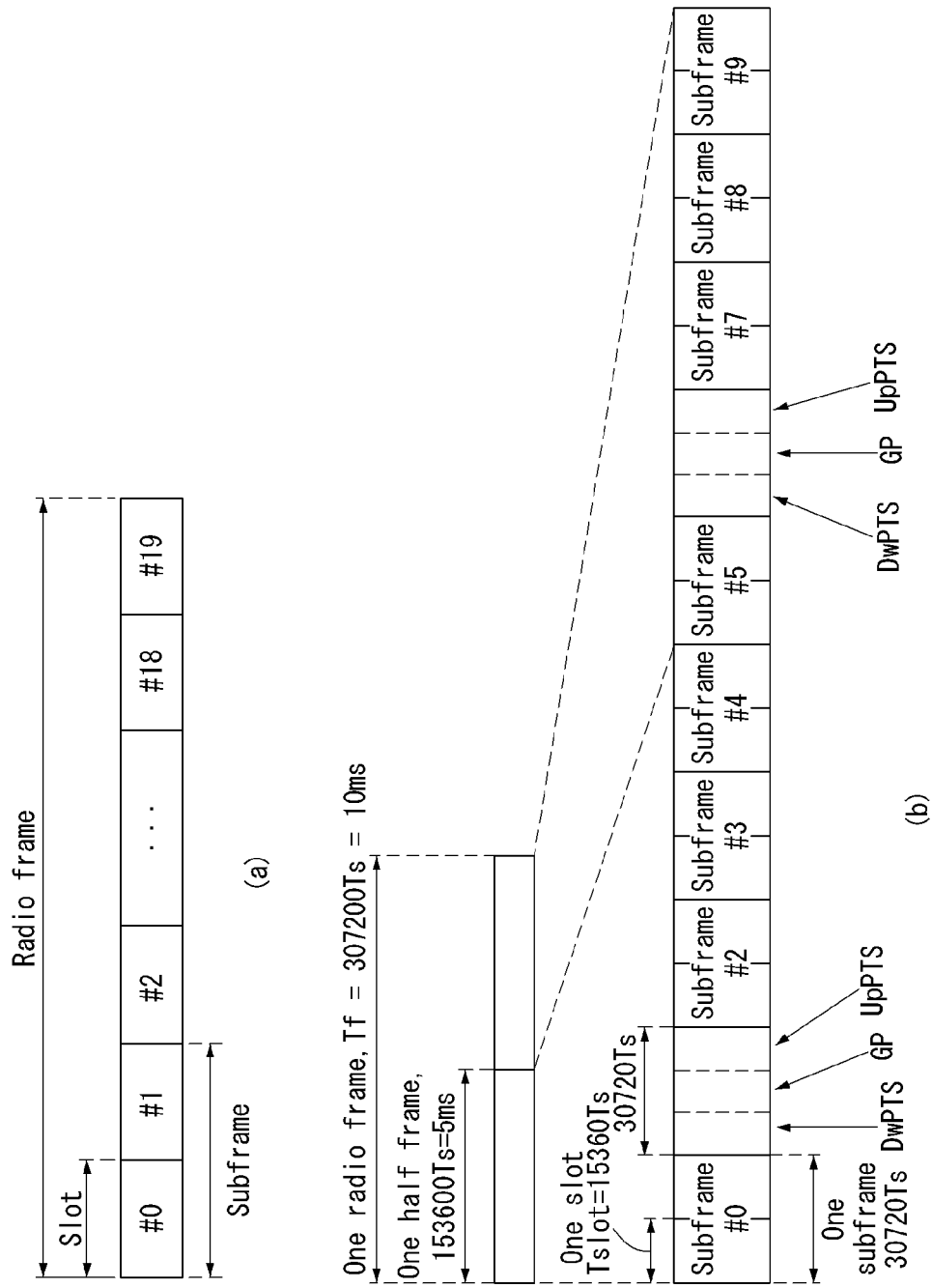

[Fig. 2]
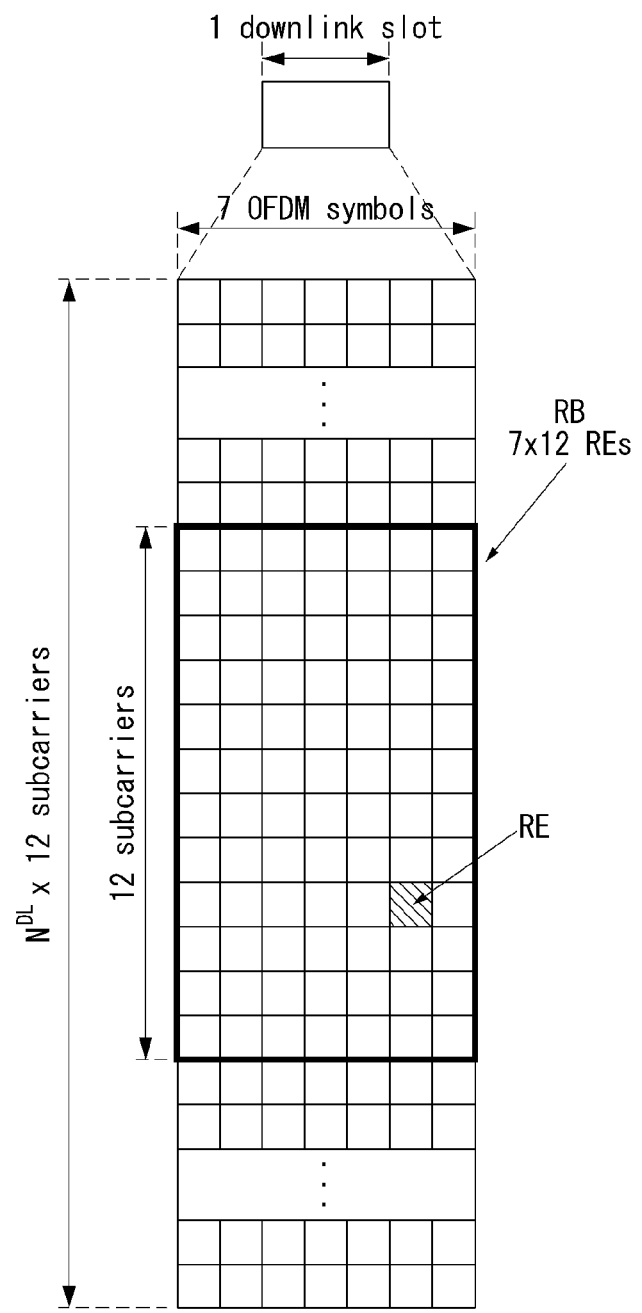

[Fig. 3]
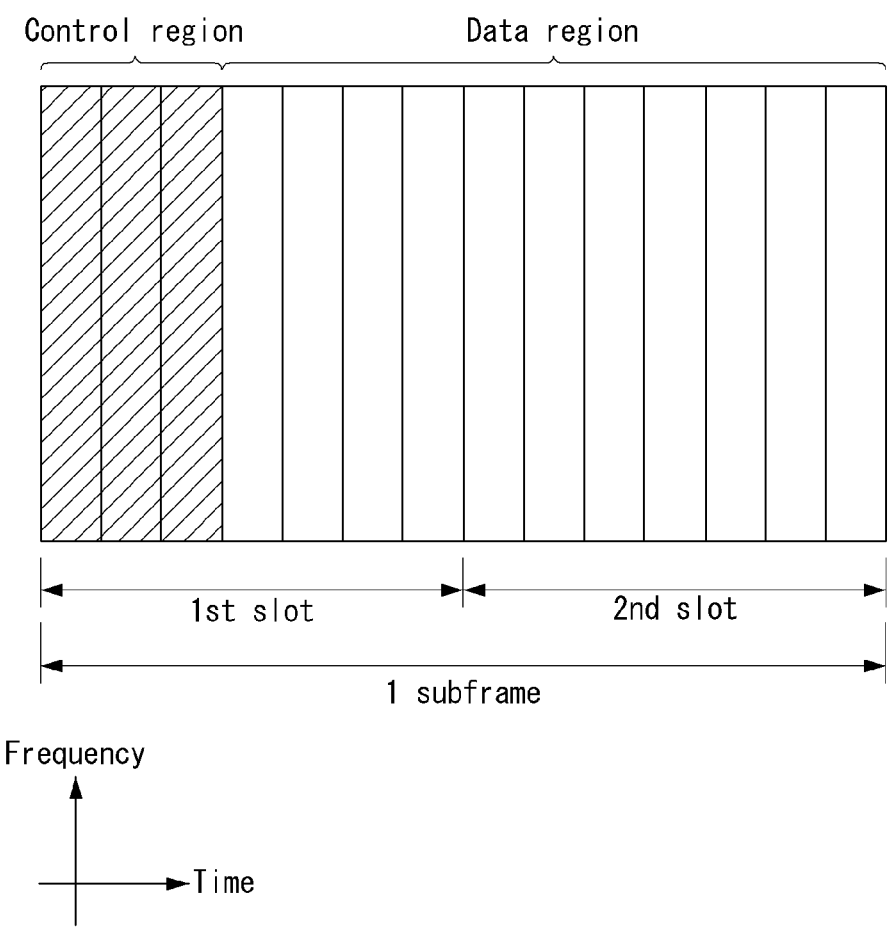

[Fig. 4]
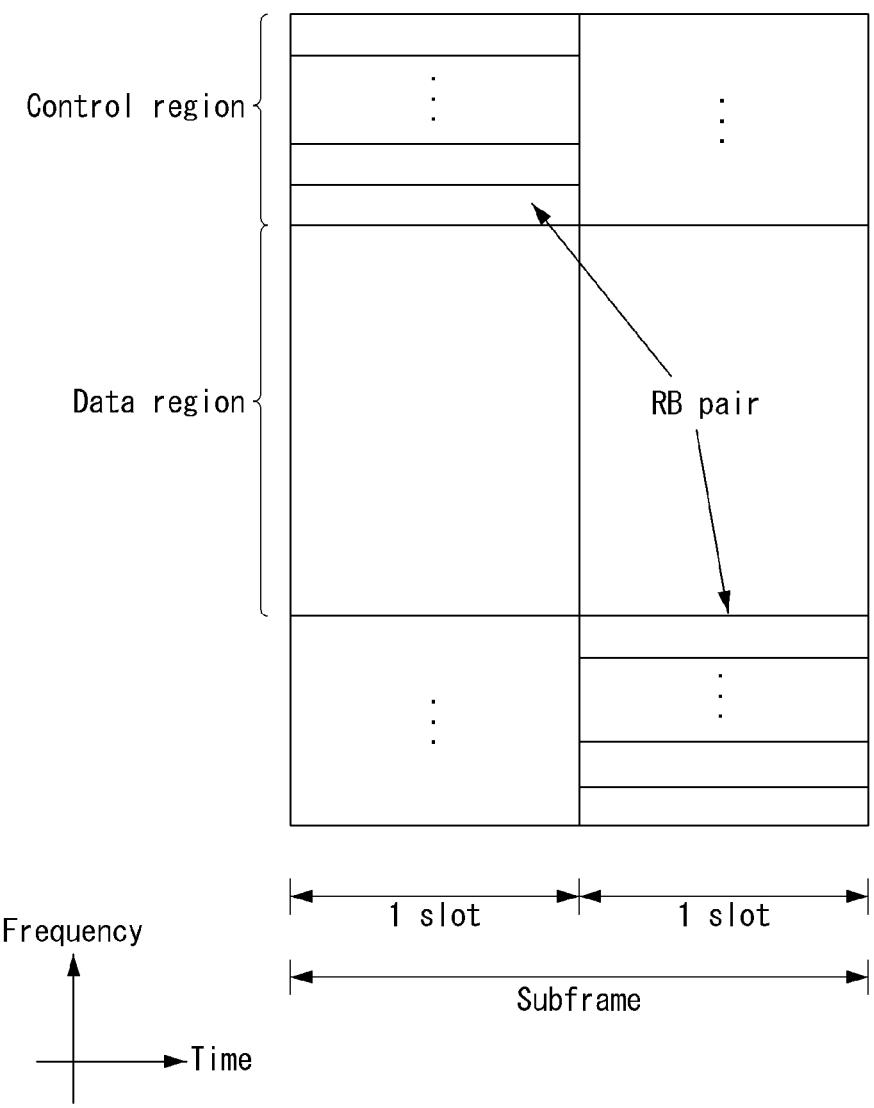

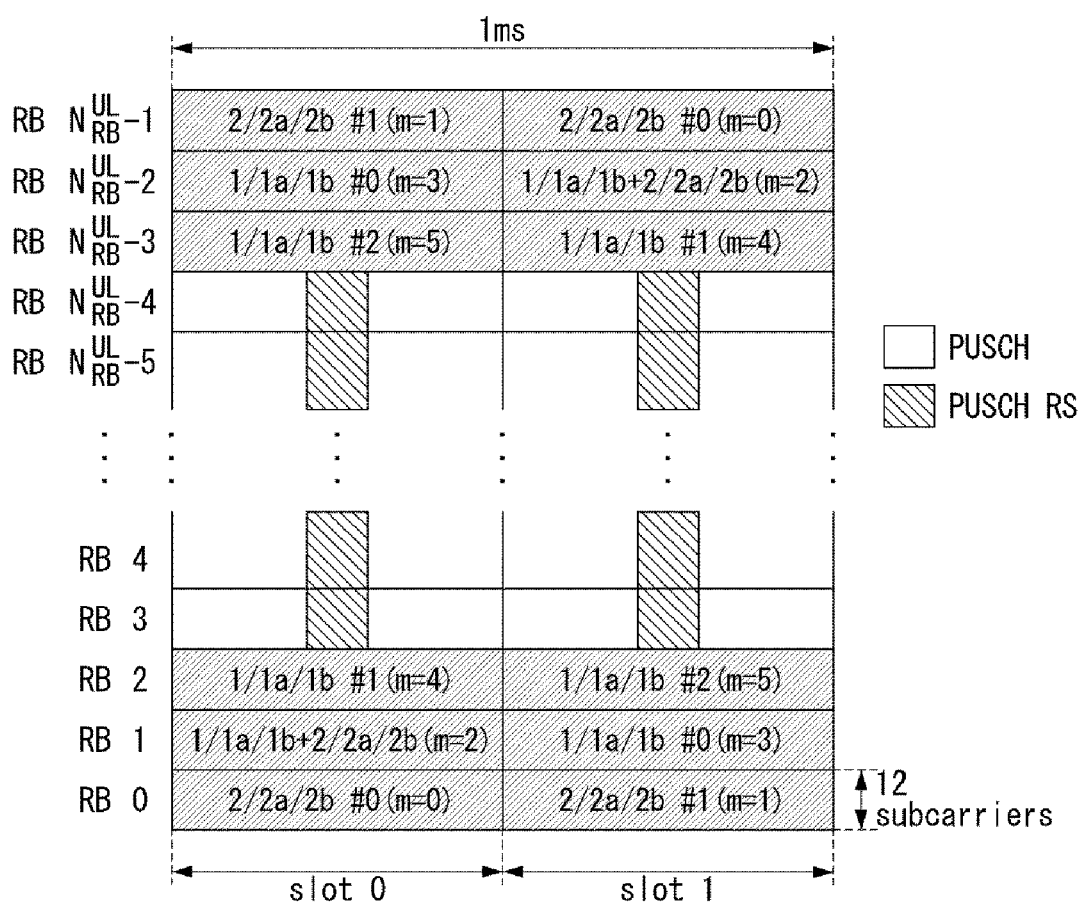
[Fig. 5]

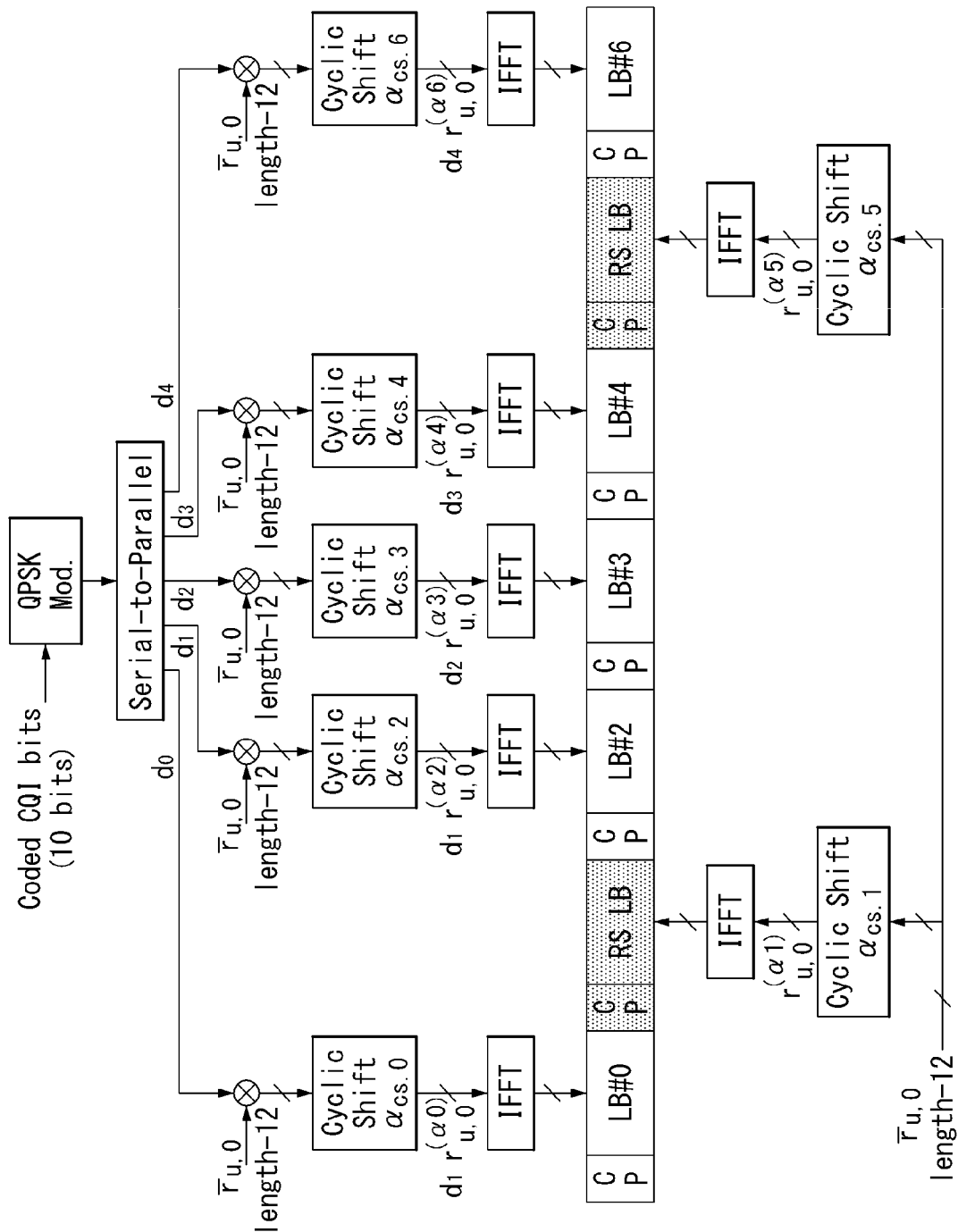
[Fig. 6]

[Fig. 7]
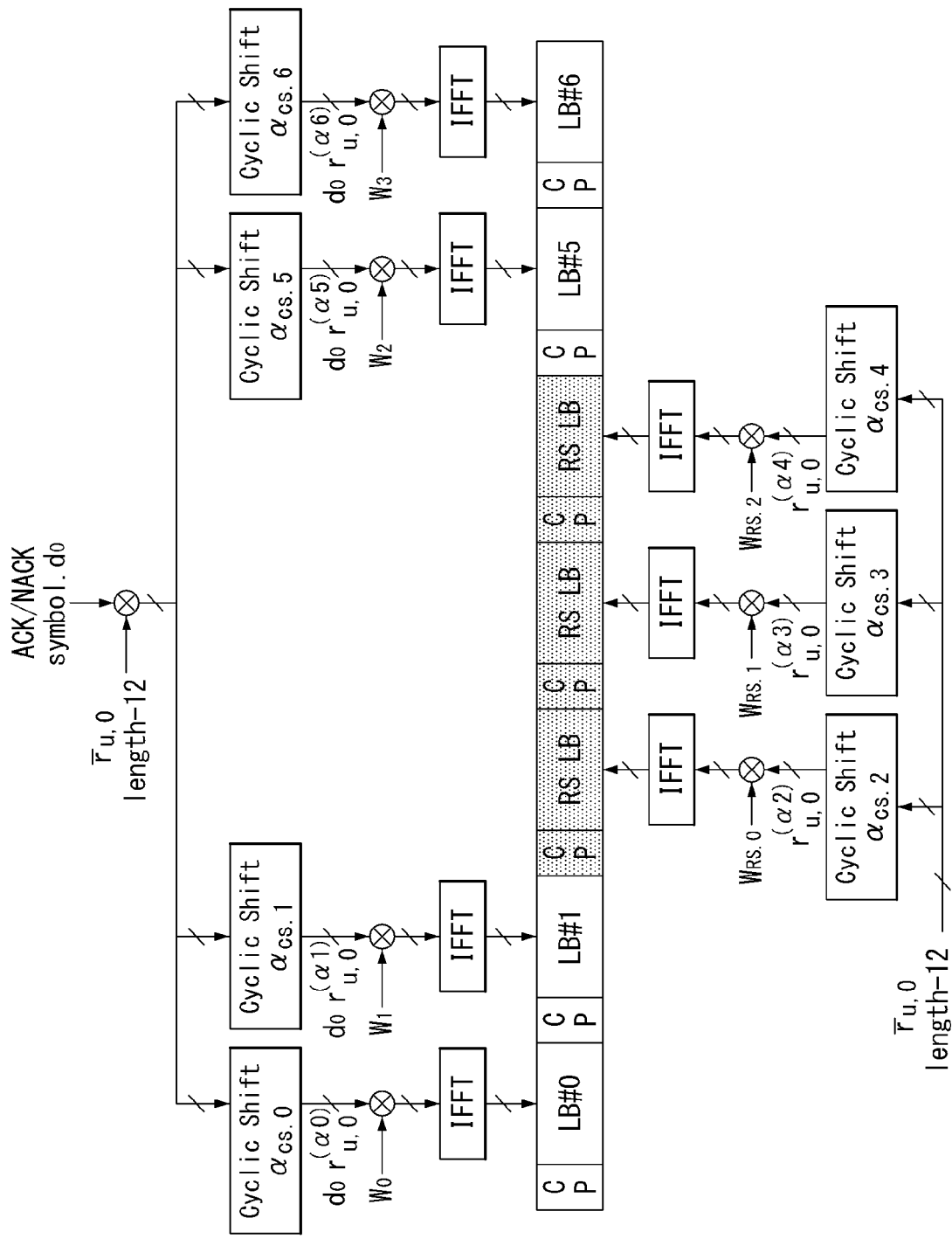

[Fig. 8]
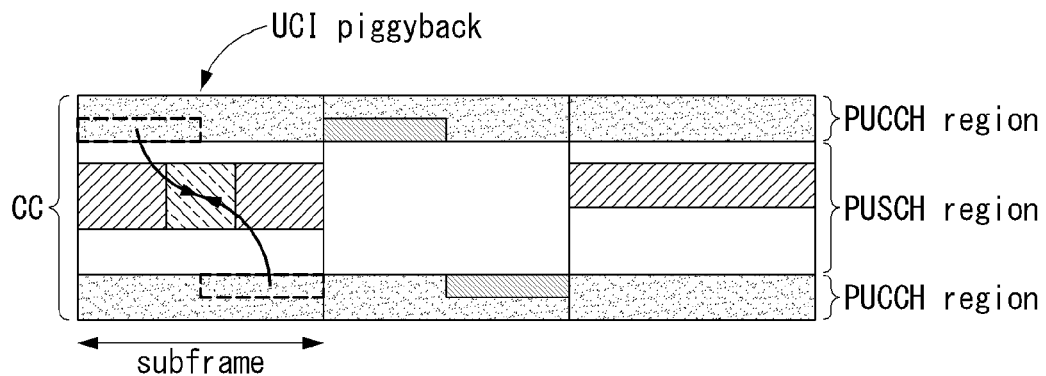
[Fig. 9]
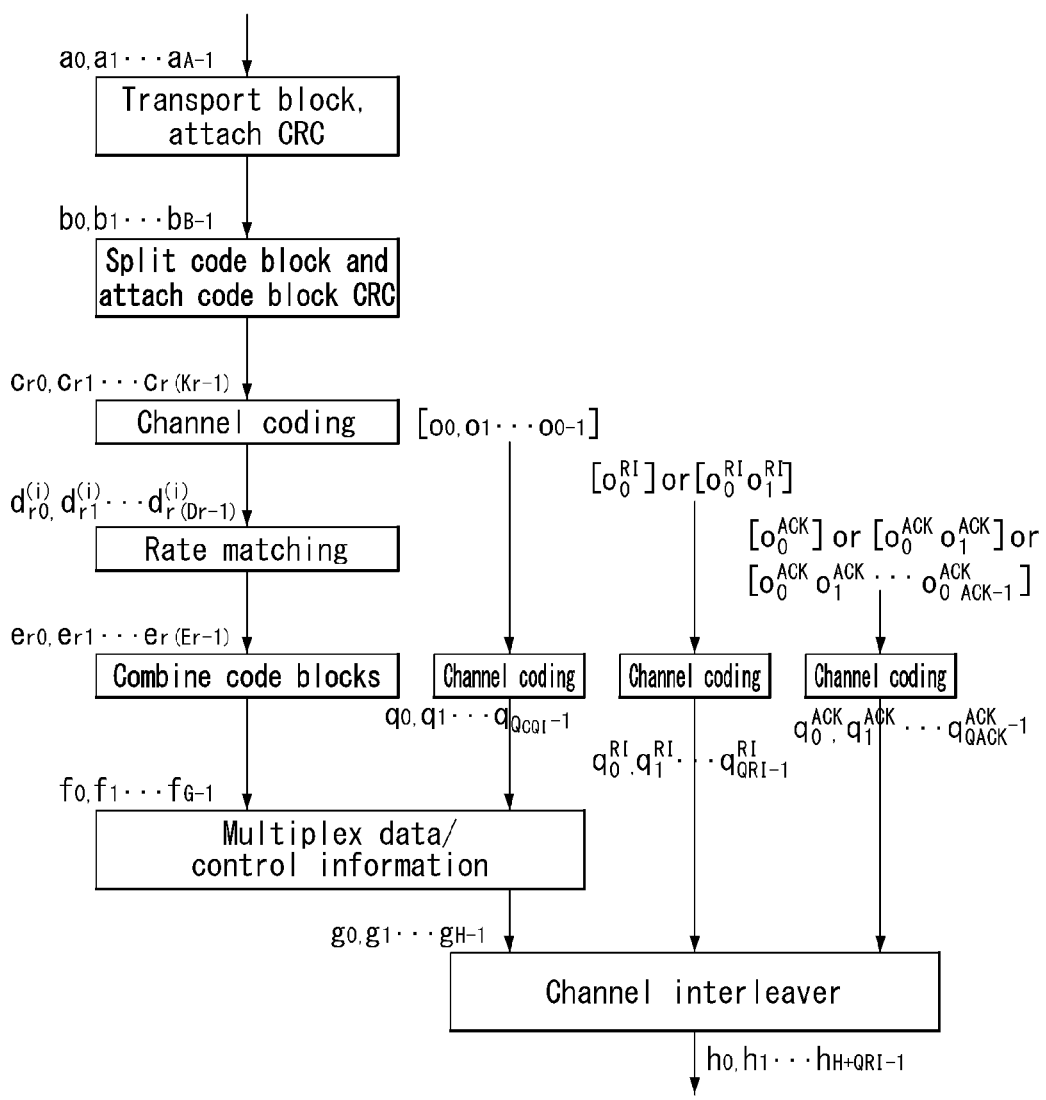

[Fig. 10]
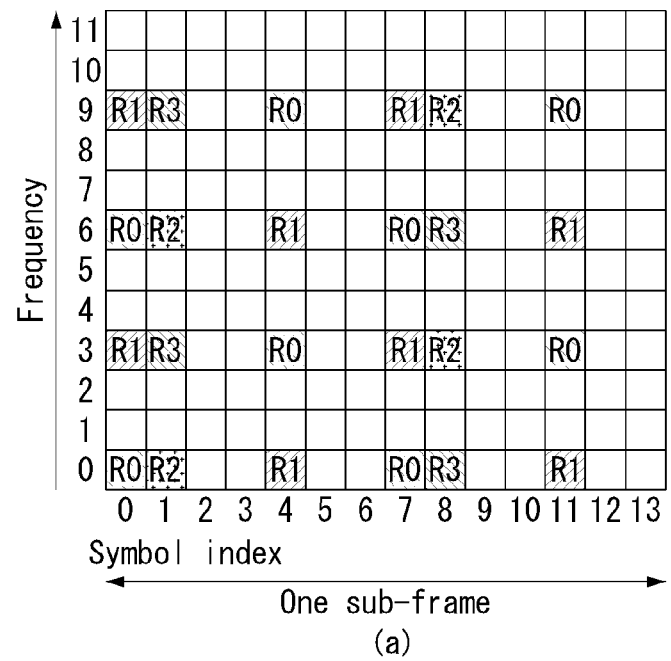
(a)
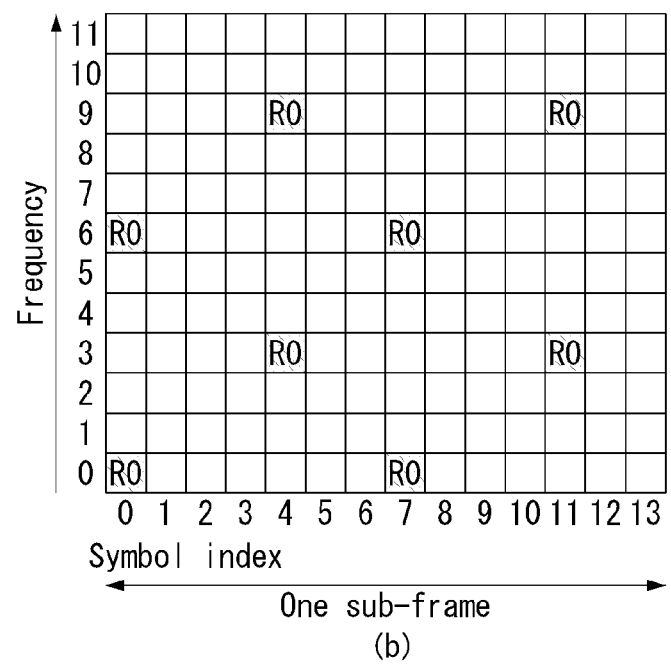
(b)

[Fig. 11]
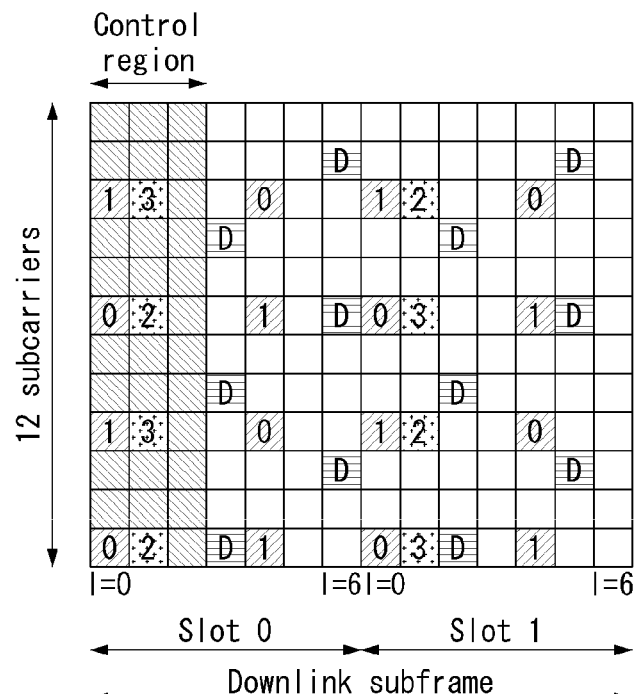
(a)
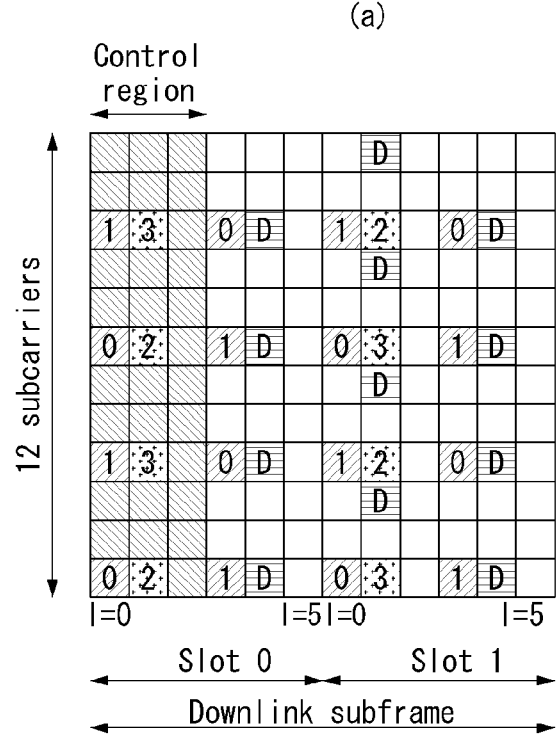
(b)

【Fig. 12】
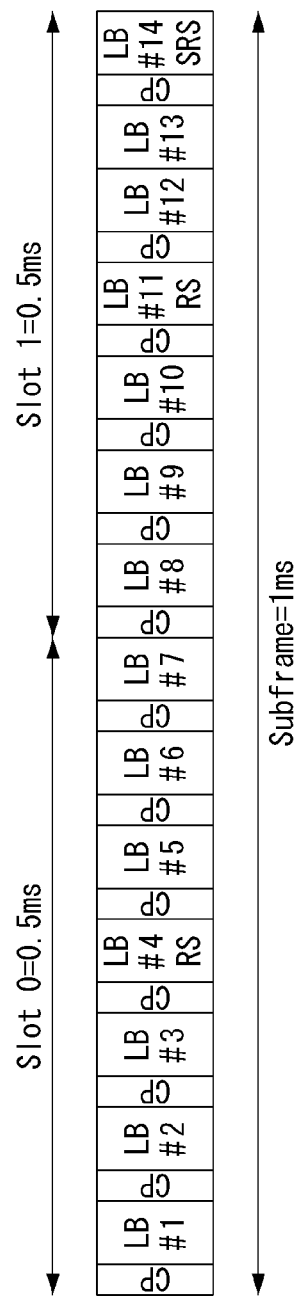

[Fig. 13]
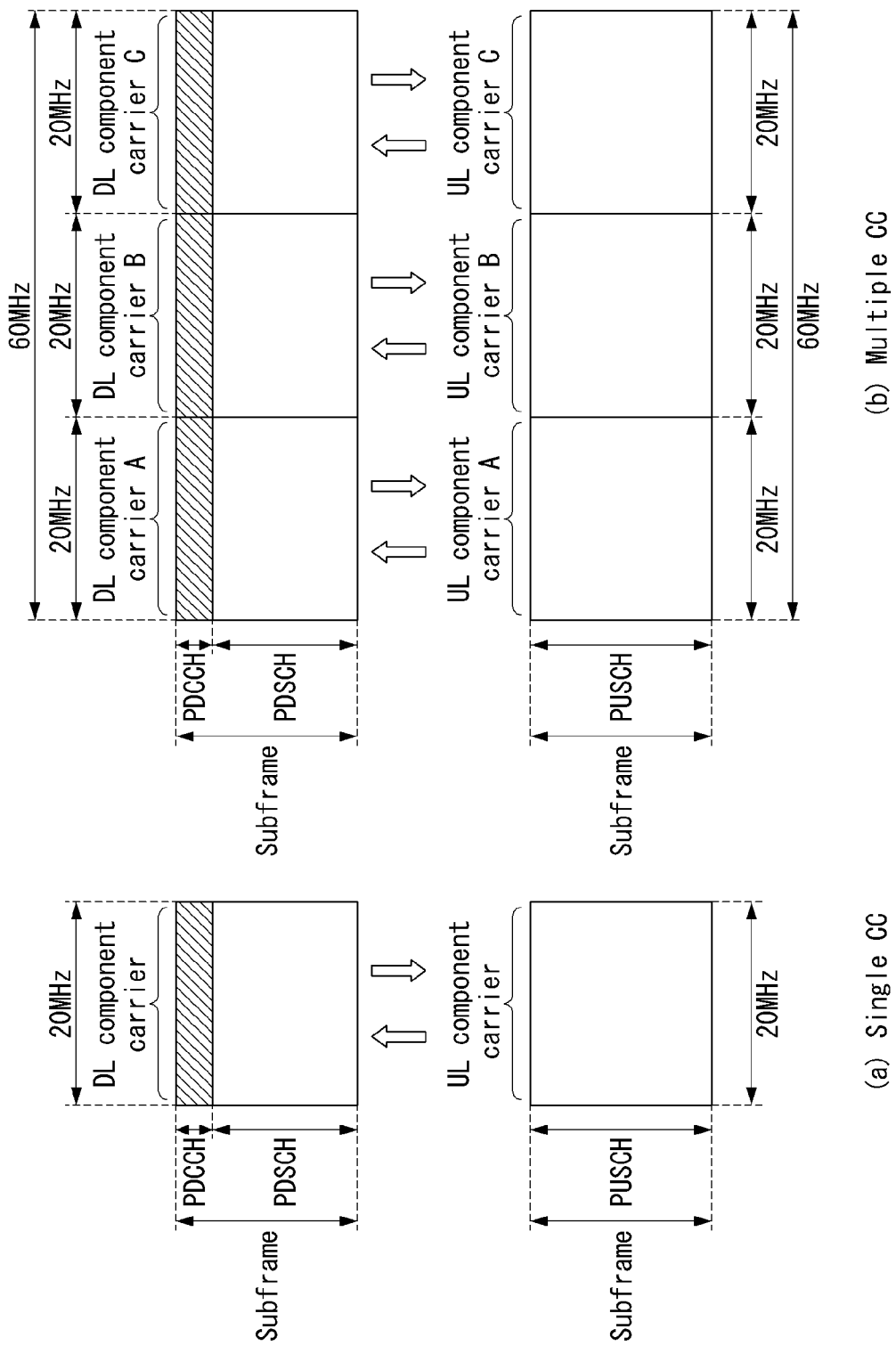

【Fig. 14】
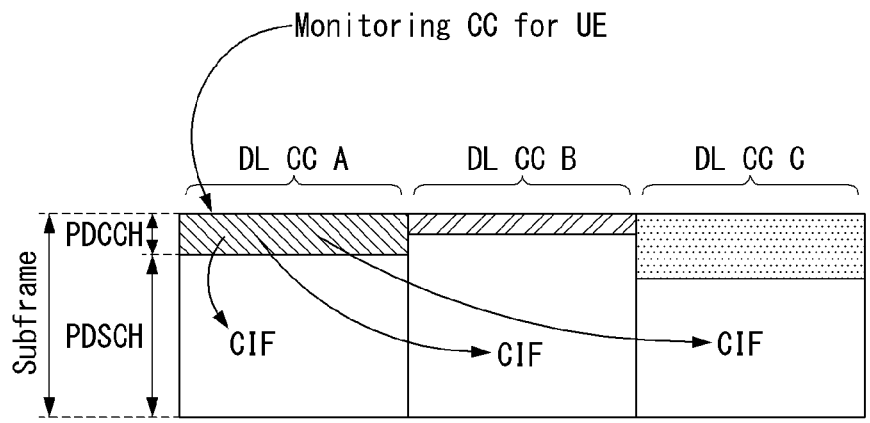
【Fig. 15】
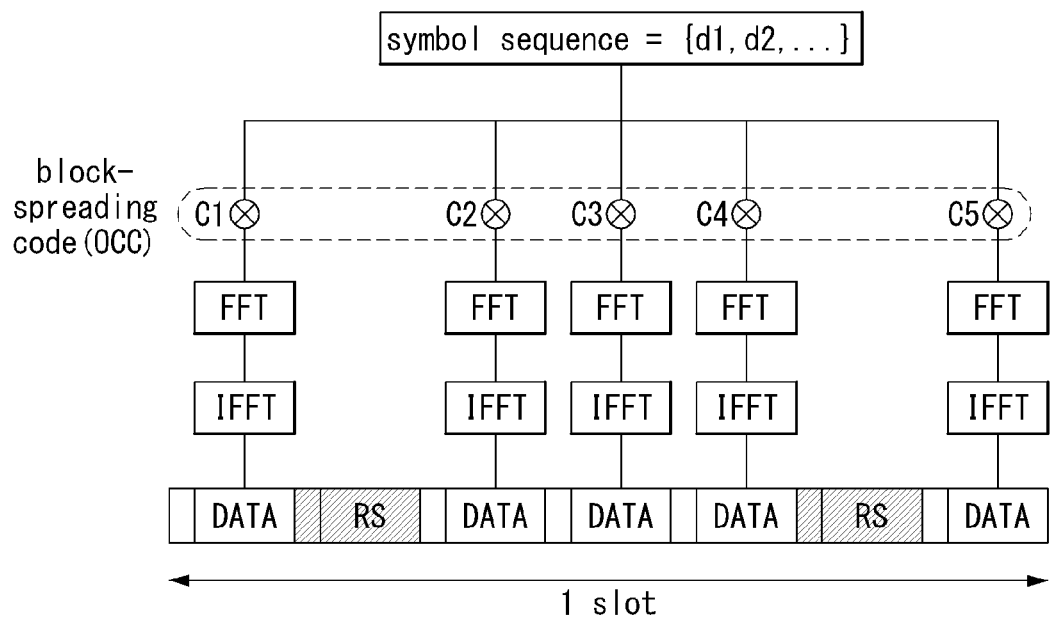

[Fig. 16]
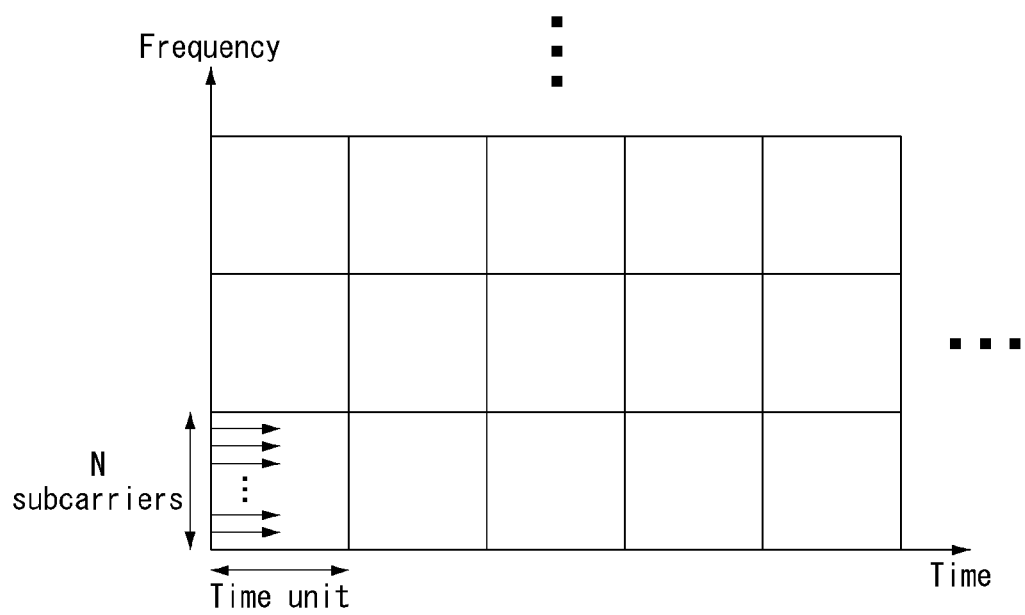

[Fig. 17]
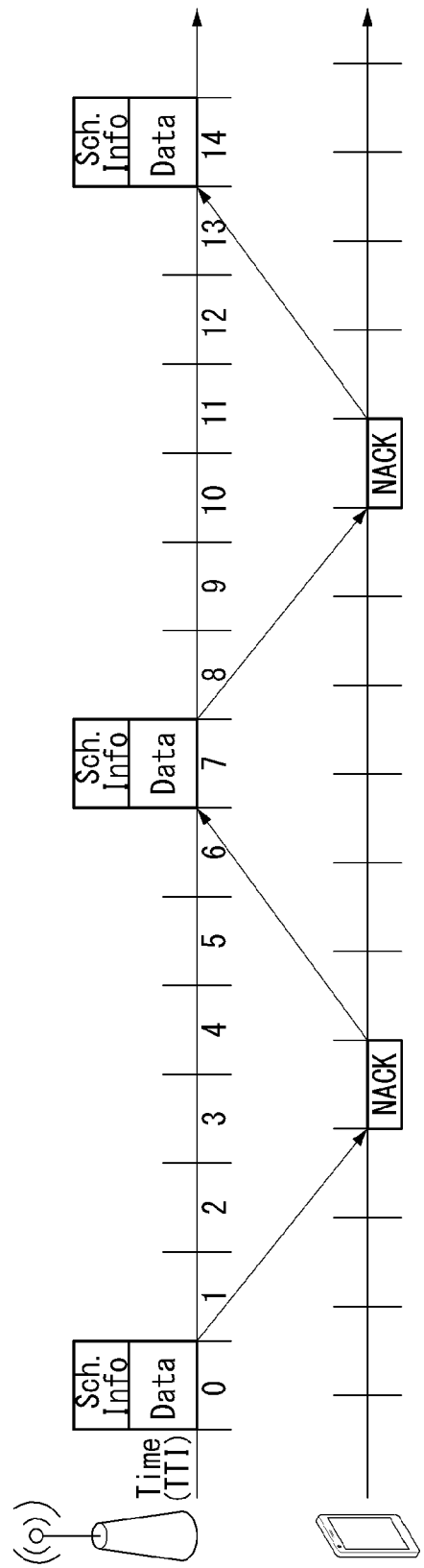

【Fig. 18】
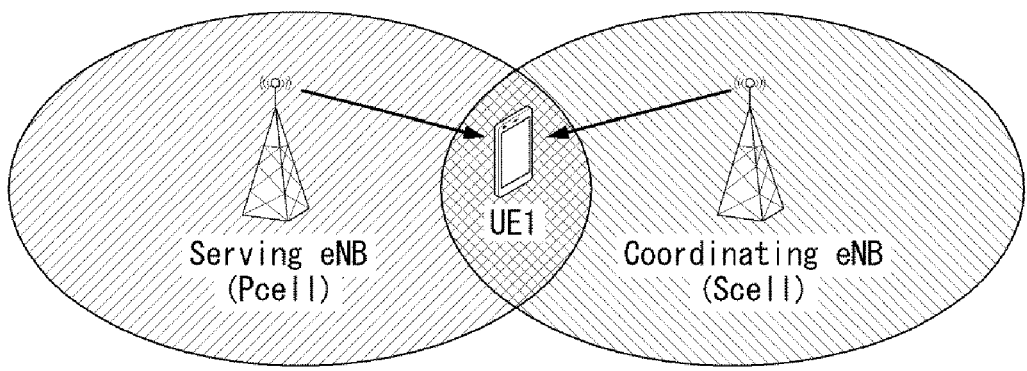
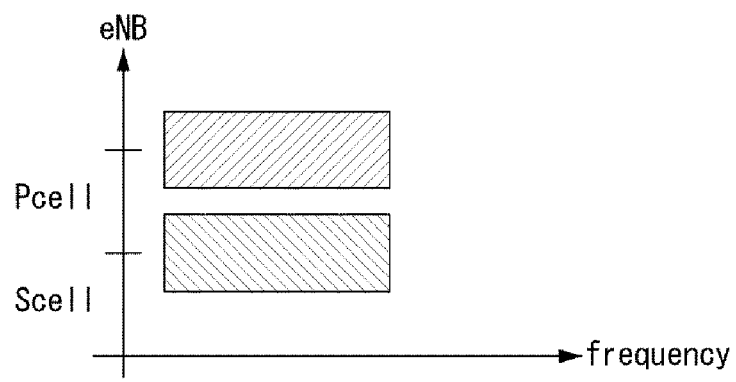
【Fig. 19】
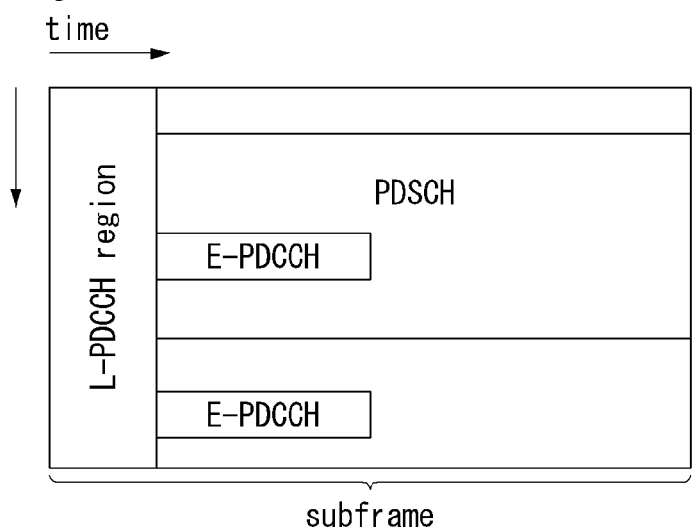

[Fig. 20]
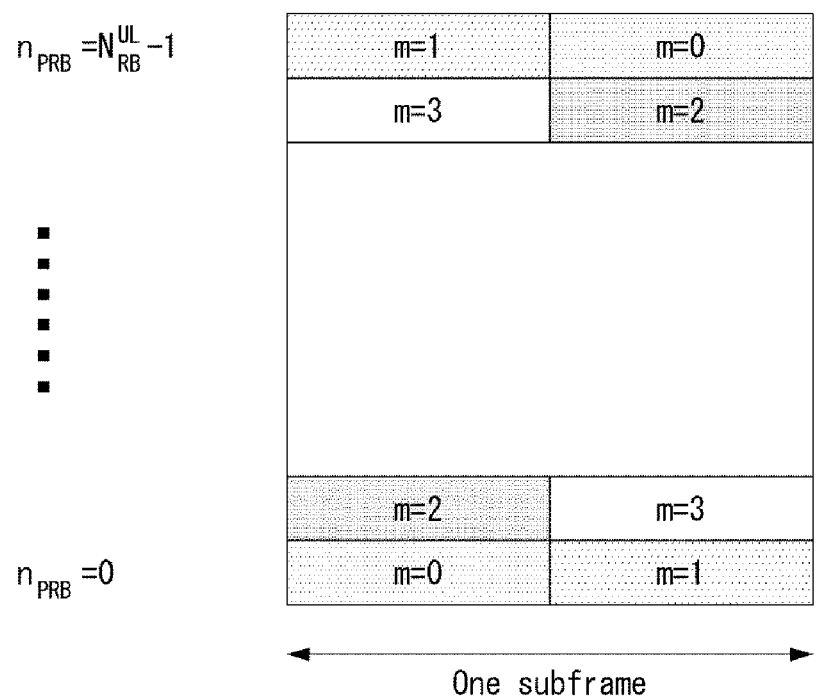

[Fig. 21]
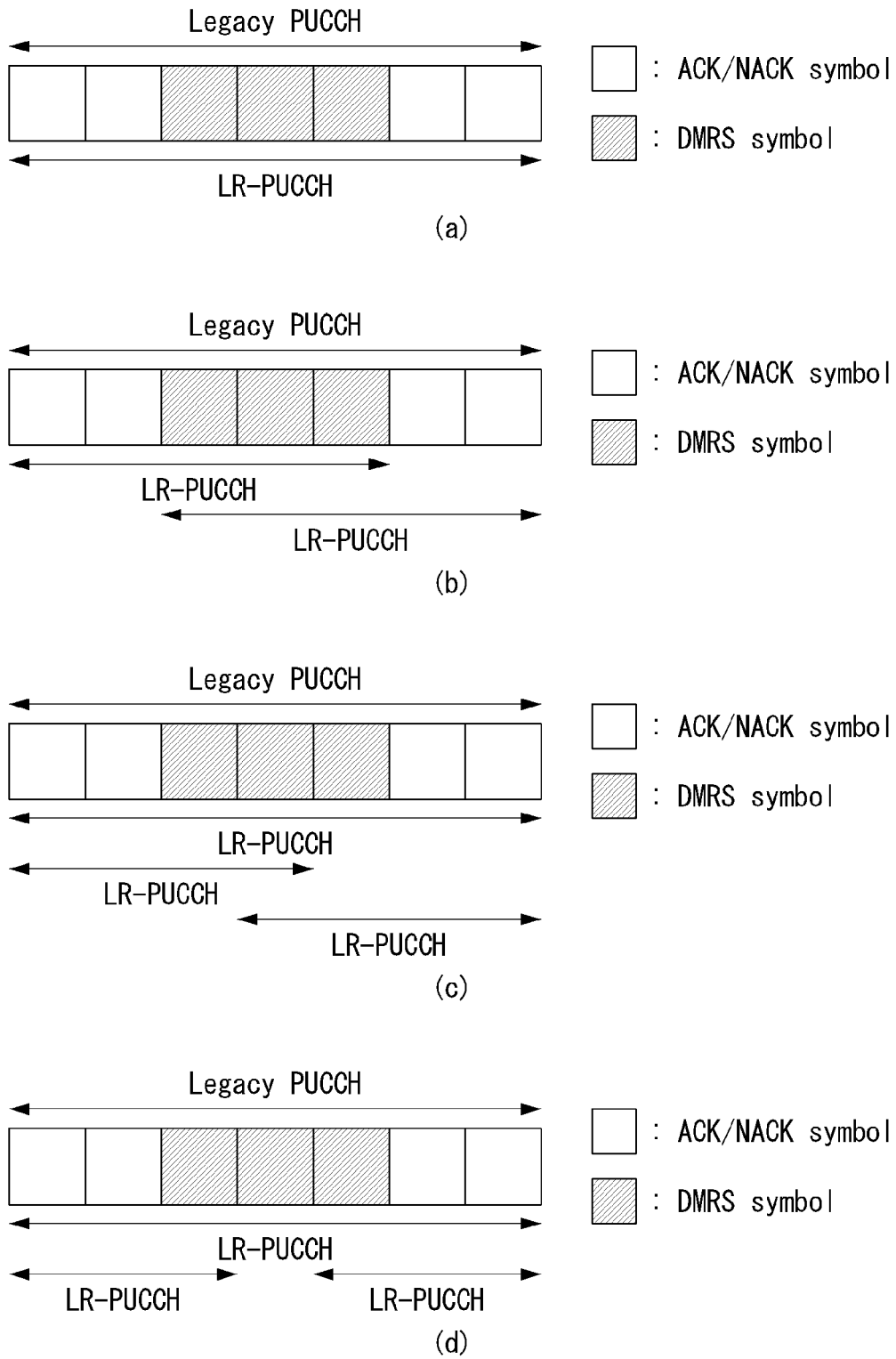

【Fig. 22】
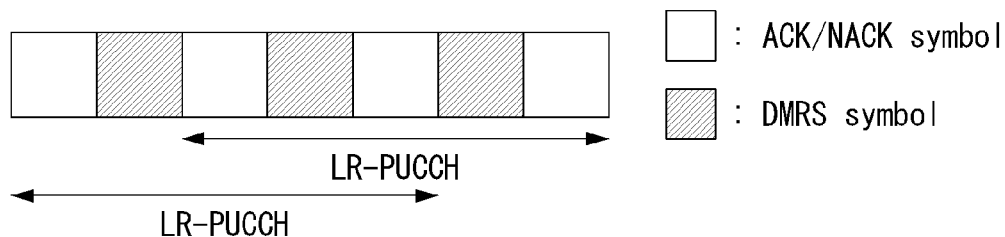
【Fig. 23】
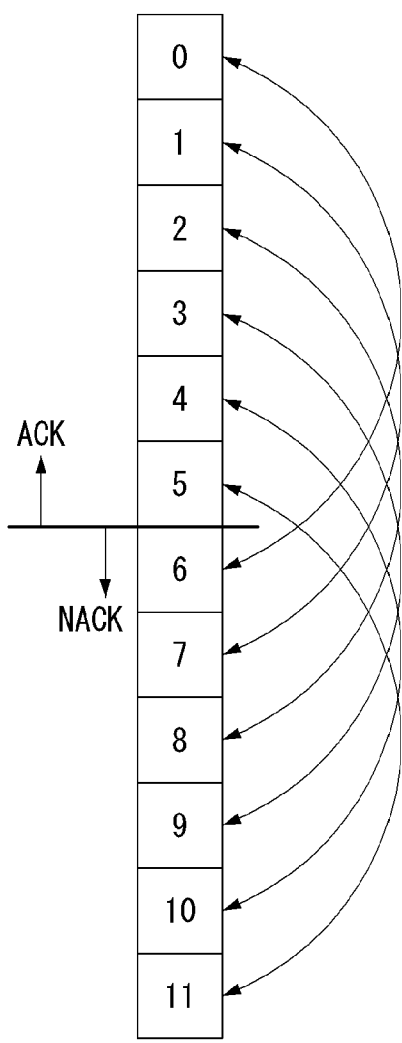
< Cyclic Shift Index >

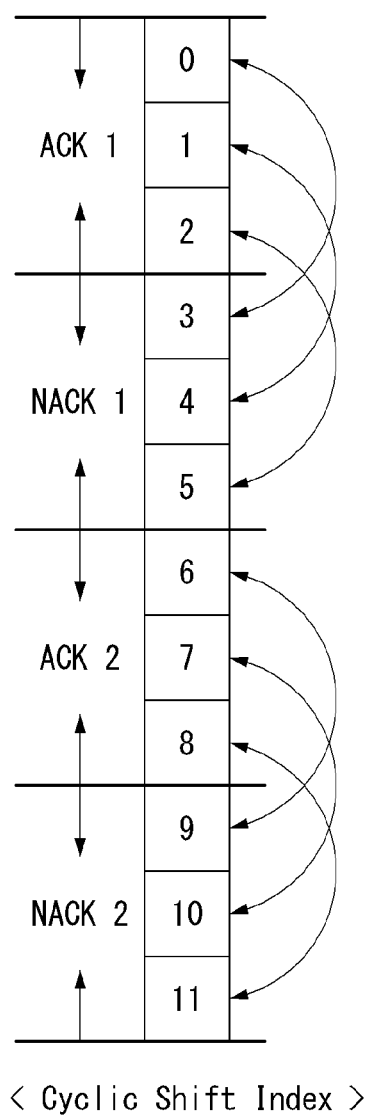
[Fig. 24]
< Cyclic Shift Index >

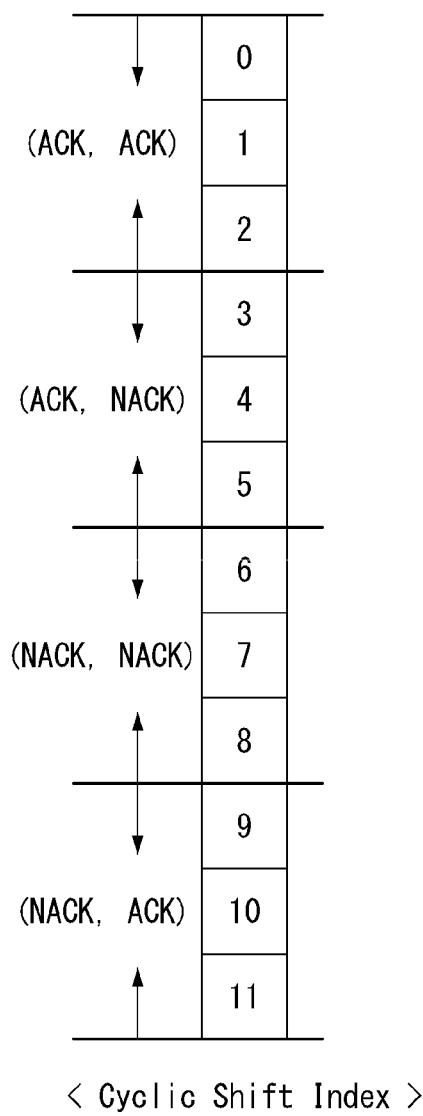
[Fig. 25]

[Fig. 26]
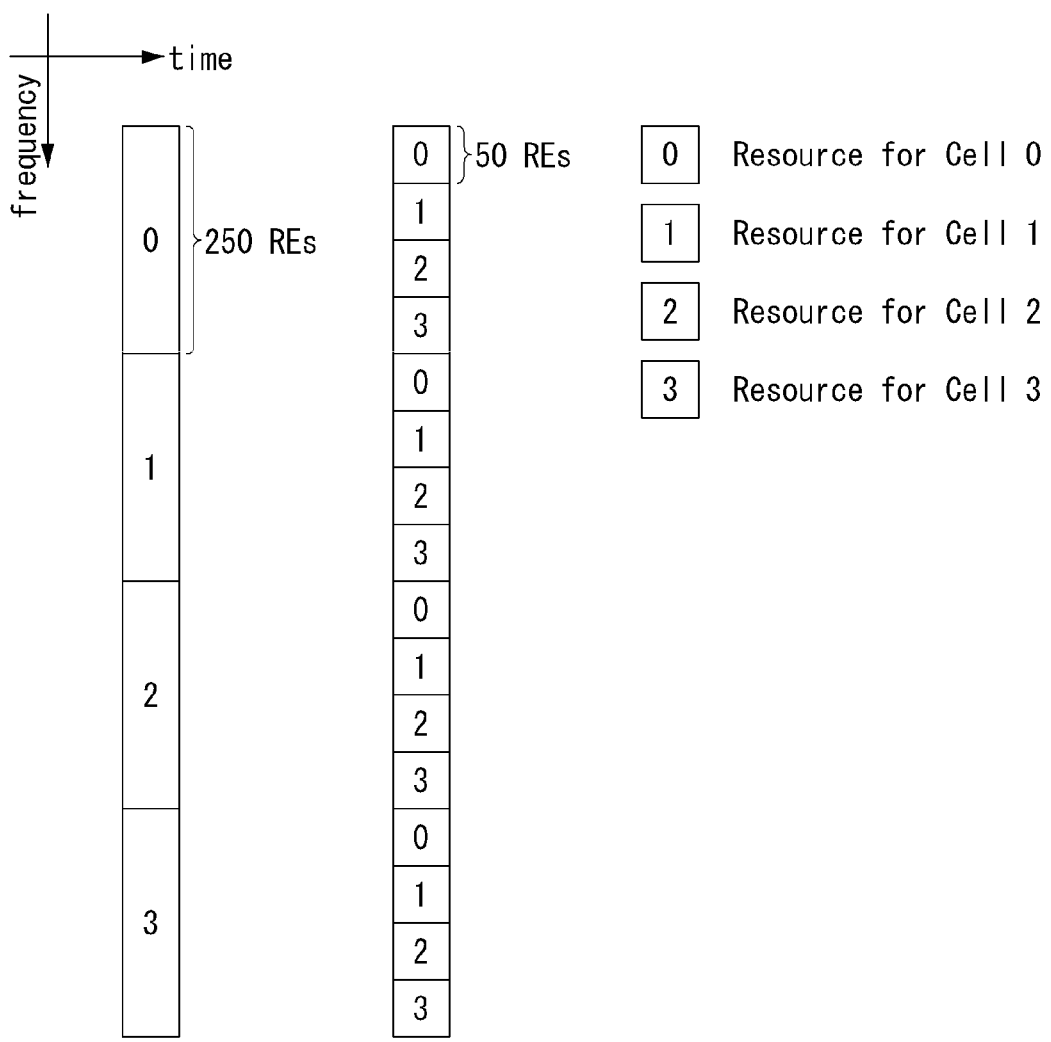

【Fig. 27】
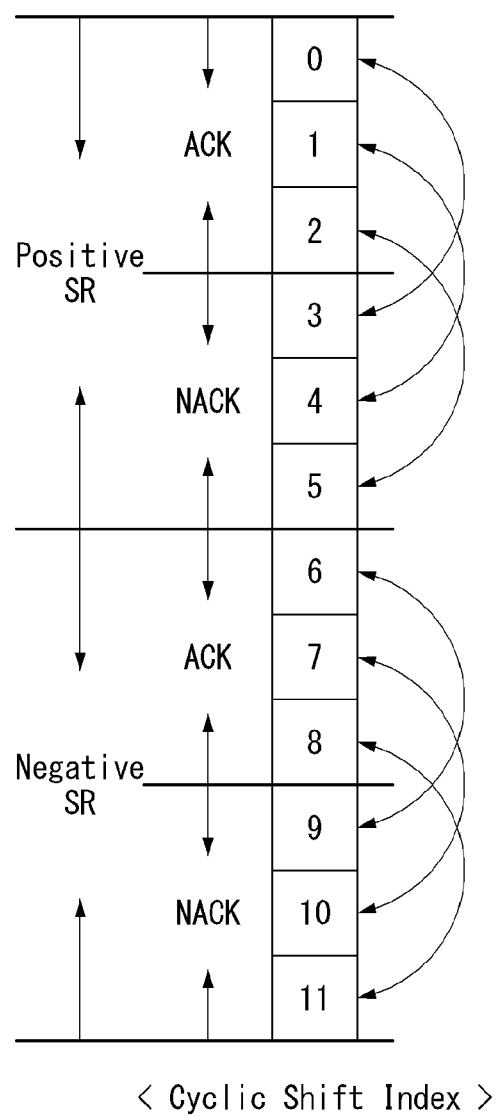
【Fig. 28】
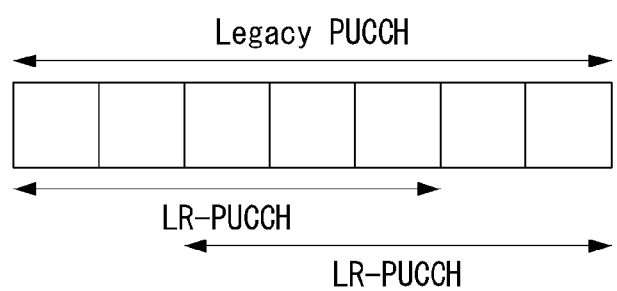

[Fig. 29]
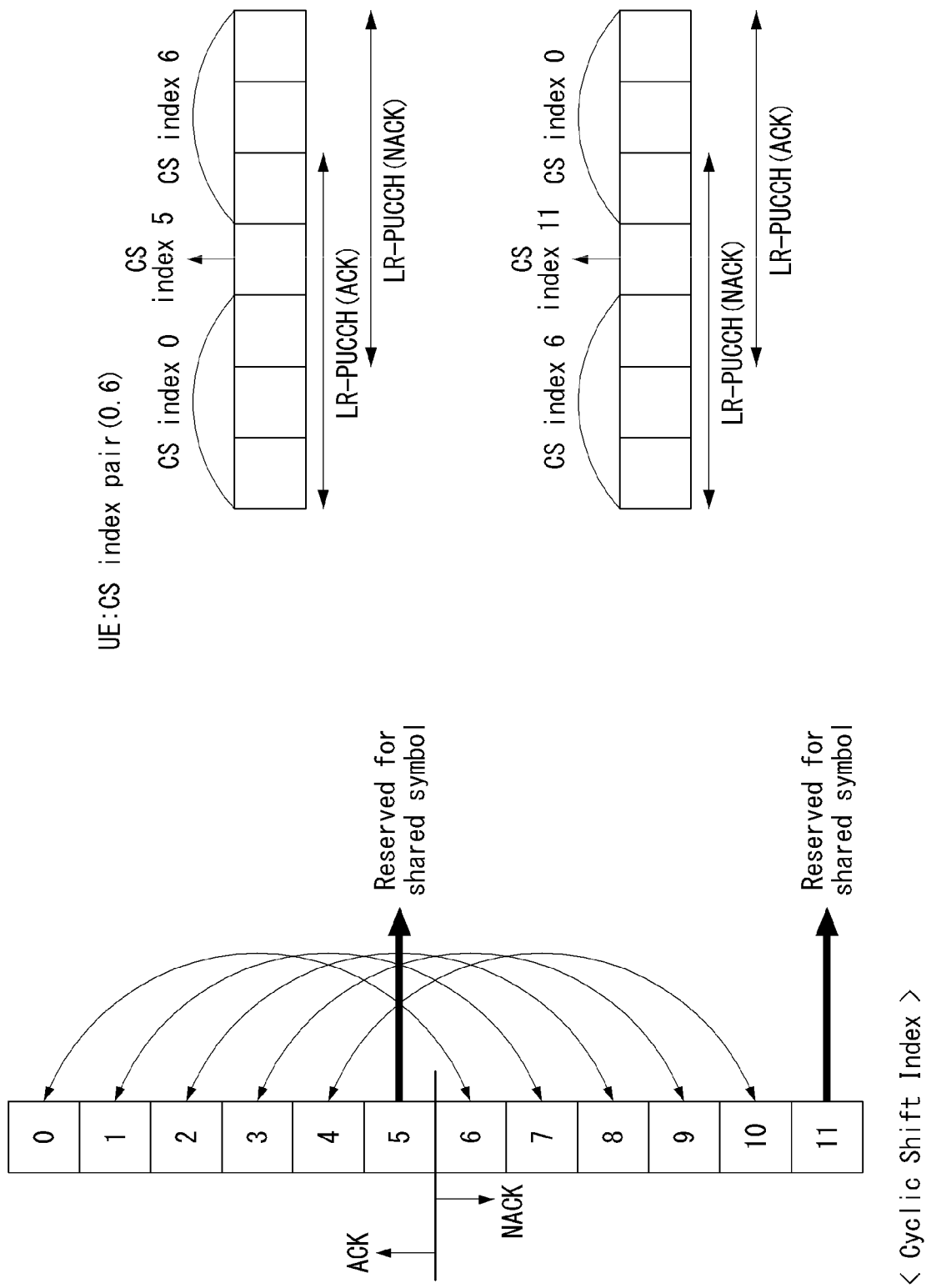

【Fig. 30】
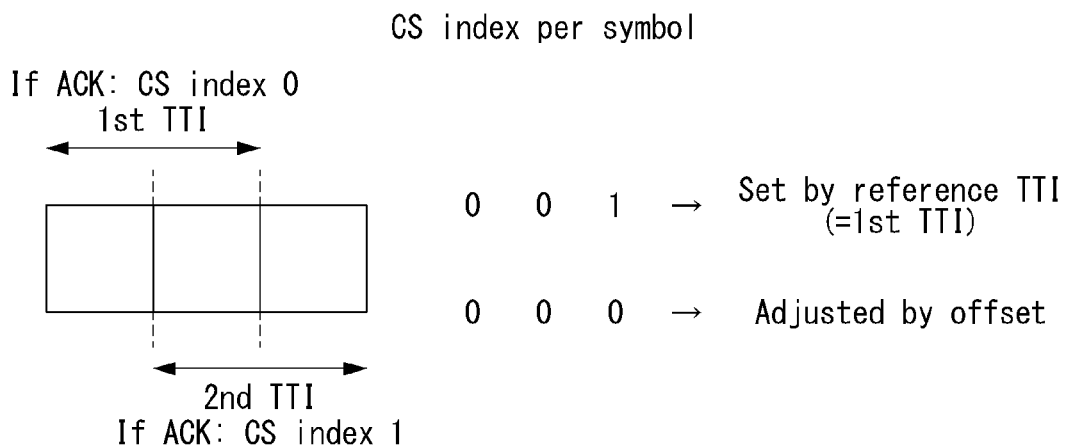
【Fig. 31】
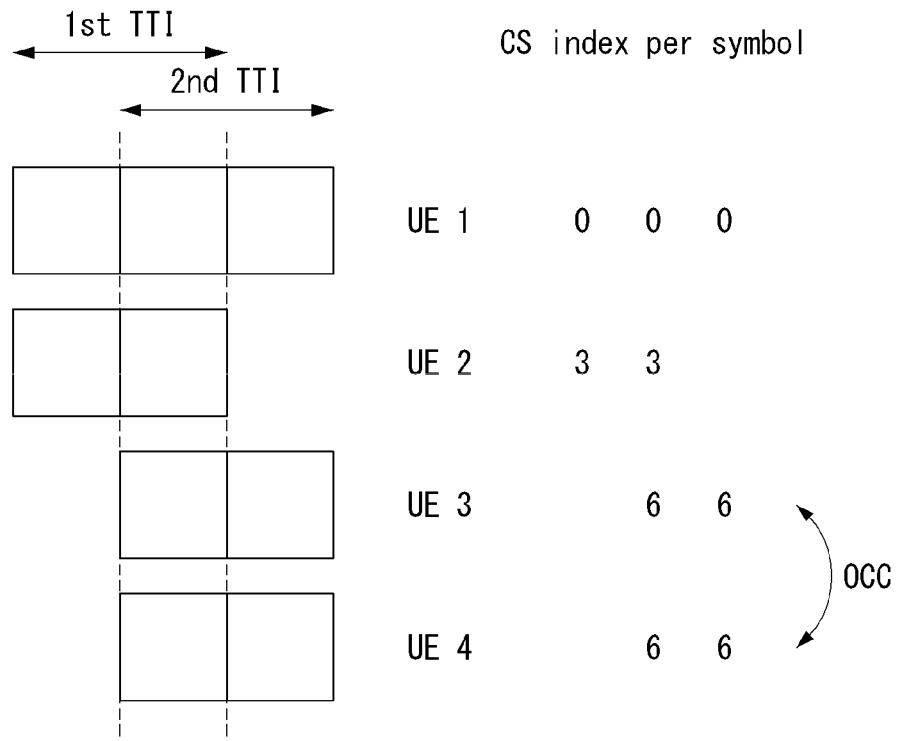

[Fig. 32]
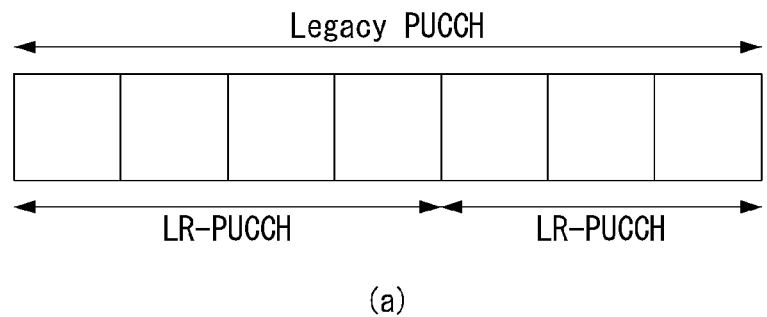
(a)
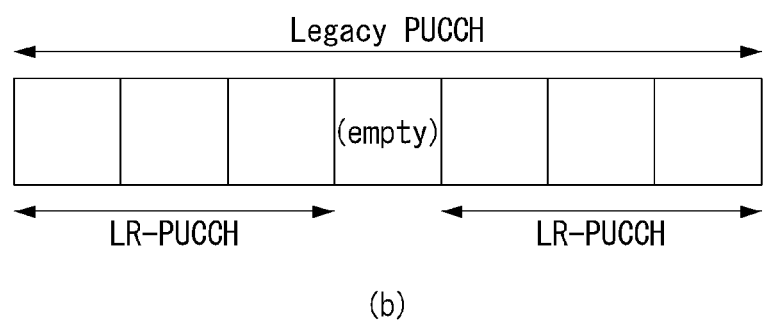
(b)
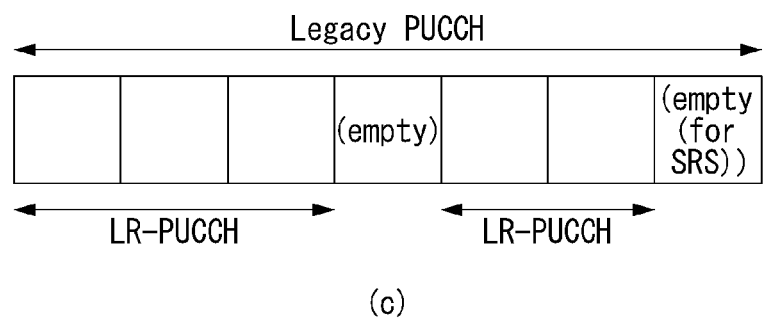
(c)

[Fig. 33]
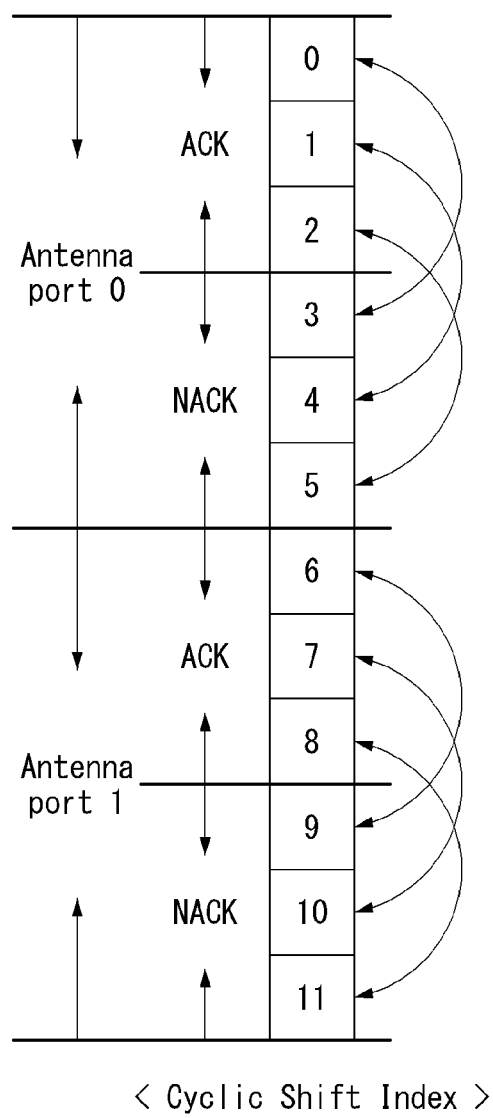
< Cyclic Shift Index >

[Fig. 34]
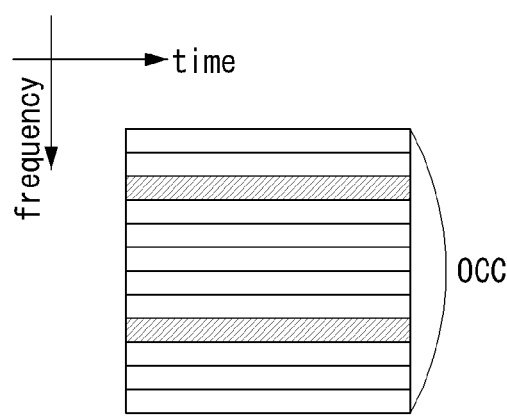

[Fig. 35]
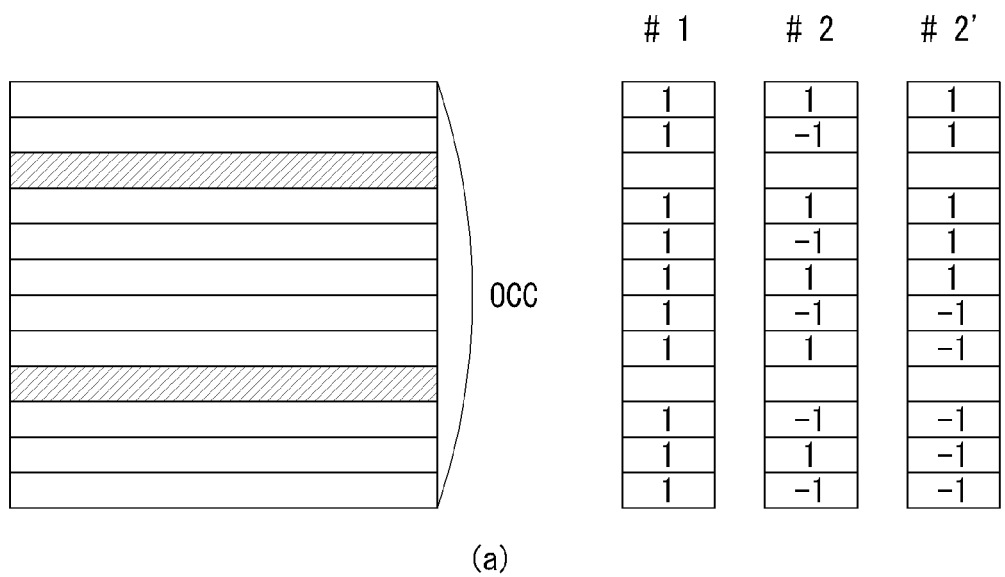
(a)
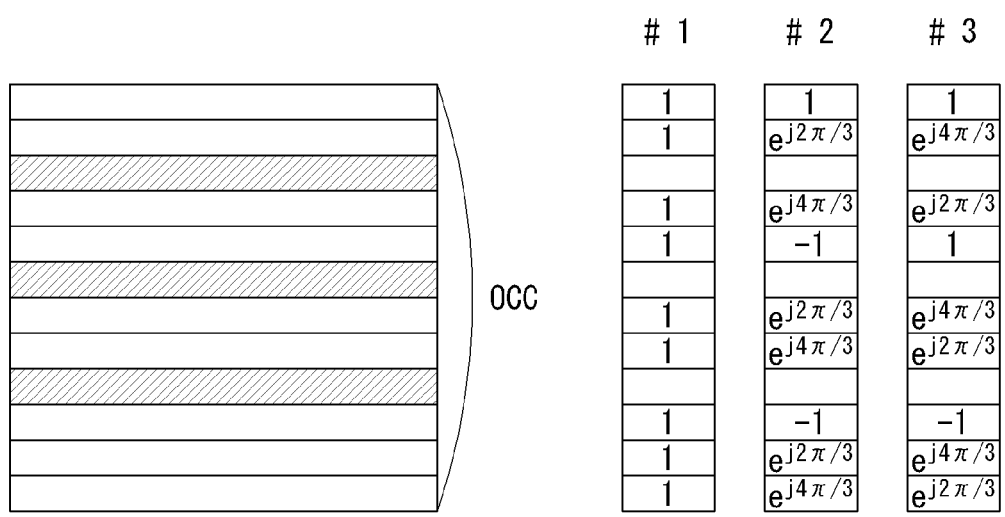
(b)

[Fig. 36]
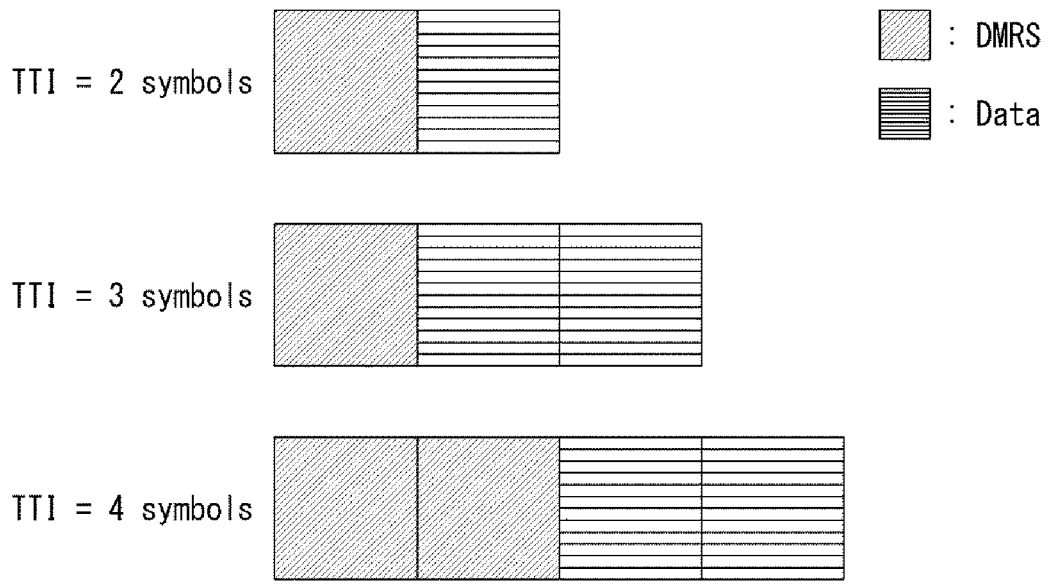
[Fig. 37]
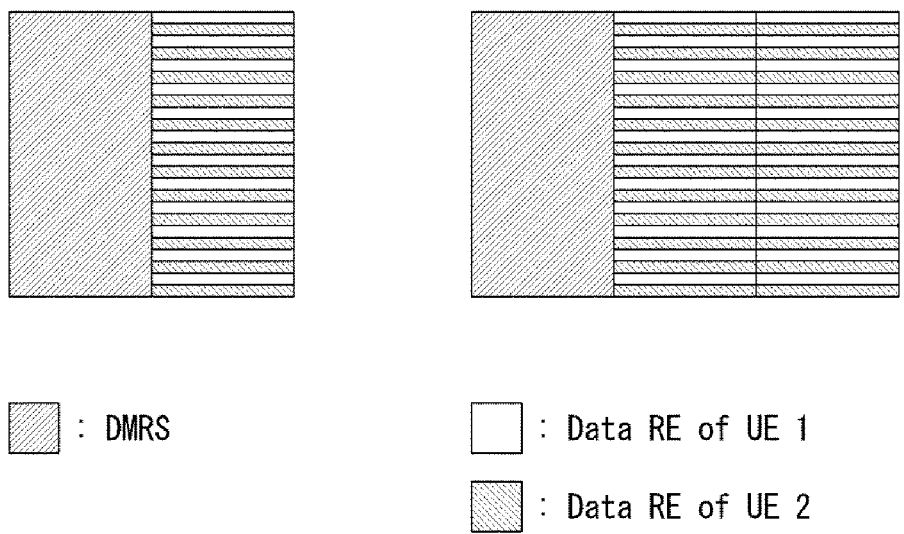

[Fig. 38]
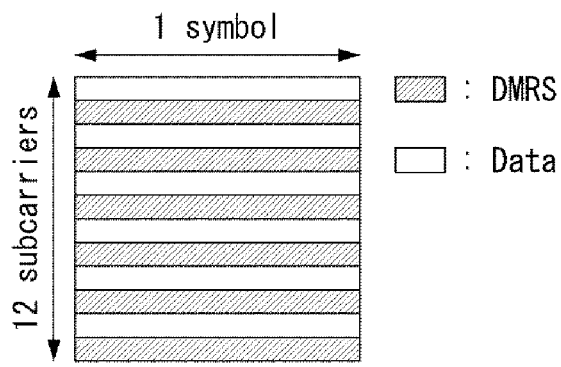
[Fig. 39]
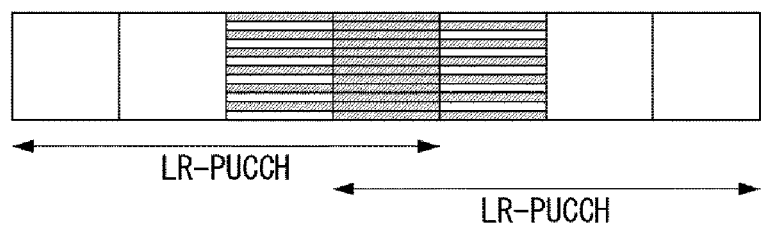
(a)
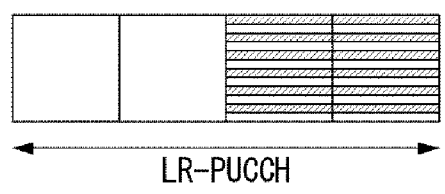
(b)

[Fig. 40]
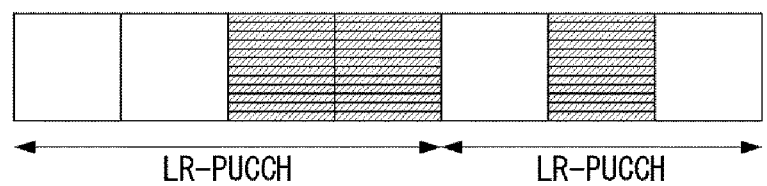
(a)
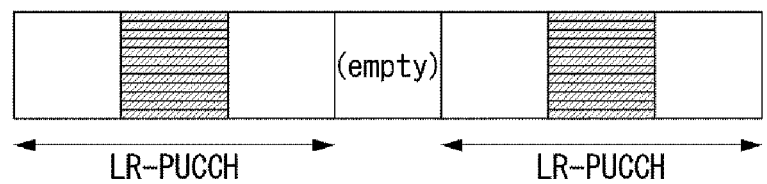
(b)

[Fig. 41]
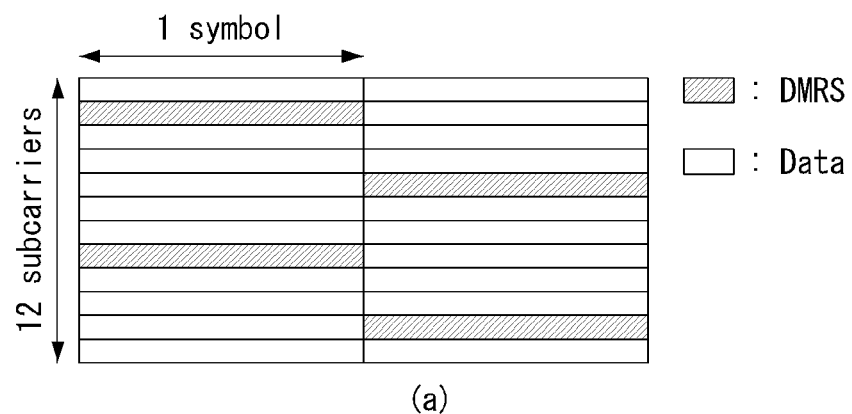
(a)
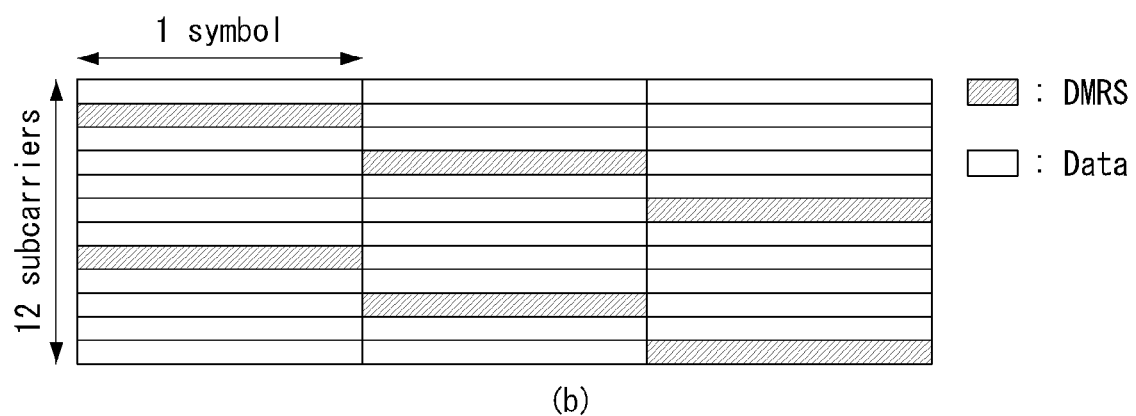
(b)

[Fig. 42]
(a)
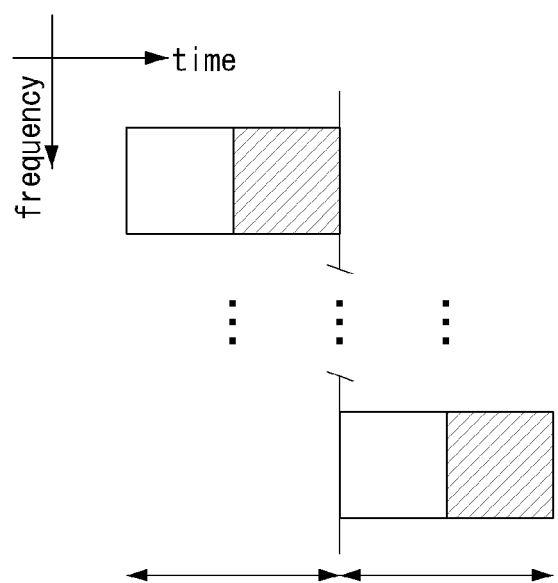
(b)

[Fig. 43]
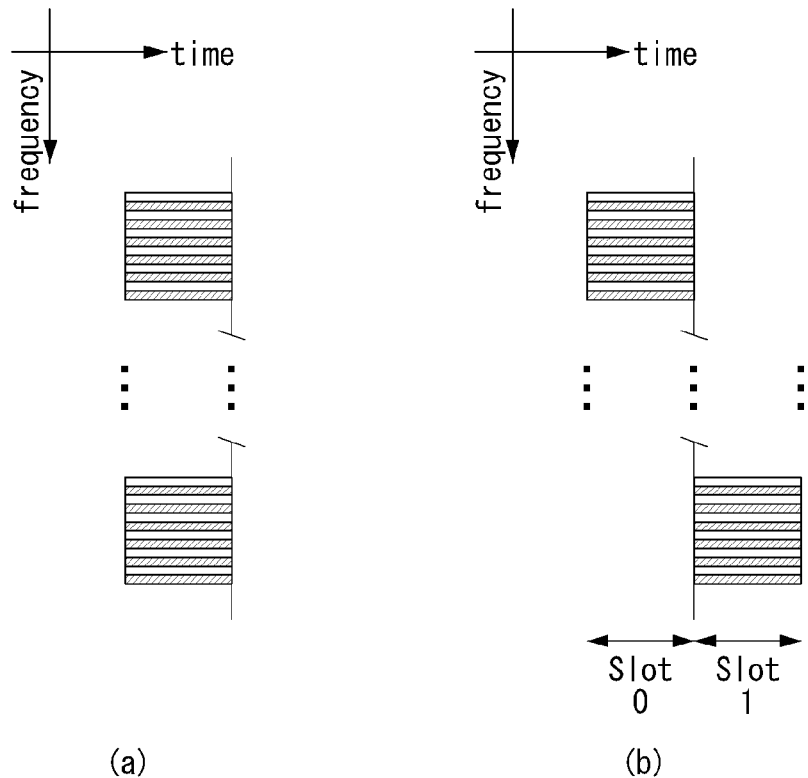
(a)  (b)
[Fig. 44]
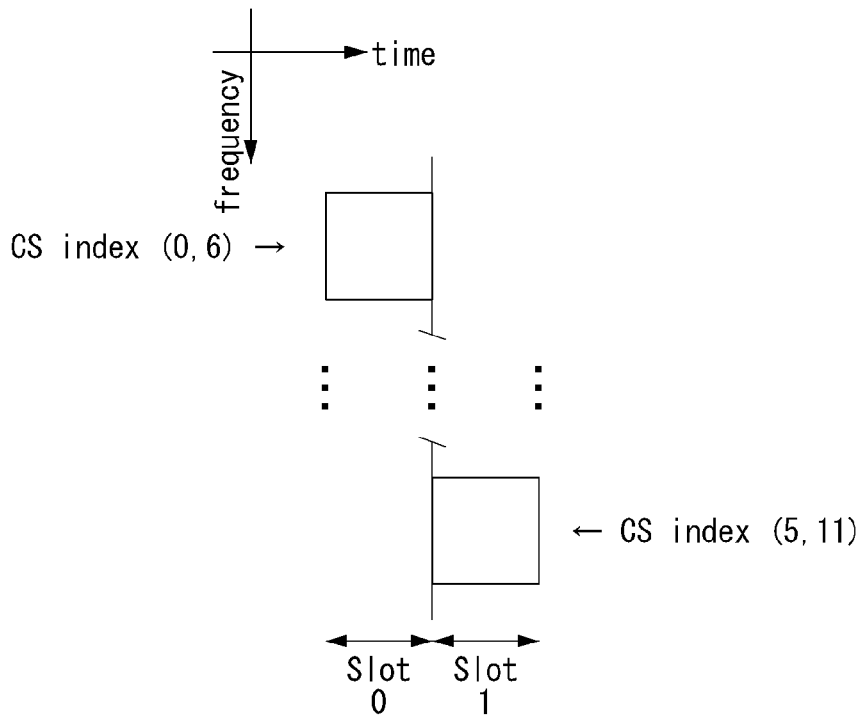

[Fig. 45]
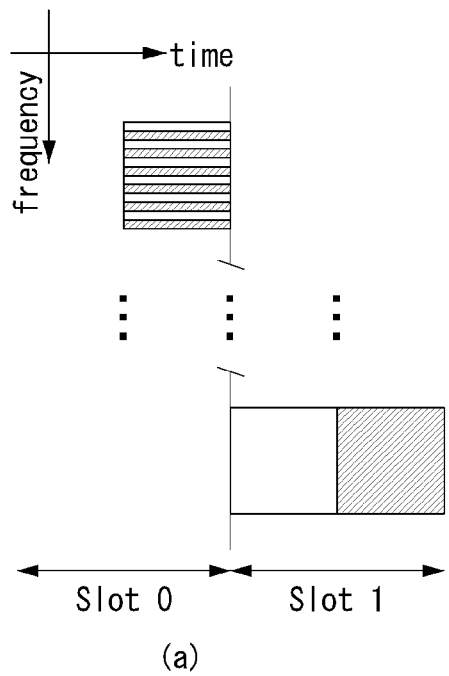
(a)
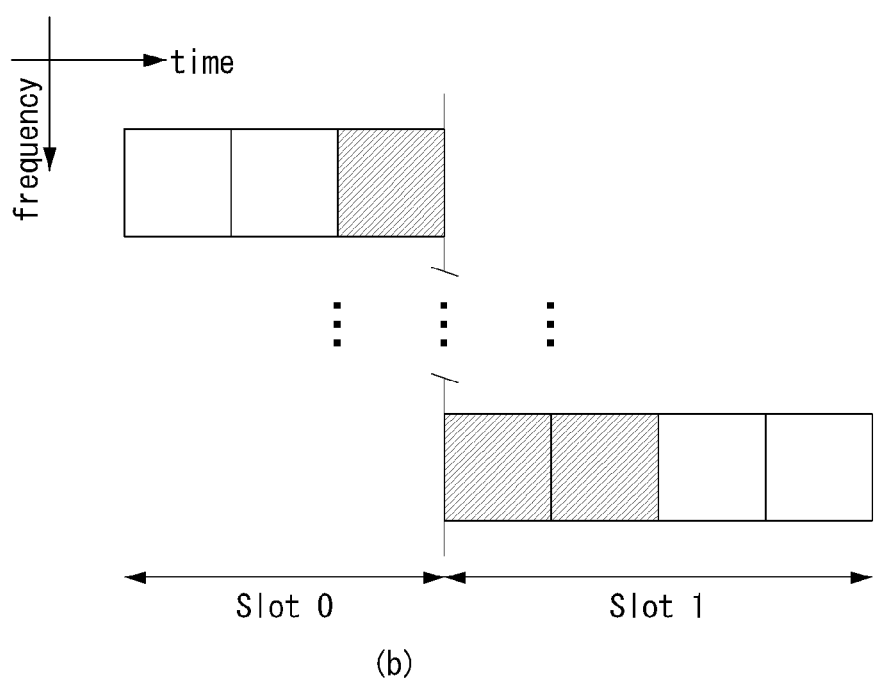
(b)

[Fig. 46]
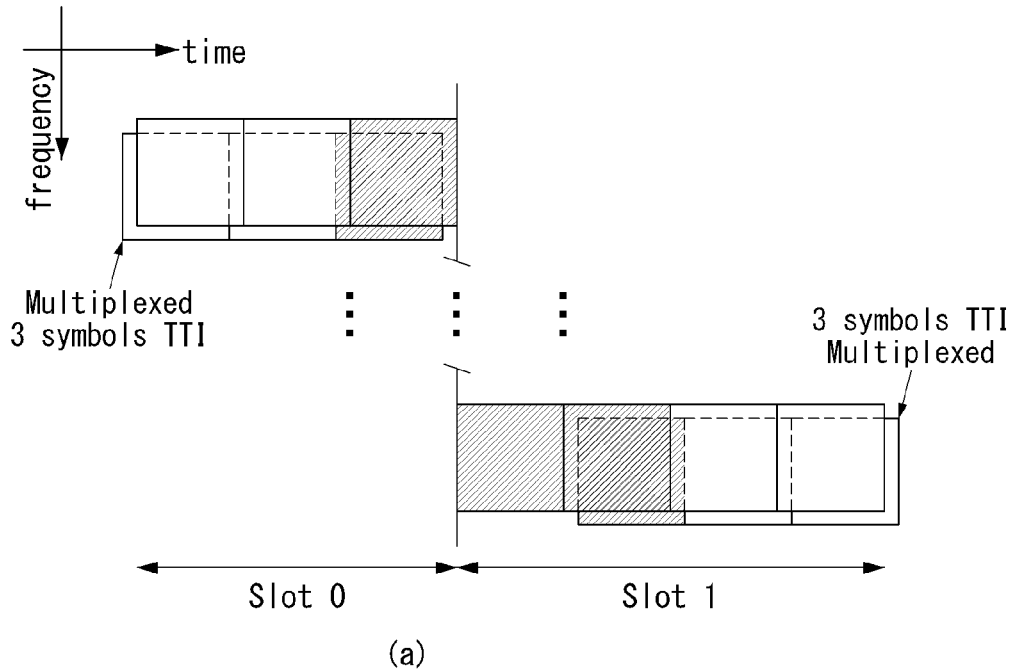
(a)
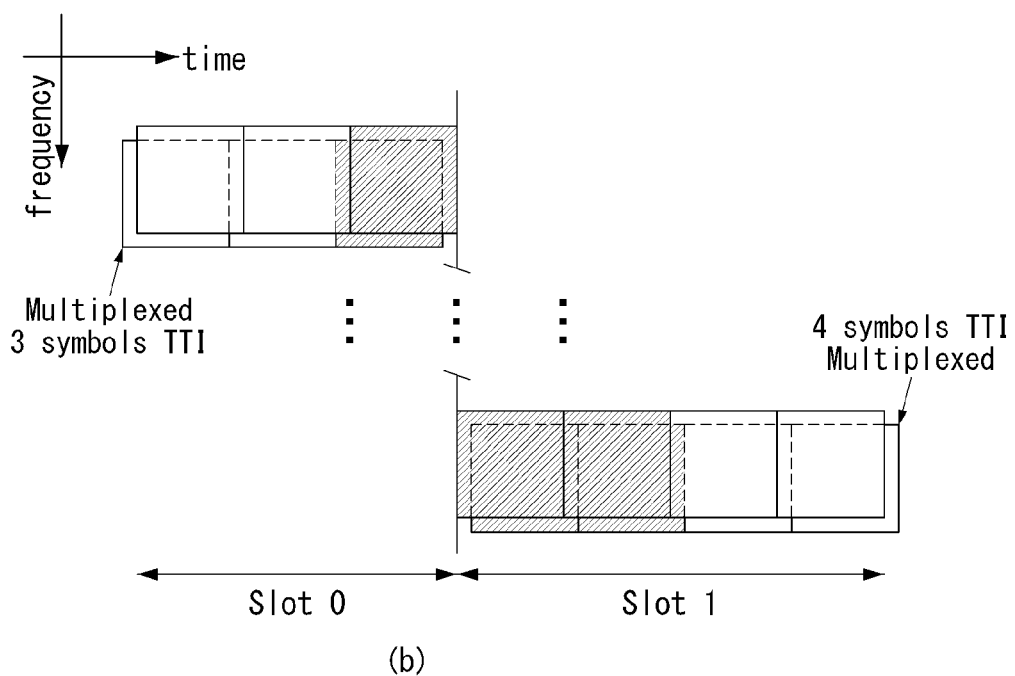
(b)

[Fig. 47]
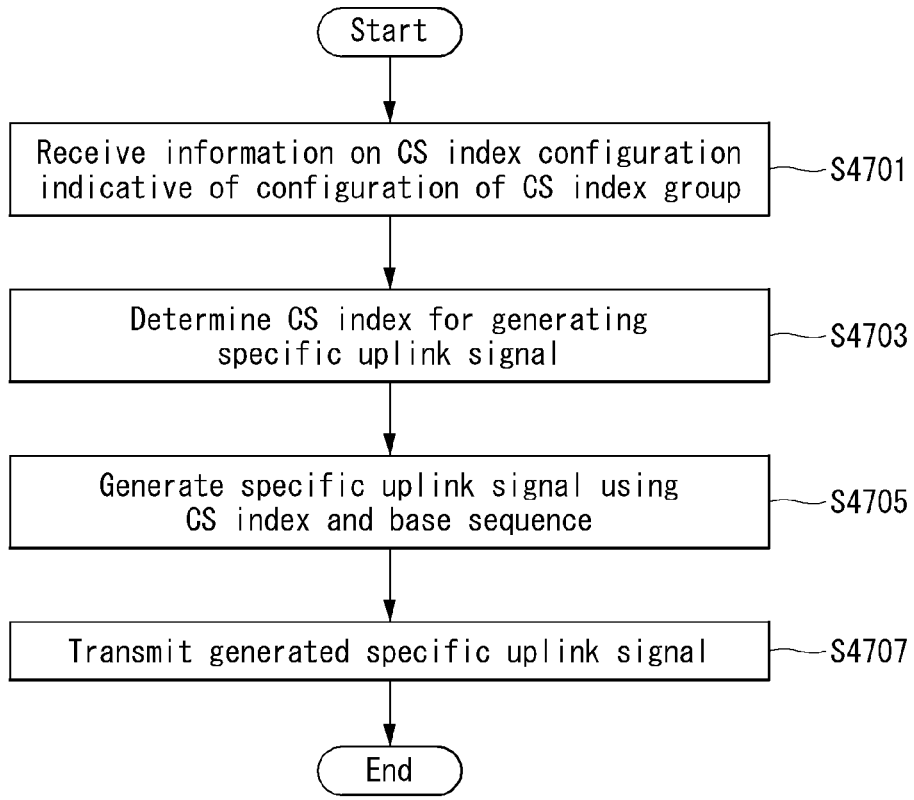
[Fig. 48]
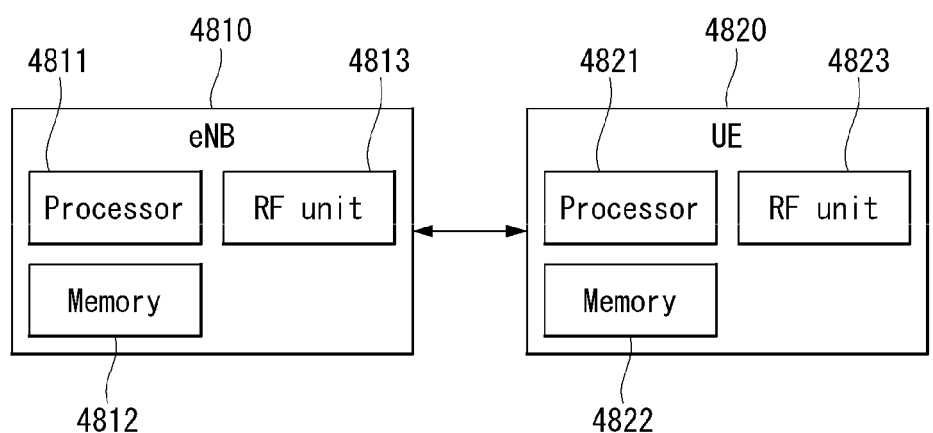

METHOD FOR TRANSMITTING UPLINK SIGNALS IN WIRELESS COMMUNICATION SYSTEM FOR SUPPORTING SHORT TRANSMISSION TIME INTERVAL, AND DEVICE FOR SUPPORTING SAME

CROSS REFERENCE TO RELATED APPLICATIONS

This application is the National Phase of PCT International Application No. PCT/KR2016/014453, filed on Dec. 9, 2016, which claims priority under 35 U.S.C. 119(e) to U.S. Provisional Application No. 62/265,435, filed on Dec. 10, 2015, U.S. Provisional Application No. 62/273,448, filed on Dec. 31, 2015, U.S. Provisional Application No. 62/292,163, filed on Feb. 5, 2016, U.S. Provisional Application No. 62/308,820, filed on Mar. 15, 2016, U.S. Provisional Application No. 62/316,605, filed on Apr. 1, 2016, U.S. Provisional Application No. 62/335,693, filed on May 13, 2016, U.S. Provisional Application No. 62/405,974, filed on Oct. 9, 2016, and U.S. Provisional Application No. 62/420,718, filed on Nov. 11, 2016, all of which are hereby expressly incorporated by reference into the present application.

TECHNICAL FIELD

This specification relates to a wireless communication system supporting a short transmission time interval (TTI) and, more particularly, to a method for transmitting an uplink signal and an apparatus supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DISCLOSURE

Technical Problem

An object of this specification is to provide a method for configuring a physical uplink control channel used by the users of a wireless communication system supporting transmission time intervals (TTI) of various symbol lengths.

Furthermore, an object of this specification is to provide a method of multiplexing a physical uplink control channel between users in a wireless communication system supporting a short TTI.

Furthermore, an object of this specification is to provide a method for configuring a physical uplink control channel, which multiplexes a legacy LTE user and a user using a short TTI.

Furthermore, an object of this specification is to provide a method for configuring a physical uplink control channel which may be applied in a lump regardless of a TTI length.

Furthermore, an object of this specification is to provide a method for configuring a physical uplink control channel using a base sequence.

Furthermore, an object of this specification is to provide a method for configuring a physical uplink control channel using a frequency orthogonal cover code (OCC).

Furthermore, an object of this specification is to provide a method of performing the frequency hopping of a physical uplink channel for a short TTI environment.

Technical objects to be achieved by the present invention are not limited to the aforementioned technical objects, and other technical objects not described above may be evidently understood by a person having ordinary skill in the art to which the present invention pertains from the following description.

Technical Solution

In this specification, in a method of transmitting an uplink signal in a wireless communication system, the method performed by a terminal includes receiving information on a cyclic shift (CS) index configuration indicative of the configuration of an index group of a CS related to uplink signal transmission from a base station, determining a CS index for generating a specific uplink signal in the CS index group, generating the specific uplink signal using the determined CS index and a base sequence of a specific length, and transmitting the generated specific uplink signal to the base station through an uplink control channel.

Furthermore, in this specification, the process of determining the CS index includes determining at least one of information on a scheduling requestor and information on ACK/NACK and identifying the CS index corresponding to the determined information.

Furthermore, in this specification, the specific uplink signal indicates ACK/NACK information and scheduling request information.

Furthermore, in this specification, if the ACK/NACK information is information of at least 2 bits, compressing the ACK/NACK information into information of 1 bit by bundling the ACK/NACK information is further included.

Furthermore, in this specification, receiving information on a resource index of the uplink control channel from the base station is further included. The process of transmitting the generated specific uplink signal includes transmitting the specific uplink signal by mapping the specific uplink signal to a resource indicated by the received resource index information.

Furthermore, in this specification, the CS index group includes at least one of a first CS index group (or set) and a second CS index group, and each of the first CS index group and the second CS index group includes at least one of a first CS index subgroup and a second CS index subgroup.

Furthermore, in this specification, the first CS index subgroup indicates ACK information, and the second CS index subgroup indicates NACK information.

Furthermore, in this specification, the first CS index group indicates a positive scheduling request, and the second CS index group indicates a negative scheduling request.

Furthermore, in this specification, the determined CS index is included in at least one of the first CS index subgroup and the second CS index subgroup.

Furthermore, in this specification, the number of CS indices included in a CS index group used to generate the specific uplink signal is determined based on a specific length of the base sequence.

Furthermore, in this specification, the CS index configuration is used in the uplink control channel of a short transmission time interval (TTI) including symbols less than or equal to 7 symbols.

Furthermore, in this specification, a demodulation reference signal (DMRS) is used in the base sequence of the specific length.

Furthermore, in this specification, the information on the CS index configuration is differently configured for each transmission time interval (TTI).

Furthermore, in this specification, the uplink signals of a legacy terminal and a latency reduced (LR) terminal or uplink signals between LR terminals are multiplexed based on the CS index and the base sequence of the specific length.

Furthermore, in this specification, a terminal transmitting an uplink signal in a wireless communication system includes a transceiver for transmitting/receiving a radio signal and a processor functionally connected to the transceiver. The processor performs control so that information on a cyclic shift (CS) index configuration indicative of the configuration of an index group of a CS related to uplink signal transmission is received from a base station, a CS index for generating a specific uplink signal is determined in the CS index group, the specific uplink signal is generated using the determined CS index and a base sequence of a specific length, and the generated specific uplink signal is transmitted to the base station through an uplink control channel.

Advantageous Effects

This specification has an effect in that it can support multiplexing between users by newly defining the structure of a physical uplink control channel in a wireless communication system supporting a short transmission time interval.

Furthermore, this specification has an effect in that it can implement a scheduling request, multiplexing between users, and transmit diversity using only a sequence applied to a reference signal without a separate data symbol.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompanying drawings included as part of the detailed description in order to help understanding of the present invention provide embodiments of the present invention, and describe the technical characteristics of the present invention along with the detailed description.

FIG. 1 illustrates the structure of a radio frame in a wireless communication system to which the present invention may be applied.

FIG. 2 is a diagram illustrating a resource grid for one downlink slot in a wireless communication system to which the present invention may be applied.

FIG. 3 illustrates the structure of a downlink subframe in a wireless communication system to which the present invention may be applied.

FIG. 4 illustrates the structure of an uplink subframe in a wireless communication system to which the present invention may be applied.

FIG. 5 illustrates an example of a form in which physical uplink control channel (PUCCH) formats are mapped to the PUCCH region of an uplink physical resource block in a wireless communication system to which the present invention may be applied.

FIG. 6 illustrates the structure of a channel quality indicator (CQI) channel in the case of a normal cyclic prefix (CP) in a wireless communication system to which the present invention may be applied.

FIG. 7 illustrates the structure of an ACK/NACK channel in the case of a normal CP in a wireless communication system to which the present invention may be applied.

FIG. 8 illustrates an example of the transport channel processing of an uplink shared channel (UL-SCH) in a wireless communication system to which the present invention may be applied.

FIG. 9 illustrates an example of the signal processing process of an uplink shared channel, that is, a transport channel, in a wireless communication system to which the present invention may be applied.

FIG. 10 illustrates examples of a cell-specific reference signal (CRS) pattern in 1 resource block (RB) to which the present invention may be applied.

FIG. 11 illustrates reference signal patterns mapped to downlink resource block pairs in a wireless communication system to which the present invention may be applied.

FIG. 12 illustrates an uplink subframe including a sounding reference signal symbol in a wireless communication system to which the present invention may be applied.

FIG. 13 illustrates an example of component carriers and carrier aggregations in a wireless communication system to which the present invention may be applied.

FIG. 14 illustrates an example of a subframe structure based on cross-carrier scheduling in a wireless communication system to which the present invention may be applied.

FIG. 15 illustrates an example in which 5 SC-FDMA symbols are generated and transmitted during one slot in a wireless communication system to which the present invention may be applied.

FIG. 16 illustrates an example of a time frequency resource block in a time frequency region, to which the present invention may be applied.

FIG. 17 illustrates an example of resource allocation and retransmission in a common asynchronous HARQ method, to which the present invention may be applied.

FIG. 18 illustrates an example of a CoMP system using a carrier aggregation, to which the present invention may be applied.

FIG. 19 is a diagram showing an example in which a legacy PDCCH, a PDSCH, and an E-PDCCH are multiplexed, to which the present invention may be applied.

FIG. 20 illustrates an example of the mapping of modulation symbols to a PUCCH, to which the present invention may be applied.

FIG. 21 illustrates detailed examples of a PUCCH based on each TTI length, to which the present invention may be applied.

FIG. 22 illustrates the structure of a PUCCH when only LR-PUCCHs are multiplexed, to which the present invention may be applied.

FIG. 23 illustrates the structure of a PUCCH using a base sequence to which the present invention may be applied.

FIG. 24 illustrates another PUCCH structure using a base sequence to which the present invention may be applied.

FIG. 25 illustrates yet another PUCCH structure using a base sequence, to which the present invention may be applied.

FIG. 26 illustrates an example of an FDM method between transmission regions for each cell, to which the present invention may be applied.

FIG. 27 illustrates an example in which ACK/NACK and a scheduling request (SR) are transmitted together using a base sequence, to which the present invention may be applied.

FIG. 28 illustrates an example of multiplexing between UEs using a 4-symbol unit TTI and UEs using a 7-symbol unit TTI, to which the present invention may be applied.

FIG. 29 illustrates an example in which a CS index for a symbol shared between TTIs is allocated, to which the present invention may be applied.

FIG. 30 illustrates an example in which the same UEs transmit LR-PUCCHs in neighbor TTIs sharing a symbol, to which the present invention may be applied.

FIG. 31 illustrates an example in which OCC is applied to UEs using the same TTI, to which the present invention may be applied.

FIG. 32 illustrates examples in which a UE transmits an LR-PUCCH without sharing a symbol, to which the present invention may be applied.

FIG. 33 illustrates an example in which a CS index is allocated for each antenna port, to which the present invention may be applied.

FIG. 34 illustrates an example of a PUCCH to which OCC is applied in a frequency region, to which the present invention may be applied.

FIG. 35 illustrates an example of the number of REs for an RS and OCC applied accordingly, to which the present invention may be applied.

FIG. 36 illustrates an example of a PUCCH structure in which multiple bits may be transmitted, to which the present invention may be applied.

FIG. 37 illustrates an example of a PUCCH structure using multiple RBs for transmitting multiple bits, to which the present invention may be applied.

FIG. 38 illustrates an example of a PUCCH structure having a comb structure in which multiple bits may be transmitted, to which the present invention may be applied.

FIG. 39 illustrates an example of a PUCCH structure having a comb structure for a DMRS, to which the present invention may be applied.

FIG. 40 illustrates other examples of a PUCCH structure using a DMRS comb structure to which the present invention may be applied.

FIG. 41 illustrates examples of a PUCCH structure having a comb structure in which a multi-symbol unit TTI is taken into consideration, to which the present invention may be applied.

FIG. 42 illustrates an example of a PUCCH structure of a 4-symbol TTI and a frequency hopping structure for the PUCCH, to which the present invention may be applied.

FIG. 43 illustrates an example of a frequency hopping structure when a PUCCH is transmitted in a 1-symbol TTI and a 2-symbol TTI, to which the present invention may be applied.

FIG. 44 illustrates an example of frequency hopping when a PUCCH is transmitted using a 2-symbol TTI based on a base sequence, to which the present invention may be applied.

FIG. 45 illustrates an example of PUCCH transmission to which frequency hopping has been applied in a TTI including odd-numbered symbols, to which the present invention may be applied.

FIG. 46 illustrates examples of multiplexing between a PUCCH structure to which frequency hopping has been applied and a PUCCH structure to which frequency hopping has not been applied, to which the present invention may be applied.

FIG. 47 illustrates an example of a process for a method for a UE to transmit uplink information to which the present invention may be applied.

FIG. 48 illustrates an example of the internal block diagram of a wireless communication apparatus to which the present invention may be applied.

MODE FOR INVENTION

Hereinafter, preferred embodiments of the present invention will be described in detail with reference to the accompanying drawings. A detailed description to be disclosed below together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as global system for mobile communications (GSM)/general packet radio service (GPRS)/enhanced data rates for GSM Evolution (EDGE). The OFDMA may be implemented as radio technology such as IEEE 802.11(Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

In FIG. 1, the size of the radio frame in the time domain is represented by a multiple of a time unit of $T\_s=1/(15000*2048)$. The downlink and uplink transmissions are composed of radio frames having intervals of $T\_f=307200*T\_s=10$ ms.

FIG. 1(a) illustrates the type 1 radio frame structure. The type 1 radio frame may be applied to both full duplex FDD and half duplex FDD.

The radio frame includes 10 subframes. One radio frame includes 20 slots each having a length of $T\_slot=15360*T\_s=0.5$ ms. Indices 0 to 19 are assigned to the respective slots. One subframe includes two contiguous slots in the time domain, and a subframe i includes a slot 2i and a slot 2i+1. The time taken to send one subframe is called a transmission time interval (TTI). For example, the length of one subframe may be 1 ms, and the length of one slot may be 0.5 ms.

In FDD, uplink transmission and downlink transmission are classified in the frequency domain. There is no restriction to full duplex FDD, whereas a UE is unable to perform transmission and reception at the same time in a half duplex FDD operation.

One slot includes a plurality of orthogonal frequency division multiplexing (OFDM) symbols in the time domain and includes a plurality of resource blocks (RBs) in the frequency domain. An OFDM symbol is for expressing one symbol period because 3GPP LTE uses OFDMA in downlink. The OFDM symbol may also be called an SC-FDMA symbol or a symbol period. The resource block is a resource allocation unit and includes a plurality of contiguous subcarriers in one slot.

FIG. 1(b) shows the type 2 radio frame structure.

The type 2 radio frame structure includes 2 half frames each having a length of $153600*T\_s=5$ ms. Each of the half frames includes 5 subframes each having a length of $30720*T\_s=1$ ms.

In the type 2 radio frame structure of a TDD system, an uplink-downlink configuration is a rule showing how uplink and downlink are allocated (or reserved) with respect to all of subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio frame.

The DwPTS is used for initial cell search, synchronization or channel estimation by a UE. The UpPTS is used for an eNB to perform channel estimation and for a UE to perform uplink transmission synchronization. The GP is an interval for removing interference occurring in uplink due to the multi-path delay of a downlink signal between uplink and downlink.

Each subframe i includes the slot 2i and the slot 2i+1 each having "$T\_slot=15360*T\_s=0.5$ ms."

The uplink-downlink configuration may be divided into seven types. The location and/or number of downlink subframes, special subframes, and uplink subframes are different in the seven types.

A point of time changed from downlink to uplink or a point of time changed from uplink to downlink is called a switching point. Switch-point periodicity means a cycle in which a form in which an uplink subframe and a downlink subframe switch is repeated in the same manner. The switch-point periodicity supports both 5 ms and 10 ms. In the case of a cycle of the 5 ms downlink-uplink switching point, the special subframe S is present in each half frame. In the case of the cycle of the 5 ms downlink-uplink switching point, the special subframe S is present only in the first half frame.

In all of the seven configurations, No. 0 and No. 5 subframes and DwPTSs are an interval for only downlink transmission. The UpPTSs, the subframes, and a subframe subsequent to the subframes are always an interval for uplink transmission.

Both an eNB and a UE may be aware of such uplink-downlink configurations as system information. The eNB may notify the UE of a change in the uplink-downlink allocation state of a radio frame by sending only the index of configuration information whenever uplink-downlink configuration information is changed. Furthermore, the configuration information is a kind of downlink control information. Like scheduling information, the configuration information may be transmitted through a physical downlink control channel (PDCCH) and may be transmitted to all of UEs within a cell in common through a broadcast channel as broadcast information.

Table 2 shows a configuration (i.e., the length of a DwPTS/GP/UpPTS) of the special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of the radio frame according to the example of FIG. 1 is only one example. The number of subcarriers included in one radio frame, the number of slots included in one subframe, and the number of OFDM symbols included in one slot may be changed in various manners.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Enhanced PDCCH (EPDCCH) carries UE-specific signaling. The EPDCCH is located in a physical resource block (PRB) that is set to be terminal specific. In other words, as described above, the PDCCH can be transmitted in up to three OFDM symbols in the first slot in the subframe, but the EPDCCH can be transmitted in a resource region other than the PDCCH. The time (i.e., symbol) at which the EPDCCH in the subframe starts may be set in the UE through higher layer signaling (e.g., RRC signaling, etc.).

The EPDCCH is a transport format, a resource allocation and HARQ information associated with the DL-SCH and a transport format, a resource allocation and HARQ information associated with the UL-SCH, and resource allocation information associated with SL-SCH (Sidelink Shared Channel) and PSCCH Information, and so on. Multiple EPDCCHs may be supported and the terminal may monitor the set of EPCCHs.

The EPDCCH can be transmitted using one or more successive advanced CCEs (ECCEs), and the number of ECCEs per EPDCCH can be determined for each EPDCCH format.

Each ECCE may be composed of a plurality of enhanced resource element groups (EREGs). EREG is used to define the mapping of ECCE to RE. There are 16 EREGs per PRB pair. All REs are numbered from 0 to 15 in the order in which the frequency increases, except for the RE that carries the DMRS in each PRB pair.

The UE can monitor a plurality of EPDCCHs. For example, one or two EPDCCH sets may be set in one PRB pair in which the terminal monitors the EPDCCH transmission.

Different coding rates can be realized for the EPCCH by merging different numbers of ECCEs. The EPCCH may use localized transmission or distributed transmission, which may result in different mapping of the ECCE to the REs in the PRB.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Physical Uplink Control Channel (PUCCH)

The uplink control information (UCI) transmitted through the PUCCH may include a scheduling request (SR), HARQ ACK/NACK information, and downlink channel measurement information.

The HARQ ACK/NACK information may be generated according to a downlink data packet on the PDSCH is successfully decoded. In the existing wireless communication system, 1 bit is transmitted as ACK/NACK information with respect to downlink single codeword transmission and 2 bits are transmitted as the ACK/NACK information with respect to downlink 2-codeword transmission.

The channel measurement information which designates feedback information associated with a multiple input multiple output (MIMO) technique may include a channel quality indicator (CQI), a precoding matrix index (PMI), and a rank indicator (RI). The channel measurement information may also be collectively expressed as the CQI.

20 bits may be used per subframe for transmitting the CQI.

The PUCCH may be modulated by using binary phase shift keying (BPSK) and quadrature phase shift keying (QPSK) techniques. Control information of a plurality of terminals may be transmitted through the PUCCH and when code division multiplexing (CDM) is performed to distinguish signals of the respective terminals, a constant amplitude zero autocorrelation (CAZAC) sequence having a length of 12 is primary used. Since the CAZAC sequence has a characteristic to maintain a predetermined amplitude in the time domain and the frequency domain, the CAZAC sequence has a property suitable for increasing coverage by decreasing a peak-to-average power ratio (PAPR) or cubic metric (CM) of the terminal. Further, the ACK/NACK information for downlink data transmission performed through the PUCCH is covered by using an orthogonal sequence or an orthogonal cover (OC).

Further, the control information transmitted on the PUCCH may be distinguished by using a cyclically shifted sequence having different cyclic shift (CS) values. The cyclically shifted sequence may be generated by cyclically shifting a base sequence by a specific cyclic shift (CS) amount. The specific CS amount is indicated by the cyclic shift (CS) index. The number of usable cyclic shifts may vary depending on delay spread of the channel. Various types of sequences may be used as the base sequence the CAZAC sequence is one example of the corresponding sequence.

Further, the amount of control information which the terminal may transmit in one subframe may be determined according to the number (that is, SC-FDMA symbols other an SC-FDMA symbol used for transmitting a reference signal (RS) for coherent detection of the PUCCH) of SC-FDMA symbols which are usable for transmitting the control information.

In the 3GPP LTE system, the PUCCH is defined as a total of 7 different formats according to the transmitted control information, a modulation technique, the amount of control information, and the like and an attribute of the uplink control information (UCI) transmitted according to each PUCCH format may be summarized as shown in Table 3 given below.

TABLE 3

| PUCCH Format | Uplink Control Information(UCI) |
|---|---|
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

PUCCH format 1 is used for transmitting only the SR. A waveform which is not modulated is adopted in the case of transmitting only the SR and this will be described below in detail.

PUCCH format 1a or 1b is used for transmitting the HARQ ACK/NACK. PUCCH format 1a or 1b may be used when only the HARQ ACK/NACK is transmitted in a predetermined subframe. Alternatively, the HARQ ACK/

NACK and the SR may be transmitted in the same subframe by using PUCCH format 1a or 1b.

PUCCH format 2 is used for transmitting the CQI and PUCCH format 2a or 2b is used for transmitting the CQI and the HARQ ACK/NACK.

In the case of an extended CP, PUCCH format 2 may be transmitted for transmitting the CQI and the HARQ ACK/NACK.

FIG. 5 illustrates one example of a type in which PUCCH formats are mapped to a PUCCH region of an uplink physical resource block in the wireless communication system to which the present invention can be applied.

In FIG. 5, $N_{RB}^{UL}$ represents the number of resource blocks in the uplink and $0, 1, \ldots, N_{RB}^{UL}-1$ mean numbers of physical resource blocks. Basically, the PUCCH is mapped to both edges of an uplink frequency block. As illustrated in FIG. 5, PUCCH format 2/2a/2b is mapped to a PUCCH region expressed as m=0, 1 and this may be expressed in such a manner that PUCCH format 2/2a/2b is mapped to resource blocks positioned at a band edge. Further, both PUCCH format 2/2a/2b and PUCCH format 1/1a/1b may be mixedly mapped to a PUCCH region expressed as m=2. Next, PUCCH format 1/1a/1b may be mapped to a PUCCH region expressed as m=3, 4, and 5. The number ($N_{RB}^{(2)}$) of PUCCH RBs which are usable by PUCCH format 2/2a/2b may be indicated to terminals in the cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency wise (alternatively, a frequency resolution) to be measured may be controlled by the base station. In the time domain, periodic and aperiodic CQI reporting may be supported. PUCCH format 2 may be used for only the periodic reporting and the PUSCH may be used for aperiodic reporting. In the case of the aperiodic reporting, the base station may instruct the terminal to transmit a scheduling resource loaded with individual CQI reporting for the uplink data transmission.

FIG. 6 illustrates a structure of a CQI channel in the case of a general CP in the wireless communication system to which the present invention can be applied.

In SC-FDMA symbols 0 to 6 of one slot, SC-FDMA symbols 1 and 5 (second and sixth symbols) may be used for transmitting a demodulation reference signal and the CQI information may be transmitted in the residual SC-FDMA symbols. Meanwhile, in the case of the extended CP, one SC-FDMA symbol (SC-FDMA symbol 3) is used for transmitting the DMRS.

In PUCCH format 2/2a/2b, modulation by the CAZAC sequence is supported and the CAZAC sequence having the length of 12 is multiplied by a QPSK-modulated symbol. The cyclic shift (CS) of the sequence is changed between the symbol and the slot. The orthogonal covering is used with respect to the DMRS.

The reference signal (DMRS) is loaded on two SC-FDMA symbols separated from each other by 3 SC-FDMA symbols among 7 SC-FDMA symbols included in one slot and the CQI information is loaded on 5 residual SC-FDMA symbols. Two RSs are used in one slot in order to support a high-speed terminal. Further, the respective terminals are distinguished by using the CS sequence. CQI information symbols are modulated and transferred to all SC-FDMA symbols and the SC-FDMA symbol is constituted by one sequence. That is, the terminal modulates and transmits the CQI to each sequence.

The number of symbols which may be transmitted to one TTI is 10 and modulation of the CQI information is determined up to QPSK. When QPSK mapping is used for the SC-FDMA symbol, since a CQI value of 2 bits may be loaded, a CQI value of 10 bits may be loaded on one slot. Therefore, a CQI value of a maximum of 20 bits may be loaded on one subframe. A frequency domain spread code is used for spreading the CQI information in the frequency domain.

The CAZAC sequence (for example, ZC sequence) having the length of 12 may be used as the frequency domain spread code. CAZAC sequences having different CS values may be applied to the respective control channels to be distinguished from each other. IFFT is performed with respect to the CQI information in which the frequency domain is spread.

12 different terminals may be orthogonally multiplexed on the same PUCCH RB by a cyclic shift having 12 equivalent intervals. In the case of a general CP, a DMRS sequence on SC-FDMA symbol 1 and 5 (on SC-FDMA symbol 3 in the case of the extended CP) is similar to a CQI signal sequence on the frequency domain, but the modulation of the CQI information is not adopted.

The terminal may be semi-statically configured by upper-layer signaling so as to periodically report different CQI, PMI, and RI types on PUCCH resources indicated as PUCCH resource indexes ($n_{PUCCH}^{(1,\tilde{p})}$, $n_{PUCCH}^{(2,\tilde{p})}$, and $n_{PUCCH}^{(3,\tilde{p})}$). Herein, the PUCCH resource index ($n_{PUCCH}^{(2,\tilde{p})}$) is information indicating the PUCCH region used for PUCCH format 2/2a/2b and a CS value to be used.

PUCCH Channel Structure

PUCCH formats 1a and 1b are described.

In PUCCH format 1a and 1b, the CAZAC sequence having the length of 12 is multiplied by a symbol modulated by using a BPSK or QPSK modulation scheme. For example, a result acquired by multiplying a modulated symbol d(0) by a CAZAC sequence r(n) (n=0, 1, 2, ..., N−1) having a length of N becomes y(0), y(1), y(2), ..., y(N−1). y(0), ..., y(N−1) symbols may be designated as a block of symbols. The modulated symbol is multiplied by the CAZAC sequence and thereafter, the block-wise spread using the orthogonal sequence is adopted.

A Hadamard sequence having a length of 4 is used with respect to general ACK/NACK information and a discrete Fourier transform (DFT) sequence having a length of 3 is used with respect to the ACK/NACK information and the reference signal.

The Hadamard sequence having the length of 2 is used with respect to the reference signal in the case of the extended CP.

FIG. 7 illustrates a structure of an ACK/NACK channel in the case of a general CP in the wireless communication system to which the present invention can be applied.

In FIG. 7, a PUCCH channel structure for transmitting the HARQ ACK/NACK without the CQI is exemplarily illustrated.

The reference signal (DMRS) is loaded on three consecutive SC-FDMA symbols in a middle part among 7 SC-FDMA symbols and the ACK/NACK signal is loaded on 4 residual SC-FDMA symbols.

Meanwhile, in the case of the extended CP, the RS may be loaded on two consecutive symbols in the middle part. The number of and the positions of symbols used in the RS may vary depending on the control channel and the numbers and the positions of symbols used in the ACK/NACK signal associated with the positions of symbols used in the RS may also correspondingly vary depending on the control channel.

Acknowledgment response information (not scrambled status) of 1 bit and 2 bits may be expressed as one HARQ ACK/NACK modulated symbol by using the BPSK and QPSK modulation techniques, respectively. A positive acknowledgement response (ACK) may be encoded as '1' and a negative acknowledgment response (NACK) may be encoded as '0'.

When a control signal is transmitted in an allocated band, 2-dimensional (D) spread is adopted in order to increase a multiplexing capacity. That is, frequency domain spread and time domain spread are simultaneously adopted in order to increase the number of terminals or control channels which may be multiplexed.

A frequency domain sequence is used as the base sequence in order to spread the ACK/NACK signal in the frequency domain. A Zadoff-Chu (ZC) sequence which is one of the CAZAC sequences may be used as the frequency domain sequence. For example, different CSs are applied to the ZC sequence which is the base sequence, and as a result, multiplexing different terminals or different control channels may be applied. The number of CS resources supported in an SC-FDMA symbol for PUCCH RBs for HARQ ACK/NACK transmission is set by a cell-specific upper-layer signaling parameter ($\Delta_{shift}^{PUCCH}$).

The ACK/NACK signal which is frequency-domain spread is spread in the time domain by using an orthogonal spreading code. As the orthogonal spreading code, a Walsh-Hadamard sequence or DFT sequence may be used. For example, the ACK/NACK signal may be spread by using an orthogonal sequence (w0, w1, w2, and w3) having the length of 4 with respect to 4 symbols. Further, the RS is also spread through an orthogonal sequence having the length of 3 or 2. This is referred to as orthogonal covering (OC).

Multiple terminals may be multiplexed by a code division multiplexing (CDM) scheme by using the CS resources in the frequency domain and the OC resources in the time domain described above. That is, ACK/NACK information and RSs of a lot of terminals may be multiplexed on the same PUCCH RB.

In respect to the time-domain spread CDM, the number of spreading codes supported with respect to the ACK/NACK information is limited by the number of RS symbols. That is, since the number of RS transmitting SC-FDMA symbols is smaller than that of ACK/NACK information transmitting SC-FDMA symbols, the multiplexing capacity of the RS is smaller than that of the ACK/NACK information.

For example, in the case of the general CP, the ACK/NACK information may be transmitted in four symbols and not 4 but 3 orthogonal spreading codes are used for the ACK/NACK information and the reason is that the number of RS transmitting symbols is limited to 3 to use only 3 orthogonal spreading codes for the RS.

In the case of the subframe of the general CP, when 3 symbols are used for transmitting the RS and 4 symbols are used for transmitting the ACK/NACK information in one slot, for example, if 6 CSs in the frequency domain and 3 orthogonal cover (OC) resources may be used, HARQ acknowledgement responses from a total of 18 different terminals may be multiplexed in one PUCCH RB. In the case of the subframe of the extended CP, when 2 symbols are used for transmitting the RS and 4 symbols are used for transmitting the ACK/NACK information in one slot, for example, if 6 CSs in the frequency domain and 2 orthogonal cover (OC) resources may be used, the HARQ acknowl-edgement responses from a total of 12 different terminals may be multiplexed in one PUCCH RB.

Next, PUCCH format 1 is described. The scheduling request (SR) is transmitted by a scheme in which the terminal requests scheduling or does not request the scheduling. An SR channel reuses an ACK/NACK channel structure in PUCCH format 1a/1b and is configured by an on-off keying (OOK) scheme based on an ACK/NACK channel design. In the SR channel, the reference signal is not transmitted. Therefore, in the case of the general CP, a sequence having a length of 7 is used and in the case of the extended CP, a sequence having a length of 6 is used. Different cyclic shifts (CSs) or orthogonal covers (OCs) may be allocated to the SR and the ACK/NACK. That is, the terminal transmits the HARQ ACK/NACK through a resource allocated for the SR in order to transmit a positive SR. The terminal transmits the HARQ ACK/NACK through a resource allocated for the ACK/NACK in order to transmit a negative SR.

Next, an enhanced-PUCCH (e-PUCCH) format is described. An e-PUCCH may correspond to PUCCH format 3 of an LTE-A system. A block spreading technique may be applied to ACK/NACK transmission using PUCCH format 3.

PUCCH Piggybacking in Rel-8 LTE

FIG. 8 illustrates one example of transport channel processing of a UL-SCH in the wireless communication system to which the present invention can be applied.

In a 3GPP LTE system (=E-UTRA, Rel. 8), in the case of the UL, single carrier transmission having an excellent peak-to-average power ratio (PAPR) or cubic metric (CM) characteristic which influences the performance of a power amplifier is maintained for efficient utilization of the power amplifier of the terminal. That is, in the case of transmitting the PUSCH of the existing LTE system, data to be transmitted may maintain the single carrier characteristic through DFT-precoding and in the case of transmitting the PUCCH, information is transmitted while being loaded on a sequence having the single carrier characteristic to maintain the single carrier characteristic. However, when the data to be DFT-precoded is non-contiguously allocated to a frequency axis or the PUSCH and the PUCCH are simultaneously transmitted, the single carrier characteristic deteriorates. Therefore, when the PUSCH is transmitted in the same subframe as the transmission of the PUCCH as illustrated in FIG. 11, uplink control information (UCI) to be transmitted to the PUCCH is transmitted (piggyback) together with data through the PUSCH.

Since the PUCCH and the PUSCH may not be simultaneously transmitted as described above, the existing LTE terminal uses a method that multiplexes uplink control information (UCI) (CQI/PMI, HARQ-ACK, RI, and the like) to the PUSCH region in a subframe in which the PUSCH is transmitted.

As one example, when the channel quality indicator (CQI) and/or precoding matrix indicator (PMI) needs to be transmitted in a subframe allocated to transmit the PUSCH, UL-SCH data and the CQI/PMI are multiplexed after DFT-spreading to transmit both control information and data. In this case, the UL-SCH data is rate-matched by considering a CQI/PMI resource. Further, a scheme is used, in which control information such as the HARQ ACK, the RI, and the like punctures the UL-SCH data to be multiplexed to the PUSCH region.

FIG. 9 illustrates one example of a signal processing process of an uplink share channel of a transport channel in the wireless communication system to which the present invention can be applied.

Herein, the signal processing process of the uplink share channel (hereinafter, referred to as "UL-SCH") may be applied to one or more transport channels or control information types.

Referring to FIG. 9, the UL-SCH transfers data to a coding unit in the form of a transport block (TB) once every a transmission time interval (TTI).

A CRC parity bit $p_0, p_1, p_2, p_3, \ldots, p_{L-1}$ is attached to a bit of the transport block received from the upper layer (S120). In this case, A represents the size of the transport block and L represents the number of parity bits. Input bits to which the CRC is attached are shown in $b_0, b_1, b_2, b_3, \ldots, b_{B-1}$. In this case, B represents the number of bits of the transport block including the CRC.

$b_0, b_1, b_2, b_3, \ldots, b_{B-1}$ is segmented into multiple code blocks (CBs) according to the size of the TB and the CRC is attached to multiple segmented CBs (S121). Bits after the code block segmentation and the CRC attachment are shown in $c_{r0}, c_{r1}, c_{r2}, c_{r3}, \ldots, c_{r(K_r-1)}$. Herein, r represents No. (r=0, ..., C−1) of the code block and $K_r$ represents the bit number depending on the code block r. Further, C represents the total number of code blocks.

Subsequently, channel coding is performed (S122). Output bits after the channel coding are shown in $d_{r0}^{(i)}, d_{r1}^{(i)}, d_{r2}^{(i)}, d_{r3}^{(i)}, \ldots, d_{r(D_r-1)}^{(i)}$. In this case, i represents an encoded stream index and may have a value of 0, 1, or 2. $D_r$ represents the number of bits of the i-th encoded stream for the code block r. r represents the code block number (r=0, ..., C−1) and C represents the total number of code blocks. Each code block may be encoded by turbo coding.

Subsequently, rate matching is performed (S123). Bits after the rate matching are shown in $e_{r0}, e_{r1}, e_{r2}, e_{r3}, \ldots, e_{r(E_r-1)}$. In this case, r represents the code block number (r=0, ..., C−1) and C represents the total number of code blocks. $E_r$ represents the number of rate-matched bits of the r-th code block.

Subsequently, concatenation among the code blocks is performed again (S124). Bits after the concatenation of the code blocks is performed are shown in $f_0, f_1, f_2, f_3, \ldots, f_{G-1}$. In this case, G represents the total number of bits encoded for transmission and when the control information is multiplexed with the UL-SCH, the number of bits used for transmitting the control information is not included.

Meanwhile, when the control information is transmitted in the PUSCH, channel coding of the CQI/PMI, the RI, and the ACK/NACK which are the control information is independently performed (S126, S127, and S128). Since different encoded symbols are allocated for transmitting each control information, the respective control information has different coding rates.

In time division duplex (TDD), as an ACK/NACK feedback mode, two modes of ACK/NACK bundling and ACK/NACK multiplexing are supported by an upper-layer configuration. ACK/NACK information bits for the ACK/NACK bundling are constituted by 1 bit or 2 bits and ACK/NACK information bits for the ACK/NACK multiplexing are constituted by 1 to 4 bits.

After the concatenation among the code blocks in step S134, encoded bits $f_0, f_1, f_2, f_3, \ldots, f_{G-1}$ of the UL-SCH data and encoded bits $q_0, q_1, q_2, q_3, \ldots, q_{N_L \cdot Q_{CQI}-1}$ of the CQI/PMI are multiplexed (S125). A multiplexed result of the data and the CQI/PMI is shown in $g_0, g_1, g_2, g_3, \ldots g_{H'-1}$. In this case, $g_i$ (i=0, ..., H'−1) represents a column vector having a length of $(Q_m \cdot N_L)$. $H=(G+N_L \cdot Q_{CQI})$, and $H'=H/(N_L \cdot Q_m)$. $N_L$ represents the number of layers mapped to a UL-SCH transport block and H represents the total number of encoded bits allocated to $N_L$ transport layers mapped with the transport block for the UL-SCH data and the CQI/PMI information.

Subsequently, the multiplexed data and CQI/PMI, a channel encoded RI, and the ACK/NACK are channel-interleaved to generate an output signal (S129).

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

Furthermore, recently, most of mobile communication systems use a method capable of improving transmission/reception data efficiency by adopting multiple transmission antennas and multiple reception antennas instead of the existing method of using one transmission antenna and one reception antenna when a packet is transmitted.

When the data is transmitted and received by using the MIMO antenna, a channel state between the transmitting antenna and the receiving antenna need to be detected in order to accurately receive the signal. Therefore, the respective transmitting antennas need to have individual reference signals.

The downlink reference signal includes a common RS (CRS) shared by all terminals in one cell and a dedicated RS (DRS) for a specific terminal. Information for demodulation and channel measurement may be provided by using the reference signals.

The receiver side (that is, terminal) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as the UE-specific RS or the demodulation RS (DMRS).

In a mobile communication system, a reference signal (RS) may be basically divided into two depending on its purpose. There are an RS having an object of obtaining channel information and an RS used for data demodulation. The former must be transmitted in a wide band because it has an object for a UE to obtain downlink channel information, and a UE that does not receive downlink data in a specific subframe must be able to receive and measure a corresponding RS. Furthermore, the former is also used for the measurement of handover. The latter is an RS also transmitted in a corresponding resource by an eNB when performs downlink transmission. A UE may perform channel measurement by receiving a corresponding RS and may demodulate data. This RS must be transmitted in a region in which data is transmitted.

In the Release 8 LTE system, two types of downlink RSs have been defined for unicast service. The two types of RSs include a common RS (CRS) for the acquisition of information on a channel state and the measurement of handover, and a UE-specific RS also called a dedicated RS used for data demodulation. In the Release 8 LTE system, the UE-specific RS is used for only data demodulation, and the CRS is used for the two objects of channel information acquisition and data demodulation. The CRS is a cell-specific signal and is transmitted every subframe with respect to a wide band. A cell-specific CRS transmits an RS for a maximum of 4 the antenna port based on the number of transmission antennas of an eNB. For example, if the number of transmission antennas of an eNB is two, CRSs for Nos. 0 and 1 the antenna port are transmitted. If the number of transmission antennas of an eNB is four, CRSs for Nos. 0-3 the antenna port are transmitted.

Furthermore, in the LTE system, if a CRS has been mapped to a time-frequency resource, an RS for one antenna port in the frequency axis is mapped to 1 RE per 6 REs and transmitted.

FIG. 10 illustrates examples of a cell-specific reference signal (CRS) pattern in 1 resource block (RB) to which the present invention may be applied.

FIG. 10(a) is a case where the transmission antennas of an eNB are 4, and CRSs corresponding to Nos. 0 to 3 the antenna port are transmitted. Furthermore, FIG. 10(b) is a case where the transmission antenna of an eNB is 1, and a CRS corresponding to No. 1 antenna port is transmitted.

Furthermore, an LTE-A system of a form advanced from the LTE system needs to be designed to support a maximum of 8 transmission antennas in the downlink of an eNB. Accordingly, RSs for a maximum of 8 transmission antennas must be supported. In the LTE system, only RSs for a maximum of 4 the antenna port have been defined with respect to a downlink RS. In the LTE-A system, if an eNB has a maximum of 8 downlink transmission antennas equal to or greater than 4, RSs for an antenna port must be additionally defined. In the RSs for a maximum of 8 transmission antenna ports, the two types of the RS for channel measurement and the RS for data demodulation must be designed.

One of important factors that need to be taken into consideration in designing the LTE-A system is backward compatibility, that is, that an LTE UE must well operation even in the LTE-A system and a system must support this. From a viewpoint of RS transmission, RSs for a maximum of 8 transmission antenna ports must be additionally defined in the time-frequency region in which a CRS defined in LTE is transmitted in a full band every subframe. In the LTE-A system, if an RS pattern for a maximum of 8 transmission antennas is added to a full band every subframe using a method, such as the existing CRS of LTE, RS overhead is excessively increased. Accordingly, in the LTE-A system, a newly designed RS is basically divided into two. The two RSs include a channel state information-RS or a channel state indication-RS (CSI-RS) of a channel measurement object for the selection of an MCS or a PMI and a data demodulation RS (DM-RS) for data demodulation transmitted through 8 transmission antennas. The CSI-RS of the channel measurement object is characterized in that it is designed for an object focused on channel measurement unlike the existing CRS is used for objects, such as channel measurement and measurement of handover, and also used for data demodulation. Furthermore, the CSI-RS may also be used for an object the measurement of handover. The CSI-RS does not need to be transmitted every subframe unlike a CRS because the CSI-RS is transmitted for only an object of obtaining information on a channel state. In order to reduce overhead of a CSI-RS, the CSI-RS is intermittently transmitted in the time axis, and a DM RS is transmitted in such a way as to be dedicated to a scheduled UE in a corresponding time-frequency region for data demodulation. That is, a DM-RS for a specific UE is transmitted only in the region in which the corresponding UE has been scheduled, that is, in a time-frequency region in which data is received.

FIG. 11 illustrates a reference signal pattern mapped to a downlink resource block pair in the wireless communication system to which the present invention can be applied.

Referring to FIG. 11, as a wise in which the reference signal is mapped, the downlink resource block pair may be expressed by one subframe in the timedomain×12 subcarriers in the frequency domain. That is, one resource block pair has a length of 14 OFDM symbols in the case of a normal cyclic prefix (CP) (FIG. 15a) and a length of 12 OFDM symbols in the case of an extended cyclic prefix (CP) (FIG. 15b). Resource elements (REs) represented as '0', '1', '2', and '3' in a resource block lattice mean the positions of the CRSs of antenna port indexes '0', '1', '2', and '3', respectively and resource elements represented as 'D' means the position of the DRS.

Hereinafter, when the CRS is described in more detail, the CRS is used to estimate a channel of a physical antenna and distributed in a whole frequency band as the reference signal which may be commonly received by all terminals positioned in the cell. Further, the CRS may be used to demodulate the channel quality information (CSI) and data.

The CRS is defined as various formats according to an antenna array at the transmitter side (base station). The 3GPP LTE system (for example, release-8) supports various antenna arrays and a downlink signal transmitting side has three types of antenna arrays of three single transmitting antennas, two transmitting antennas, and four transmitting antennas. When the base station uses the single transmitting antenna, a reference signal for a single antenna port is arrayed. When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule of mapping the CRS to the resource block is defined as below.

$$k = 6m + (v + v_{shift}) \bmod 6 \quad \text{[Equation 1]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 1, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink. $n_s$ represents a slot index and, $N_{ID}^{cell}$ represents a cell ID. mod represents an modulo operation. The position of the reference signal varies depending on the $v_{shift}$ value in the frequency domain. Since $v_{shift}$ is subordinated to the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 2 shows the case of the normal CP and Equation 3 shows the case of the extended CP.

$$k = (k') \bmod N_{sc}^{RB} + N_{sc}^{RB} \cdot n_{PRB} \quad \text{[Equation 2]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 3]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 1 to 3 given above, k and p represent the subcarrier index and the antenna port, respectively. $N_{RB}^{DL}$, $n_s$, and $N_{ID}^{cell}$ represent the number of RBs, the number of slot indexes, and the number of cell IDs allocated to the downlink, respectively. The position of the RS varies depending on the $v_{shift}$ value in terms of the frequency domain.

In Equations 2 and 3, k and l represent the subcarrier index and the symbol index, respectively and p represents the antenna port. $N_{sc}^{RB}$ represents the size of the resource block in the frequency domain and is expressed as the number of subcarriers. $n_{PRB}$ represents the number of physical resource blocks. $N_{RB}^{PDSCH}$ represents a frequency band of the resource block for the PDSCH transmission. $n_d$ represents the slot index and $N_{ID}^{cell}$ represents the cell ID. mod represents the modulo operation. The position of the reference signal varies depending on the $v_{shift}$ value in the frequency domain. Since $v_{shift}$ is subordinated to the cell ID, the position of the reference signal has various frequency shift values according to the cell.

Sounding Reference Signal (SRS)

The SRS is primarily used for the channel quality measurement in order to perform frequency-selective scheduling and is not associated with transmission of the uplink data and/or control information. However, the SRS is not limited thereto and the SRS may be used for various other purposes for supporting improvement of power control and various start-up functions of terminals which have not been scheduled. One example of the start-up function may include an initial modulation and coding scheme (MCS), initial power control for data transmission, timing advance, and frequency semi-selective scheduling. In this case, the frequency semi-selective scheduling means scheduling that selectively allocates the frequency resource to the first slot of the subframe and allocates the frequency resource by pseudo-randomly hopping to another frequency in the second slot.

Further, the SRS may be used for measuring the downlink channel quality on the assumption that the radio channels between the uplink and the downlink are reciprocal. The assumption is valid particularly in the time division duplex in which the uplink and the downlink share the same frequency spectrum and are divided in the time domain.

Subframes of the SRS transmitted by any terminal in the cell may be expressed by a cell-specific broadcasting signal. A 4-bit cell-specific 'srsSubframeConfiguration' parameter represents 15 available subframe arrays in which the SRS may be transmitted through each radio frame. By the arrays, flexibility for adjustment of the SRS overhead is provided according to a deployment scenario.

A 16-th array among them completely turns off a switch of the SRS in the cell and is suitable primarily for a serving cell that serves high-speed terminals.

FIG. 12 illustrates an uplink subframe including a sounding reference signal symbol in the wireless communication system to which the present invention can be applied.

Referring to FIG. 12, the SRS is continuously transmitted through a last SC FDMA symbol on the arrayed subframes. Therefore, the SRS and the DMRS are positioned at different SC-FDMA symbols.

The PUSCH data transmission is not permitted in a specific SC-FDMA symbol for the SRS transmission and consequently, when sounding overhead is highest, that is, even when the SRS symbol is included in all subframes, the sounding overhead does not exceed approximately 7%.

Each SRS symbol is generated by a base sequence (random sequence or a sequence set based on Zadoff-Ch (ZC)) associated with a given time wise and a given frequency band and all terminals in the same cell use the same base sequence. In this case, SRS transmissions from a plurality of terminals in the same cell in the same frequency band and at the same time are orthogonal to each other by different cyclic shifts of the base sequence to be distinguished from each other.

SRS sequences from different cells may be distinguished fro each other by allocating different base sequences to respective cells, but orthogonality among different base sequences is not assured.

General Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRCConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

FIG. 13 illustrates examples of a component carrier and carrier aggregation in the wireless communication system to which the present invention can be applied.

FIG. 13a illustrates a single carrier structure used in an LTE system. The component carrier includes the DL CC and the UL CC. One component carrier may have a frequency range of 20 MHz.

FIG. 13b illustrates a carrier aggregation structure used in the LTE system. In the case of FIG. 9b, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Cross Carrier Scheduling

In the carrier aggregation system, in terms of scheduling for the carrier or the serving cell, two types of a self-scheduling method and a cross carrier scheduling method are provided. The cross carrier scheduling may be called cross component carrier scheduling or cross cell scheduling.

The cross carrier scheduling means transmitting the PDCCH (DL grant) and the PDSCH to different respective DL CCs or transmitting the PUSCH transmitted according to the PDCCH (UL grant) transmitted in the DL CC through other UL CC other than a UL CC linked with the DL CC receiving the UL grant.

Whether to perform the cross carrier scheduling may be UE-specifically activated or deactivated and semi-statically known for each terminal through the upper-layer signaling (for example, RRC signaling).

When the cross carrier scheduling is activated, a carrier indicator field (CIF) indicating through which DL/UL CC the PDSCH/PUSCH the PDSCH/PUSCH indicated by the corresponding PDCCH is transmitted is required. For example, the PDCCH may allocate the PDSCH resource or the PUSCH resource to one of multiple component carriers by using the CIF. That is, the CIF is set when the PDSCH or PUSCH resource is allocated to one of DL/UL CCs in which the PDCCH on the DL CC is multiply aggregated. In this case, a DCI format of LTE-A Release-8 may extend according to the CIF. In this case, the set CIF may be fixed to a 3-bit field and the position of the set CIF may be fixed regardless of the size of the DCI format. Further, a PDCCH structure (the same coding and the same CCE based resource mapping) of the LTE-A Release-8 may be reused.

On the contrary, when the PDCCH on the DL CC allocates the PDSCH resource on the same DL CC or allocates the PUSCH resource on a UL CC which is singly linked, the CIF is not set. In this case, the same PDCCH structure (the same coding and the same CCE based resource mapping) and DCI format as the LTE-A Release-8 may be used.

When the cross carrier scheduling is possible, the terminal needs to monitor PDCCHs for a plurality of DCIs in a control region of a monitoring CC according to a transmission mode and/or a bandwidth for each CC. Therefore, a configuration and PDCCH monitoring of a search space which may support monitoring the PDCCHs for the plurality of DCIs are required.

In the carrier aggregation system, a terminal DL CC aggregate represents an aggregate of DL CCs in which the terminal is scheduled to receive the PDSCH and a terminal UL CC aggregate represents an aggregate of UL CCs in which the terminal is scheduled to transmit the PUSCH. Further, a PDCCH monitoring set represents a set of one or more DL CCs that perform the PDCCH monitoring. The PDCCH monitoring set may be the same as the terminal DL CC set or a subset of the terminal DL CC set. The PDCCH monitoring set may include at least any one of DL CCs in the terminal DL CC set. Alternatively, the PDCCH monitoring set may be defined separately regardless of the terminal DL CC set. The DL CCs included in the PDCCH monitoring set may be configured in such a manner that self-scheduling for the linked UL CC is continuously available. The terminal DL CC set, the terminal UL CC set, and the PDCCH monitoring set may be configured UE-specifically, UE group-specifically, or cell-specifically.

When the cross carrier scheduling is deactivated, the deactivation of the cross carrier scheduling means that the PDCCH monitoring set continuously means the terminal DL CC set and in this case, an indication such as separate signaling for the PDCCH monitoring set is not required. However, when the cross carrier scheduling is activated, the PDCCH monitoring set is preferably defined in the terminal DL CC set. That is, the base station transmits the PDCCH through only the PDCCH monitoring set in order to schedule the PDSCH or PUSCH for the terminal.

FIG. 14 illustrates one example of a subframe structure depending on cross carrier scheduling in the wireless communication system to which the present invention can be applied.

Referring to FIG. 14, a case is illustrated, in which three DL CCs are associated with a DL subframe for an LTE-A terminal and DL CC 'A' is configured as a PDCCH monitoring DL CC. When the CIF is not used, each DL CC may transmit the PDCCH scheduling the PDSCH thereof without the CIF. On the contrary, when the CIF is used through the upper-layer signaling, only one DL CC 'A' may transmit the PDCCH scheduling the PDSCH thereof or the PDSCH of another CC by using the CIF. In this case, DL CC 'B' and 'C' in which the PDCCH monitoring DL CC is not configured does not transmit the PDCCH.

PDCCH Assignment Procedure

A plurality of PDCCHs may be transmitted in a single subframe. That is, the control region of one subframe includes a plurality of CCEs having indices $0 \sim N_{CCE,k}-1$. In this case, $N_{CCE,k}$ means a total number of CCEs within the control region of a k-th subframe. UE monitors a plurality of PDCCHs every subframe. In this case, the term "monitoring" means that the UE attempts to decode each of PDCCHs according to the format of a monitored PDCCH. In a control region allocated within a subframe, an eNB does not provide UE with information about the position of a corresponding PDCCH. The UE is unaware that its own PDCCH is transmitted at which position in what CCE aggregation level or according to which DCI format in order to receive a control channel transmitted by the eNB. Accordingly, the UE searches for the PDCCH by monitoring a set of PDCCH candidates within a subframe. This is called blind decoding/detection (BD). Blind decoding refers to a method of demasking, by UE, its own UE ID to a CRC portion and then checking whether a corresponding PDCCH is its own control channel by reviewing a CRC error.

In active mode, UE monitors the PDCCH of each subframe in order to receive data transmitted to the UE. In DRX mode, UE wakes up in the monitoring period of each DRX cycle and monitors a PDCCH in a subframe corresponding to the monitoring period. A subframe in which the monitoring of the PDCCH is performed is called a non-DRX subframe.

In order to receive a PDCCH transmitted to UE, the UE has to perform blind decoding on all of CCEs which are present in the control region of a non-DRX subframe. The UE has to decode all of PDCCHs in a possible CCE aggregation level until blind decoding for the PDCCHs is successful within each non-DRX subframe because the UE is unaware that which PDCCH format will be transmitted. The UE has to attempt detection in all of possible CCE aggregation levels until blind decoding for the PDCCHs is successful because the UE is unaware that its own PDCCH uses how many CCEs. That is, the UE performs the blind decoding in each CCE aggregation level. That is, the UE first attempts decoding in a CCE aggregation level unit of 1. If decoding all fails, the UE attempts decoding in a CCE aggregation level unit of 2. Thereafter, the UE attempts decoding in a CCE aggregation level unit of 4 and a CCE aggregation level unit of 8. Furthermore, the UE attempts decoding on all of a C-RNTI, a P-RNTI, an SI-RNTI, and an RA-RNTI 4. Furthermore, the UE attempts decoding on all of DCI formats to be monitored.

As described above, if UE attempts blind decoding on all of DCI formats to be monitored in each of all of CCE aggregation levels with respect to all of RNTIs, the number of times of detection attempts is excessively increased. Accordingly, in the LTE system, a search space (SS) concept is defined for the blind decoding of UE. The search space means a set of PDCCH candidates to be monitored and may have a different size depending on the format of each PDCCH.

The search space may include a common search space (CSS) and a UE-specific/dedicated search space (USS). In the case of the CSS, all of pieces of UE may be aware of the size of the CSS, but the USS may be individually set for each piece of UE. Accordingly, UE has to decode both the USS and the CSS in order to decode a PDCCH. Accordingly, UE performs a maximum of pieces of 44 blind decoding (BD) in one subframe. In this case, blind decoding performed based on a different CRC value (e.g., a C-RNTI, P-RNTI, SI-RNTI or RA-RNTI) is not included in the maximum of pieces of 44 blind decoding (BD).

Due to a small search space, an eNB may not secure a CCE resource for transmitting a PDCCH to all of pieces of UE to which the PDCCH is to be transmitted within a given subframe. The reason for this is that the remaining resources left over after a CCE position is allocated may not be included in the search space of specific UE. In order to minimize such a barrier that may continue even in a next subframe, a UE-specific hopping sequence may be applied to the start point of a USS.

Table 4 illustrates the sizes of a CSS and a USS.

TABLE 4

| PDCCH format | Number of CCEs (n) | Number of candidates in common search space | Number of candidates in dedicated search space |
| --- | --- | --- | --- |
| 0 | 1 | — | 6 |
| 1 | 2 | — | 6 |
| 2 | 4 | 4 | 2 |
| 3 | 8 | 2 | 2 |

In order to reduce the computational load of UE according to the number of times of blind decoding attempts, the UE does not perform searches according to all of defined DCI formats at the same time. More specifically, the UE may always perform search for the DCI formats 0 and 1A in a USS. In this case, the DCI formats 0 and 1A have the same size, but the UE may distinguish the DCI formats using a flag for a DCI format 0/DCI format 1A differentiation included in a PDCCH. Furthermore, another DCI format in addition to the DCI formats 0 and 1A may be required for UE depending on PDSCH transmission mode set by an eNB. Examples of another DCI format include the DCI formats 1, 1B, and 2.

In a CSS, UE may search for the DCI formats 1A and 1C. Furthermore, the UE may be configured to search for the DCI format 3 or 3A. The DCI formats 3 and 3A have the same size as the DCI formats 0 and 1A, but the UE may differentiate the DCI formats using CRC scrambled by another ID not a UE-specific ID.

A search space $S_k^{(L)}$ means a set of PDCCH candidates according to an aggregation level $L \in \{1,2,4,8\}$. A CCE according to the PDCCH candidate set m of the search space may be determined by Equation 4 below.

$$L \cdot \{(Y_k+m) \bmod \lfloor N_{CCE,k}/L \rfloor\}+i \qquad \text{[Equation 4]}$$

In here, $M^{(L)}$ denotes the number of PDCCH candidates according to a CCE aggregation level L to be monitored in a search space. m=0, Λ, $M^{(L)}-1$. i is an index that designates each CCE in each of PDCCH candidates, and i=0, Λ, L−1.

As described above, UE monitors both a USS and a CSS in order to decode a PDCCH. In this case, the CSS supports PDCCHs having an aggregation level of {4, 8}, and the USS supports PDCCHs having an aggregation level of {1, 2, 4, 8}.

Table 5 illustrates PDCCH candidates monitored by UE.

TABLE 5

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Equation 4, in the case of a CSS, $Y_k$ is set to 0 with respect to two aggregation levels L=4 and L=8. In contrast, in the case of a USS, $Y_k$ is defined as in Equation 5 with respect to an aggregation level L.

$$Y_k=(A \cdot Y_{k-1}) \bmod D \qquad \text{[Equation 5]}$$

In Equation 5, $Y_{-1}=n_{RNTI} \neq 0$ the value of an RNTI used for $n_{RNTI}$ may be defined as one of the identifications (IDs) of UE. Furthermore, A=39827, D=65537, and $k=\lfloor n_s/2 \rfloor$. In this case, $n_s$ denotes a slot number (or index) in a radio frame.

General ACK/NACK Multiplexing Method

In a situation in which the terminal simultaneously needs to transmit multiple ACKs/NACKs corresponding to multiple data units received from an eNB, an ACK/NACK mulplexign method based on PUCCH resource selection may be considered in order to maintain a single-frequency characteristic of the ACK/NACK signal and reduce ACK/NACK transmission power.

Together with ACK/NACK multiplexing, contents of ACK/NACK responses for multiple data units may be identified by combining a PUCCH resource and a resource of QPSK modulation symbols used for actual ACK/NACK transmission.

For example, when one PUCCH resource may transmit 4 bits and four data units may be maximally transmitted, an ACK/NACK result may be identified in the eNB as shown in Table 3 given below.

TABLE 6

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 6 given above, HARQ-ACK(i) represents an ACK/NACK result for an i-th data unit. In Table 6 given above, discontinuous transmission (DTX) means that there is no data unit to be transmitted for the corresponding HARQ-ACK(i) or that the terminal may not detect the data unit corresponding to the HARQ-ACK(i).

According to Table 6 given above, a maximum of four PUCCH resources ($n_{PUCCH,0}^{(1)}$, $n_{PUCCH,1}^{(1)}$, $n_{PUCCH,2}^{(1)}$, and $n_{PUCCH,3}^{(1)}$) are provided and b(0) and b(1) are two bits transmitted by using a selected PUCCH.

For example, when the terminal successfully receives all of four data units, the terminal transmits 2 bits (1,1) by using $n_{PUCCH,1}^{(1)}$ When the terminal fails to decoding in first and third data units and succeeds in decoding in second and fourth data units, the terminal transmits bits (1,0) by using $n_{PUCCH,3}^{(1)}$ In ACK/NACK channel selection, when there is at least one ACK, the NACK and the DTX are coupled with each other. The reason is that a combination of the PUCCH resource and the QPSK symbol may not all ACK/NACK states. However, when there is no ACK, the DTX is decoupled from the NACK.

In this case, the PUCCH resource linked to the data unit corresponding to one definite NACK may also be reserved to transmit signals of multiple ACKs/NACKs.

Common ACK/NACK Transmission

In the LTE-A system, to transmit multiple ACK/NACK information/signals for multiple PDSCHs, transmitted through multiple DL CCs, through a specific UL component carrier (CC) is taken into consideration. To this end, unlike in ACK/NACK transmission using the PUCCH format 1a/1b in the existing Rel-8 LTE, after the channel coding (e.g., Reed-Muller code and Tail-biting convolutional code) of multiple ACK/NACK information, to transmit multiple ACK/NACK information/signals using the PUCCH format 2 or a new PUCCH format (i.e., an E-PUCCH format) of the following block spreading-based modified form may be taken into consideration.

The block spreading technique is a scheme that modulates transmission of the control signal by using the SC-FDMA scheme unlike the existing PUCCH format 1 series or 2 series. As illustrated in FIG. 15, a symbol sequence may be spread and transmitted on the time domain by using an orthogonal cover code (OCC). The control signals of the plurality of terminals may be multiplexed on the same RB by using the OCC. In the case of PUCCH format 2 described above, one symbol sequence is transmitted throughout the time domain and the control signals of the plurality of terminals are multiplexed by using the cyclic shift (CS) of the CAZAC sequence, while in the case of a block spreading based on PUCCH format (for example, PUCCH format 3), one symbol sequence is transmitted throughout the frequency domain and the control signals of the plurality of terminals are multiplexed by using the time domain spreading using the OCC.

FIG. 15 illustrates one example of generating and transmitting 5 SC-FDMA symbols during one slot in the wireless communication system to which the present invention can be applied.

In FIG. 15, an example of generating and transmitting 5 SC-FDMA symbols (that is, data part) by using an OCC having the length of 5 (alternatively, SF=5) in one symbol sequence during one slot. In this case, two RS symbols may be used during one slot.

In the example of FIG. 15, the RS symbol may be generated from a CAZAC sequence to which a specific cyclic shift value is applied and transmitted in a type in which a predetermined OCC is applied (alternatively, multiplied) throughout a plurality of RS symbols. Further, in the example of FIG. 15, when it is assumed that 12 modulated symbols are used for each OFDM symbol (alternatively, SC-FDMA symbol) and the respective modulated symbols are generated by QPSK, the maximum bit number which may be transmitted in one slot becomes 24 bits (=12×2). Accordingly, the bit number which is transmittable by two slots becomes a total of 48 bits. When a PUCCH channel structure of the block spreading scheme is used, control information having an extended size may be transmitted as compared with the existing PUCCH format 1 series and 2 series.

For convenience of description, such a channel coding-based multiple ACK/NACK transmission method using the PUCCH format 2 or the E-PUCCH format is called a multi-bit ACK/NACK coding transmission method. This method is a method of transmitting an ACK/NACK coded block generated through the channel coding of ACK/NACK or discontinuous transmission (DTX) information (meaning that a PDCCH is not received/detected) for the PDSCH of multiple DL CCs. For example, when a UE operates in the SU-MIMO mode in a specific DL CC and receives 2 codewords (CW), it may transmit a total of 4 feedback states of ACK/ACK, ACK/NACK, NACK/ACK, and NACK/NACK for each CW with respect to the corresponding CC or may have a maximum of 5 feedback states including up to DTX. Furthermore, if a UE receives a single CW, it may have a maximum of three states of ACK, NACK, and DTX (if the UE processes NACK identically with DTX, it may have a total of 2 states of ACK and NACK/DTX). Accordingly, if a UE aggregates a maximum of 5 DL CCs and operates in the SU-MIMO mode in all of the CCs, it may have a maximum of 55 transmittable feedback states. An ACK/NACK payload size for expressing the 55 transmittable feedback states becomes a total of 12 bits (if the UE processes NACK identically with DTX, it may have a total of 2 states of ACK and NACK/DTX, the number of feedback states is 45, and an ACK/NACK payload size for expressing the 45 feedback states becomes a total of 10 bits).

In the previous ACK/NACK multiplexing (i.e., ACK/NACK selection) method applied to the existing Rel-8 TDD system, basically, in order for each UE to secure a PUCCH resource, an implicit ACK/NACK selection method using an implicit PUCCH resource corresponding to (i.e., linked to the lowest CCE index) a PDCCH that schedules each PDSCH of the corresponding UE is taken into consideration. Meanwhile, in the LTE-A FDD system, multiple ACK/NACK transmission for multiple PDSCHs transmitted through multiple DL CCs through one specific UL CC configured in a UE-specific manner is basically taken into consideration. To this end, an ACK/NACK selection method of combining an implicit PUCCH resource linked to (i.e., linked to the lowest CCE index n_CCE or linked to n_CCE and n_CCE+1) a PDCCH that schedules some or all of specific DL CCs or an explicit PUCCH resource previously reserved for each UE through RRC signaling with the corresponding implicit PUCCH resource is taken into consideration.

Meanwhile, even in the LTE-A TDD system, a situation in which multiple CCs are aggregated (i.e., CA) may be taken into consideration. Accordingly, to transmit multiple ACK/NACK information/signals for multiple PDSCHs, transmitted through a plurality of DL subframes and multiple CCs, through a specific CC (i.e., A/N CC) in an UL subframe corresponding to the plurality of corresponding DL subframes is taken into consideration. In this case, unlike the aforementioned LTE-A FDD, a method (i.e., full ACK/NACK) of transmitting multiple ACK/NACK corresponding to a maximum number of CWs that may be transmitted through all of CCs allocated to a UE with respect to all of a plurality of DL subframes (i.e., SF) may be taken into consideration, or a method (i.e., bundled ACK/NACK) of reducing and transmitting a total number of transmission ACK/NACKs by applying ACK/NACK bundling to a CW and/or a CC and/or an SF domain may be taken into consideration. In this case, CW bundling means that ACK/NACK bundling for a CW is applied to each DL SF for each CC. CC bundling means that ACK/NACK bundling for all or some of CCs is applied to each DL SF. SF bundling means that ACK/NACK bundling is applied to all or some of DL SFs for each CC. Characteristically, an ACK-counter method of providing notification of a total number of ACKs (or some number of ACKs) for each CC with respect to all of PDSCHs or DL grant PDCCHs received with respect to each CC may be taken into consideration as the SF bundling method. In this case, a multi-bit ACK/NACK coding or ACK/NACK selection-based ACK/NACK transmission scheme may be configurably applied based on ACK/NACK payload for each UE, that is, the size of ACK/NACK payload for full or bundled ACK/NACK transmission configured for each UE.

HARQ Procedure

In a mobile communication system, a single eNB transmits/receives data through a plurality of UEs and a radio channel environment in one cell/sector. In a system using multiple carriers and operating in a similar manner, an eNB receives packet traffic from the wired Internet and transmits the received packet traffic to each UE using a predetermined communication method. In this case, what the eNB determines that it will transmit data to which UE using which frequency region at which timing is downlink scheduling. Furthermore, the eNB receives and demodulates data transmitted by a UE using a communication method of a predetermined form, and transmits packet traffic through the wired Internet. What an eNB determines that it will allow which UE to transmit uplink data using which frequency band at which timing is uplink scheduling. In general, a UE having a better channel state transmits/receives data using more time and more frequency resources.

A resource in a system using multiple carriers and operating in a similar way may be basically divided into time and frequency regions. The resource may be defined as a resource block. The resource block includes a specific N subcarrier and a specific M subframe or a predetermined time unit. In this case, N and M may be 1.

FIG. 16 illustrates an example of a time frequency resource block in a time frequency region, to which the present invention may be applied.

Referring to FIG. 16, one square means one resource block, and one resource block has multiple subcarriers as one axis and a predetermined time unit as the other axis.

In the downlink, an eNB schedules one or more resource blocks to a selected UE according to a predetermined scheduling rule. The eNB transmits data to the UE using the allocated resource blocks. In the uplink, an eNB schedules one or more resource blocks to a selected UE according to a predetermined scheduling rule. The UE transmits data in the uplink using the allocated resource. After data is transmitted after scheduling, an error control method when a frame is lost or damaged includes an automatic repeat request (ARQ) method and a hybrid ARQ (HARQ) method of a more advanced form. Basically, in the ARQ method, after one frame is transmitted, an acknowledgement message (ACK) waits to be received. The reception side transmits an acknowledgement message (ACK) only when a frame is correctly received. When an error occurs in the frame, the reception side transmits a negative-ACK (NAK) message and deletes corresponding information of the erroneously received frame from a reception stage buffer. When the transmission side receives an ACK signal, it transmits a frame subsequently. When the transmission side receives a NAK message, however, it retransmits a frame. Unlike in the ARQ method, in the HARQ method, if a received frame cannot be demodulated, the reception stage transmits a NAK message to the transmission stage, but stores an already received frame in the buffer for a specific time and combines a frame with the received frame when the corresponding frame is retransmitted, thereby increasing a reception success ratio.

Recently, the HARQ method more efficient than the basic ARQ method is widely used. The HARQ method includes multiple types, and may be basically divided into synchronous HARQ and asynchronous HARQ based on retransmission timing. The HARQ method may be divided into a channel-adaptive method and a channel non-adaptive method depending on whether a channel state is incorporated into the amount of resources used upon retransmission.

The synchronous HARQ method is a method in which subsequent retransmission has been performed by a system at predetermined timing after initial transmission has failed. That is, assuming that retransmission is performed every fourth time unit after initial transmission fails, timing does not need to be notified because the timing at which retransmission is performed has already been agreed between an eNB and a UE. In this case, if a NAK message has been received, the data transmission side retransmits a frame every fourth time unit until it receives an ACK message. In contrast, in the asynchronous HARQ method, retransmission timing is newly scheduled or the method may be performed through additional signaling. Timing at which retransmission for a previously failed frame is performed is changed by multiple factors, such as a channel state.

The channel non-adaptive HARQ method is a method in which the modulation of a frame upon retransmission or the number of resource blocks used or AMC is performed according to planned upon initial transmission. In contrast, the channel-adaptive HARQ method is a method in which they are changed depending on the state of a channel. For example, in the channel non-adaptive method, the transmission side has transmitted data using 6 resource blocks upon initial transmission, and also retransmits data using 6 resource blocks upon subsequent retransmission. In contrast, a method of retransmitting data using resource blocks greater than or smaller than 6 depending on a subsequent channel state although initial transmission has been performed using the 6 resource blocks is the channel-adaptive method.

Four combinations of HARQ may be performed based on such a classification, but chiefly used HARQ methods include a synchronous and channel-adaptive HARQ method and a synchronous and channel non-adaptive HARQ methods. The synchronous and channel-adaptive HARQ method can maximize retransmission efficiency by adaptively changing retransmission timing and the amount of resources depending on the state of a channel, but has a disadvantage in that overhead is great. Accordingly, in general, the synchronous and channel-adaptive HARQ method is not taken into consideration for the uplink. Meanwhile, the synchronous and channel non-adaptive HARQ method has an advantage in that overhead is rarely present because timing for retransmission and resource allocation have been agreed within a system, but has a disadvantage in that retransmission efficiency is low if this method is used in a severely changing channel state. In current 3GPP LTE, the asynchronous HARQ method is used in the case of the downlink, and the synchronous HARQ method is used in the case of the uplink.

FIG. 17 illustrates an example of resource allocation and retransmission in the common asynchronous HARQ method, to which the present invention may be applied.

Referring to FIG. 17, for example, in the case of the downlink, after scheduling is performed and data is transmitted, ACK/NAK information is received from a UE, and time delay may occur until next data is transmitted. This may be channel propagation delay and delay occurring due to the time taken for data encoding.

For data transmission not having a gap during such a latency interval, a transmission method using an independent HARQ process is used. For example, assuming that the shortest period between next data transmission and next data transmission is 7 subframes, if 7 independent processes are placed, data can be transmitted without a gap. In LTE, a maximum of 8 processes can be allocated if a system does not operate in MIMO.

CA-Based Coordinated Multi-Point (CoMP) Operation

In a post-LTE system, cooperative multi-point transmission may be implemented using a carrier aggregation (CA) function in LTE.

FIG. 18 illustrates an example of a CoMP system using a carrier aggregation, to which the present invention may be applied.

Referring to FIG. 18, a primary cell (Pcell) carrier and a secondary cell (Scell) carrier use the same frequency band in the frequency axis, and have been allocated to two eNBs that have been geographically spaced apart. Various DL/UL CoMP operations, such as joint transmission (JT), coordinated scheduling (CS)/coordinated beamforming (CB), and dynamic cell selection, may be possible by assigning the serving eNB of a UE1 as a Pcell and a neighboring cell giving a lot of interference as an Scell.

In FIG. 18, an example in which a UE aggregates two eNBs as a PCell and an Scell has been described. Practically, a UE may aggregate three or more cells, some of the cells may perform a CoMP operation in the same frequency band, and other cells may perform a simple CA operation in another frequency band. In this case, the PCell does not need to essentially participate in the CoMP operation.

Common UE Procedure for Receiving PDSCH

When a UE detects the PDCCH of a serving cell having the DCI format 1, 1A, 1B, 1C, 1D, 2, 2A, 2B or 2C for the UE other than a subframe indicated by a higher layer parameter "mbsfn-SubframeConfigList", the UE limits the number of transport blocks defined in a higher frame and decodes a corresponding PDSCH within the same subframe. The UE may assume that a position decision reference signal is not present in a resource block that decodes a PDSCH based on a detected PDCCH having CRS scrambled by an SI-RNTI or P-RNT having the DCI format 1A or 1C for the UE.

A UE configured to have a carrier indicator field for a given serving cell assumes that the carrier indicator field is not present in a specific PDCCH of a serving cell within the common search space described in [3]. If not, the configured UE assumes that the carrier indicator field is present in a PDCCH located in the UE-specific search space described in [3] when PDCCH CRC is scrambled by a C-RNTI or SPS C-RNTI with respect to a given serving cell.

If a UE is configured by higher layers to decode a PDCCH with CRS scrambled by an SI-RNTI, the UE decodes the PDCCH and a corresponding PDSCH based on a specific one of combinations defined in Table 7. The scrambling initialization of a PDSCH SI-RNTI corresponding to these PDCCHs may be handled.

TABLE 7

| DCI format | Search Space | Transmission scheme of PDSCH corresponding to PDCCH |
| --- | --- | --- |
| DCI format 1C | Common | If the number of a PBCH antenna port is one, single-antenna port, port 0 is used, otherwise transmit diversity. |
| DCI format 1A | Common | If the number of a PBCH antenna port is one, single-antenna port, port 0 is used, otherwise transmit diversity |

If a UE is configured by a higher layer to decode a PDCCH with CRS scrambled by a P-RNTI, the UE decodes the PDCCH and a corresponding PDSCH based on a specific one of combinations defined in Table 8. The scrambling initialization of the PDSCH corresponding to the PDCCH has been performed by the P-RNTI.

TABLE 8

| DCI format | Search Space | Transmission scheme of PDSCH corresponding to PDCCH |
| --- | --- | --- |
| DCI format 1C | Common | If the number of a PBCH antenna port is one, single-antenna port, port 0 is used, otherwise transmit diversity |
| DCI format 1A | Common | If the number of a PBCH antenna port is one, single-antenna port, port 0 is used, otherwise transmit diversity |

If a UE is configured by a higher layer to decode a PDCCH with CRS scrambled by an RA-RNTI, the UE decodes the PDCCH and a corresponding PDSCH based on one of combinations defined in Table 9. The scrambling initialization of the PDSCH corresponding to the PDCCH has been performed by the RA-RNTI.

If an RA-RNTI and a C-RNTI or an SPS C-RNTI are allocated within the same subframe, a UE does not need to decode a PDSCH indicated by a PDCCH with CRS scrambled by the C-RNTI or the SPS C-RNTI.

TABLE 9

| DCI format | Search Space | Transmission scheme of PDSCH corresponding to PDCCH |
| --- | --- | --- |
| DCI format 1C | Common | If the number of a PBCH antenna port is one, single-antenna port, port 0 is used, otherwise transmit diversity |
| DCI format 1A | Common | If the number of a PBCH antenna port is one, single-antenna port, port 0 is used, otherwise transmit diversity |

A UE is semi-statically configured through higher layer signaling in order to receive PDSCH data transmission signaled through a PDCCH based on one of 9 transmission modes indicated as mode 1 to mode 9.

In the case of a frame structure type 1, the operation of a UE related to PDSCH reception may be as follows.

A UE does not expect that it will receive PDSCH resource blocks transmitted through the antenna port 5 in a specific subframe in which the number of OFDM symbols for a PDCCH having a normal CP is equal to 4.

If any one of two PRBs is redundant with the transmission of a PBCH or a primary or secondary synchronous signal and a frequency in the subframe, a UE does not expect that it will receive a PDSCH resource block transmitted through the antenna port 5, 7, 8, 9, 10, 11, 12, 13 or 14 in two PRBs in which a pair of VRBs is mapped.

A UE does not expect that it will receive PDSCH resource blocks transmitted through the antenna port 7 to which distributed VRB resource allocation has been allocated.

A UE may skip the decoding of a transport block(s) if it does not receive all of allocated PDSCH resource blocks. Furthermore, if the UE has skipped the decoding, a physical layer indicates that the transport block(s) has not been successfully decoded to a higher layer.

In contrast, in the case of the frame structure type 2, the operation of a UE related to PDSCH reception may be as follows.

A UE does not expect that it will receive PDSCH resource blocks through the antenna port 5 in a specific subframe in which the number of OFDM symbols for a PDCCH having a normal CP is equal to 4.

If any one of two PRBs is redundant with the transmission of a PBCH and a frequency in the same subframe, a UE does not expect that it will receive a PDSCH resource block transmitted through the antenna port 5 in the two PRBs to which a pair of VRBs is mapped.

If any one of two PRBs is redundant with the transmission of a primary or secondary synchronous signal and a frequency in the same subframe, a UE does not expect that it will receive a PDSCH resource block transmitted through the antenna port 7, 8, 9, 10, 11, 12, 13 or 14 in the two PRBs to which a pair of VRBs is mapped.

In the normal CP configuration, a UE does not expect that it will receive a PDSCH on the antenna port 5 to which distributed VRB resource allocation is allocated in a special subframe having the configuration #1 or #6.

A UE does not expect that it will receive a PDSCH in the antenna port 7 to which distributed VRB resource allocation has been allocated. The UE may skip the decoding of a transport block(s) if it does not receive all of allocated PDSCH resource blocks. If the UE skips the decoding, a physical layer indicates that the transport block(s) has not been successfully decoded to a higher layer. If a UE is configured by a higher layer to decode a PDCCH with CRS When a UE is configured according to transmission mode 9, the UE decodes a corresponding PDSCH within the same subframe when it detects a PDCCH having CRC scrambled by a C-RNTI having the DCI format 1A or 2C for the UE in a subframe indicated by a higher layer parameter "mbsfn-SubframeConfigList" excluded from subframes for a serving cell.

TABLE 10

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity MBSFN subframe: Single-antenna port, port 7 |
|  | DCI format 2C | UE specific by C-RNTI | Up to 8 layer transmission, ports 7-14 | scrambled by a C-RNTI, the UE decodes a PDCCH and a specific corresponding PDSCH based on each of combinations defined in Table 10. The scrambling initialization of the PDSCH corresponding to the PDCCH has been performed by the C-RNTI. If the UE is configured to have a carrier indication field for a given serving cell and the UE is configured to decode a PDCCH with CRS scrambled by a C-RNTI, the UE includes a carrier indicator field value. When the UE configured based on transmission mode 3, 4, 8 or 9 receives DCI format 1A allocation, it assumes that PDSCH transmission is related to a transport block 1 and a transport block 2 cannot be used. When the UE is configured according to transmission mode 7, the scrambling initialization of the UE-specific reference signals corresponding to these PDCCHs has been performed by a C-RNTI. If an extended cyclic prefix is used in the downlink, the UE does not support transmission mode 8.

If a UE is configured by a higher layer to decode a PDCCH with CRS scrambled by an SPS C-RNTI, the UE decodes the PDCCH of a primary cell and a corresponding PDSCH on the primary cell based on each of combinations defined in Table 11. The same PDSCH-related configuration is applied if a PDSCH is transmitted without a corresponding PDCCH. The scrambling initialization of the PDCCHs and the corresponding PDSCH not having a corresponding PDCCH has been performed by the SPS C-RNTI. When the UE is configured according to transmission mode 7, the scrambling initialization of UE-specific reference signals corresponding to these PDCCHs has been performed by the SPS C-RNTI.

When a UE is configured according to transmission mode 9, the UE decodes a corresponding PDSCH within the same subframe when it detects a PDCCH having CRC scrambled by an SPS C-RNTI having the DCI format 1A or 2C or with respect to a configured PDSCH not having a PDCCH for the UE except subframes indicated by a higher layer parameter "mbsfn-SubframeConfigList" from subframes for a serving cell.

TABLE 11

| Transmission mode | DCI format | Search Space | Transmission scheme of PDSCH corresponding to PDCCH |
| --- | --- | --- | --- |
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Transmit diversity |
| Mode 4 | DCI format 1A | Common and UE specific by C-RNTI | Transmit diversity |
|  | DCI format 2 | UE specific by C-RNTI | Transmit diversity |
| Mode 5 | DCI format 1A | Common and UE specific by C-RNTI | Transmit diversity |
| Mode 6 | DCI format 1A | Common and UE specific by C-RNTI | Transmit diversity |
| Mode 7 | DCI format 1A | Common and UE specific by C-RNTI | Single-antenna port, port 5 |
|  | DCI format 1 | UE specific by C-RNTI | Single-antenna port, port 5 |
| Mode 8 | DCI format 1A | Common and UE specific by C-RNTI | Single-antenna port, port 7 |
|  | DCI format 2B | UE specific by C-RNTI | Single-antenna port, port 7 or 8 |
| Mode 9 | DCI format 1A | Common and UE specific by C-RNTI | Single-antenna port, port 7 |
|  | DCI format 2C | UE specific by C-RNTI | Single-antenna port, port 7 or 8 |

If a UE is configured by a higher layer to decode a PDCCH with CRS scrambled by a temporary C-RNTI and is not configured to decode a PDCCH with CRS scrambled by a C-RNTI, the UE decodes the PDCCH and a corresponding PDSCH based on combinations defined in Table 12. The scrambling initialization of the PDSCH corresponding to the PDCCH has been performed by the temporary C-RNTI.

TABLE 12

| DCI format | Search Space | Transmission scheme of PDSCH corresponding to PDCCH |
| --- | --- | --- |
| DCI format 1A | Common and UE specific by Temporary C-RNTI | If the number of PBCH antenna port is one, single-antenna port, port 0 is used, otherwise transmit diversity |
| DCI format 1 | UE specific by Temporary C-RNTI | If the number of PBCH antenna port is one, single-antenna port, port 0 is used, otherwise transmit diversity |

UE Procedure of Transmitting Common PUSCH

As defined in Table 13, in order to transmit a PUSCH signaled through a PDCCH based on one of 2 uplink transmission modes indicated as mode 1 to 2, a UE is semi-statically configured through higher layer signaling. When the UE receives CRC scrambled by a C-RNTI to decode a PDCCH by a higher layer, the UE decodes the PDCCH based on combinations defined in Table 13 and transmits a corresponding PUSCH. The scrambling transmission of the PUSCH corresponding to the PDCCHs and the retransmission of the PUSCH for the same transmission block has been performed by the C-RNTI. Transmission mode 1 is a default uplink transmission mode for the UE until an uplink transmission mode is allocated to the UE through higher layer signaling.

It is assumed that when the UE configured with transmission mode 2 receives a DCI format 0 uplink scheduling approval, PUSCH transmission is related to a transport block 1 and a transport block 2 is disabled.

TABLE 13

| Transmission mode | DCI format | Search Space | Transmission scheme of PUSCH corresponding to PDCCH |
| --- | --- | --- | --- |
| Mode 1 | DCI format 0 | Common and UE specific by C-RNTI | Single-antenna port, port 10 (see subclause 8.0.1) |
| Mode 2 | DCI format 0 | Common and UE specific by C-RNTI | Single-antenna port, port 10 (see subclause 8.0.1) |
|  | DCI format 4 | UE specific by C-RNTI | Closed-loop spatial multiplexing (see subclause 8.0.2) |

If a UE is configured by a higher layer to decode a PDCCH with CRC scrambled by a C-RNTI and is configured to receive a random access procedure initialized by a PDCCH order, the UE decodes the PDCCH based on based on combinations defined in Table 14.

TABLE 14

| DCI format | Search Space |
| --- | --- |
| DCI format 1A | Common and the UE specific by C-RNTI |

If a UE is configured by a higher layer to decode a PDCCH with CRS scrambled by an SPS C-RNTI, the UE decodes the PDCCH based on combinations defined in Table 15 and transmits the corresponding PUSCH. The scrambling transmission of a PUSCH corresponding to these PDCCHs and the retransmission of the PUSCH for the same transmission block has been performed by the SPS C-RNTI. The initial transmission of a PUSCH not having a corresponding PDCCH and the scrambling initialization of the retransmission of a PUSCH for the same transmission block has been performed by the SPS C-RNTI.

TABLE 15

| Transmission mode | DCI format | Search Space | Transmission scheme of PUSCH corresponding to PDCCH |
| --- | --- | --- | --- |
| Mode 1 | DCI format 0 | Common and UE specific by C-RNTI | Single-antenna port, port 10 (see subclause 8.0.1) |
| Mode 2 | DCI format 0 | Common and UE specific by C-RNTI | Single-antenna port, port 10 (see subclause 8.0.1) |

If a UE is configured by a higher layer to decode a PDCCH with CRC scrambled by a temporary C-RNTI regardless of whether the UE is configured to decode a PDCCH with CRC scrambled by a C-RNTI, the UE transmits a corresponding PUSCH based on combinations defined in Table 16. The scrambling transmission of a PUSCH corresponding to these PDCCHs has been performed by the temporary C-RNTI.

If the temporary C-RNTI is configured by a higher layer, the scrambling of a PUSCH corresponding to a random access response grant and the retransmission of the PUSCH for the same transmission block have been performed by the temporary C-RNTI. If not, the scrambling of the PUSCH corresponding to the random access response grant and the retransmission of the PUSCH for the same transmission block have been performed by the C-RNTI.

TABLE 16

| DCI format | Search Space |
| --- | --- |
| DCI format 0 | Common |

If a UE is configured by a higher layer to decode a PDCCH with CRC scrambled by a TPC-PUCCH-RNTI, the UE decodes the PDCCH based on combinations defined in Table 17. Notation 3/3A means that a UE should receive the DCI format 3 or DCI format 3A dependent on the configuration.

TABLE 17

| DCI format | Search Space |
| --- | --- |
| DCI format 3/3A | Common |

If a UE is configured by a higher layer to decode a PDCCH with CRC scrambled by a TPC-PUSCH-RNTI, the UE has to decode the PDCCH based on combinations defined in Table 18. Notation 3/3A means that a UE should receive the DCI format 3 or DCI format 3A dependent on the configuration.

TABLE 18

| DCI format | Search Space |
| --- | --- |
| DCI format 3/3A | Common |

Cross-CC Scheduling and E-PDCCH Scheduling

In the existing 3GPP LTE Rel-10 system, if a cross-CC scheduling operation is defined in an aggregation situation for a plurality of CCs (component carrier=(serving) cell), one CC may be preset to be able to receive DL/UL scheduling from only one specific CC (i.e., scheduling CC) (namely, to be able to receive DL/UL grant PDCCH for the corresponding scheduled CC).

The corresponding scheduling CC may basically perform a DL/UL scheduling for the scheduling CC itself.

In other words, the SS for the PDCCH scheduling the scheduling/scheduled CC in the cross-CC scheduling relation may come to exist in the control channel area of the scheduling CC.

Meanwhile, in the LTE system, CFDD DL carrier or TDD DL subframes use first n OFDM symbols of the subframe for PDCCH, PHICH, PCFICH and the like which are physical channels for transmission of various control informations and use the rest of the OFDM symbols for PDSCH transmission.

At this time, the number of symbols used for control channel transmission in each subframe is dynamically transmitted to the UE through the physical channel such as PCFICH or is semi-statically transmitted to the UE through RRC signaling.

At this time, particularly, value n may be set by 1 to 4 symbols depending on the subframe characteristic and system characteristic (FDD/TDD, system bandwidth, etc.).

Meanwhile, in the existing LTE system, PDCCH, which is the physical channel for transmitting DL/UL scheduling and various control information, may be transmitted through limited OFDM symbols.

Hence, the enhanced PDCCH (i.e., E-PDCCH), which is more freely multiplexed in PDSCH and FDM/TDM scheme, may be introduced instead of the control channel which is transmitted through the OFDM which is separated from the PDSCH like PDCCH.

FIG. 19 illustrates an example of multiplexing legacy PDCCH, PDSCH and E-PDCCH.

Here, the legacy PDCCH may be expressed as L-PDCCH.

Quasi Co-Location

QC/QCL (quasi co-located or quasi co-location) can be defined as below.

If two antenna ports are in QC/QCL relationship (or QC/QCL), then a large-scale property of the signal transmitted through one antenna port is transmitted to the other antenna port it can be assumed that the terminal can be inferred. Here, the wide-range characteristic includes at least one of a delay spread, a Doppler spread, a frequency shift, an average received power, and a received timing.

It may also be defined as follows. If two antenna ports are QC/QCL-related (or QC/QCL), then the large-scale properties of the channel through which one symbol is transmitted through one antenna port is transmitted through the other antenna port it can be assumed that the terminal can be inferred from a radio channel through which a symbol is transmitted. Here, the large-scale properties includes at least one of a delay spread, a Doppler spread, a Doppler shift, an average gain, and an average delay.

That is, the two antenna ports are in the QC/QCL relationship (or QC/QCL), which means that the large-scale channel properties of the radio channel from one antenna port are the same as the large-scale channel properties of the radio channel from the other antenna port. Considering a plurality of antenna ports through which RSs are transmitted, if the antenna ports through which two different types of RSs are transmitted are in the QCL relationship, the large-scale properties of the radio channels from one type of antenna port can be replaced by the large-scale properties of the wireless channel.

In this specification, the above QC/QCL related definitions are not distinguished. That is, the QC/QCL concept can follow one of the above definitions. Or in a similar manner, it can be assumed that a QC/QCL hypothesis can be assumed to be transmitted at the co-location between the antenna ports established by the QC/QCL hypothesis (for example, UE may assume that there are antenna ports transmitted at the same transmission point), the QC/QCL concept definition may be modified by the terminal, and the spirit of the present invention includes such similar variations. In the present invention, QC/QCL related definitions are used in combination for convenience of explanation.

According to the QC/QCL concept, the UE may not assume the same large-scale channel properties between corresponding antenna ports for non-QC/QCL (Non-QC/QCL) antenna ports. That is, in this case, a typical UE receiver should perform independent processing on each non-quasi-co-located (NQC) AP which has been configured for timing acquisition and tracking, frequency offset estimation and compensation, delay estimation, and Doppler estimation.

There is an advantage in that UE can perform the following operation between APs capable of assuming QC:
- With respect to Delay spread & Doppler spread, UE may identically apply a power-delay-profile, a delay spread and Doppler spectrum, and a Doppler spread estimation result for one port to a Wiener filter used upon channel estimation for the other port.
- With respect to Frequency shift & Received Timing, UE may perform time and frequency synchronization on any one port and then apply the same synchronization to the demodulation of the other port.
- With respect to Average received power, UE may average RSRP measurements for over two or more antenna ports.

Physical Uplink Control Channel (PUCCH)

The physical uplink control channel, PUCCH, carries uplink control information. The simultaneous transmission of a PUCCH and PUSCH from the same UE is supported when it is enabled by a higher layer. In the case of the frame structure type 2, a PUCCH is not transmitted in an UpPTS field.

A physical uplink control channel supports a plurality of formats described in Table 19.

The formats 2a and 2b are supported for a normal cyclic shift only.

TABLE 19

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

All of the PUCCH formats use a cyclic shift $n_{cs}^{cell}(n_s,l)$. The shift is determined by a symbol number l and a slot number $n_s$ according to Equation 6.

$$n_{cs}^{cell}(n_s, l) = \sum_{i=0}^{7} c(8N_{symb}^{UL} \cdot n_s + 8l + i) \cdot 2^i \quad \text{[Equation 5]}$$

In this case, c(i) indicates a pseudo random sequence. A pseudo random sequence generator needs to be initialized by an initial value $c_{init}=n_{ID}^{RS}$. In this case, the ID index $n_{ID}^{RS}$ of an RE is defined along with a cell ID number $N_{ID}^{cell}$ corresponding to a primary cell in the starting part of each radio frame. A physical resource used in a PUCCH varies depending on two parameters $N_{RB}^{(2)}$ and $N_{cs}^{(1)}$ and is provided by a higher layer.

The variable $N_{RB}^{(2)}$ indicates a bandwidth from a viewpoint of a resource block available by the transmission of the PUCCH format 2/2a/2b in each slot. The variable $N_{cs}^{(1)}$ indicates the number of cyclic shifts used in the PUCCH format 1/1a/1b in a resource block used in the mixture of the 1/1a/1b and 2/2a/2b formats. The value of $N_{cs}^{(1)}$ is an integer multiple of $\Delta_{shift}^{PUCCH}$ within a {0, 1, . . . , 7} range, and $\Delta_{shift}^{PUCCH}$ is provided by a higher layer. Furthermore, if $N_{cs}^{(1)}=0$, a mixed resource block is not present. A maximum of one resource block of each slot supports the mixture of the 1/1a/1b and 2/2a/2b formats.

Resources used in the transmission of the PUCCH formats 1/1a/1b, 2/2a/2b and 3 are respectively indicated by indices $n_{PUCCH}^{(1,\tilde{p})}$, $$n_{PUCCH}^{(2,\tilde{p})} < N_{RB}^{(2)} N_{sc}^{RB} + \left\lceil \frac{N_{cs}^{(1)}}{8} \right\rceil \cdot (N_{sc}^{RB} - N_{cs}^{(1)} - 2),$$

and $n_{PUCCH}^{(3,\tilde{p})}$ that are not negative.

PUCCH Formats 1, 1a and 1b

With respect to the PUCCH format 1, information is carried depending on whether a UE transmits a PUCCH. In this case, d(0)=1 is assumed with respect to the PUCCH format 1. In the case of the PUCCH formats 1a and 1b, one or two explicit bits are transmitted. A block of bits b(0), . . . , b($M_{bit}$−1) should be modulated as described in Table 20, and a complex value symbol d(0) is obtained.

TABLE 20

| PUCCH format | b(0), . . . , b($M_{bit}$ − 1) | d(0) |
| --- | --- | --- |
| 1a | 0 | 1 |
|  | 1 | −1 |
| 1b | 00 | 1 |
|  | 01 | −j |
|  | 10 | j |
|  | 11 | −1 |

A modulation method for different PUCCH formats is shown in Table 19. The complex symbol d(0) must be multiplied by the sequence $r_{u,v}^{(\alpha_{\tilde{p}})}(n)$ of a periodically shifted length 12 ($N_{seq}^{PUCCH}=12$) for each of antenna ports P used for PUCCH transmission according to Equation 7.

$$y^{(\tilde{p})}(n) = \frac{1}{\sqrt{P}} d(0) \cdot r_{u,v}^{(\alpha_{\tilde{p}})}(n), \quad \text{[Equation 7]}$$

$$n = 0, 1, \ldots, N_{seq}^{PUCCH} - 1$$

In this case, $r_{u,v}^{(\alpha_{\tilde{p}})}$ is defined along with $M_{sc}^{RS}=N_{seq}^{PUCCH}$ in Section 5.5.1. The antenna port-specific cyclic shift $\alpha_{\tilde{p}}$ is changed between symbols and slots.

The block $y^{(\tilde{p})}(0), \ldots, y^{(\tilde{p})}(N_{seq}^{PUCCH}-1)$ of symbols of a complex value is scrambled by block-wise wise spread and $S(n_s)$ based on an antenna port-specific orthogonal sequence $w_{n_{oc}(\tilde{p})}(i)$ according to Equation 8.

$$z^{(\tilde{p})}(m' \cdot N_{SF}^{PUCCH} \cdot N_{seq}^{PUCCH} + m \cdot N_{seq}^{PUCCH} + n) = S(n_s) \cdot w_{n_{oc}(\tilde{p})}(m) \cdot y^{(\tilde{p})}(n) \quad \text{[Equation 8]}$$

In this case, m, n, m', and $S(n_s)$ satisfy the conditions of Equation 9 and 10.

$$m = 0, \ldots, N_{SF}^{PUCCH} - 1 \quad \text{[Equation 9]}$$

$$n = 0, \ldots, N_{seq}^{PUCCH} - 1$$

$$m' = 0, 1$$

$$S(n_s) = \begin{cases} 1 & \text{if } n'_p(n_s) \bmod 2 = 0 \\ e^{j\pi/2} & \text{otherwise} \end{cases} \quad \text{[Equation 10]}$$

In this case, $N_{SF}^{PUCCH}=4$ is used with respect to two slots of the normal PUCCH format 1/1a/1b, $N_{SF}^{PUCCH}=4$ is used with respect to the first slot of the shortened PUCCH format 1/1a/1b, and $N_{SF}^{PUCCH}=3$ is sued with respect to a second slot. The sequence $w_{n_{oc}}(\tilde{p})(i)$ is given by Table 21 and Table 22.

TABLE 21

| Sequence index $n_{oc}^{(\tilde{p})}(n_s)$ | Orthogonal sequences $[w(0) \wedge w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 22

| Sequence index $n_{oc}^{(\tilde{p})}(n_s)$ | Orthogonal sequences $[w(0) \wedge w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Resources used in the transmission of the PUCCH formats 1, 1a and 1b are identified by an orthogonal sequence index $n_{oc}(\tilde{p})(n_s)$ determined according to Equation 11 and a resource index $n_{PUCCH}^{(1,\tilde{p})}$ from the cyclic shift $\alpha_{\tilde{p}}(n_s,l)$.

$$n_{oc}^{(\tilde{p})}(n_s) = \quad [\text{Equation 11}]$$

$$\begin{cases} \lfloor n'_p(n_s) \cdot \Delta_{shift}^{PUCCH}/N' \rfloor & \text{for normal cyclic prefix} \\ 2 \cdot \lfloor n'_p(n_s) \cdot \Delta_{shift}^{PUCCH}/N' \rfloor & \text{for extended cyclic prefix} \end{cases}$$

$$\alpha_{\tilde{p}}(n_s, l) = 2\pi \cdot n_{cs}^{(\tilde{p})}(n_s, l)/N_{sc}^{RB}$$

$$n_{cs}^{(\tilde{p})}(n_s, l) =$$

$$\begin{cases} [n_{cs}^{cell}(n_s, l) + \\ (n'_p(n_s)) \cdot \Delta_{shift}^{PUCCH} + \\ (n_{oc}^{(\tilde{p})}(n_s) \bmod \Delta_{shift}^{PUCCH})) \\ \bmod N'] \bmod N_{sc}^{RB} \\ [n_{cs}^{cell}(n_s, l) + \\ (n'_p(n_s)) \cdot \Delta_{shift}^{PUCCH} + \\ n_{oc}^{(\tilde{p})}(n_s)/2) \bmod N'] \\ \bmod N_{sc}^{RB} \end{cases}$$
for normal cyclic prefix for extended cyclic prefix In Equation 11, N' and c satisfy the conditions of Equation 12.

$$N' = \begin{cases} N_{cs}^{(1)} & \text{if } n_{PUCCH}^{(1,\tilde{p})} < c \cdot N_{cs}^{(1)}/\Delta_{shift}^{PUCCH} \\ N_{sc}^{RB} & \text{otherwise} \end{cases} \quad [\text{Equation 12}]$$

$$c = \begin{cases} 3 & \text{normal cyclic prefix} \\ 2 & \text{extended cyclic prefix} \end{cases}$$

PUCCH Formats 2, 2a, and 2b

In the case of the PUCCH formats 2, 2a, and 2b, the block b(0), . . . , b(19) of bits should be scrambled as a UE-specific scrambling sequence according to Equation 13. As a result, the blocks of the bits become the blocks $\tilde{b}(0), \ldots, \tilde{b}(19)$ of the scrambled bits.

$$\tilde{b}(i)=(b(i)+c(i))\bmod 2 \quad [\text{Equation 13}]$$

In this case, c(i) indicates a scrambling sequence. Furthermore, a scrambling sequence generator is initialized by an initial value $c_{init}=(\lfloor n_s/2 \rfloor+1)\cdot(2N_{ID}^{cell}+1)\cdot 2^{16}+n_{RNTI}$ in the starting part of each subframe in which $n_{RNTI}$ is a C-RNTI. The blocks $\tilde{b}(0), \ldots, \tilde{b}(19)$ of scrambled bits should be QPSK-modulated. As a result, the blocks of the scrambled bits become the blocks d(0), . . . , d(9) of modulation symbols of a complex value.

Each of the complex symbols d(0), . . . , d(9) should be multiplied by the sequence $r_{u,v}^{(\alpha_{\tilde{p}})}(n)$ of a periodically shifted length 12 $N_{seq}^{PUCCH}=12$ for each of an antenna port P used for PUCCH transmission according to Equation 14.

$$z^{(\tilde{p})}(N_{seq}^{PUCCH} \cdot n + i) = \frac{1}{\sqrt{P}} d(n) \cdot r_{u,v}^{(\alpha_{\tilde{p}})}(i) \quad [\text{Equation 14}]$$

$$n = 0, 1, \ldots, 9$$

$$i = 0, 1, \ldots, N_{sc}^{RB} - 1$$

In this case, $r_{u,v}^{(\alpha_{\tilde{p}})}(i)$ is defined along with $M_{sc}^{RS}=N_{seq}^{PUCCH}$.

A resource for the transmission of the PUCCH format 2/2a/2b is identified by a resource index $n_{PUCCH}^{(2,\tilde{p})}$ from a cyclic shift $\alpha_{\tilde{p}}(n_s,l)$ determined according to Equation 15.

$$\alpha_{\tilde{p}}(n_s,l)=2\pi \cdot n_{cs}^{(\tilde{p})}(n_s,l)N_{sc}^{RB} \quad [\text{Equation 15}]$$

The PUCCH formats 2a and 2b are supported with respect to only a normal cyclic prefix (CP). A bit(s) b(20), . . . , $b(M_{bit}-1)$ is modulated as described in Table 23. As a result, A single modulation symbol d(10) used to generate a reference signal for the PUCCH formats 2a and 2b is determined as described in Table 23.

TABLE 23

| PUCCH format | b(20), . . . , b($M_{bit}$ − 1) | d(10) |
|---|---|---|
| 2a | 0 | 1 |
|  | 1 | −1 |
| 2b | 00 | 1 |
|  | 01 | −j |
|  | 10 | j |
|  | 11 | −1 |

PUCCH Format 3

In the case of the PUCCH format 3, the blocks b(0), . . . , $b(M_{bit}-1)$ of bits should be scrambled as a UE-specific scrambling sequence according to Equation 16. As a result, the blocks of the bits become the blocks $\tilde{b}(0), \ldots \tilde{b}(M_{bit}-1)$ of the scrambled bits.

$$\tilde{b}(i)=(b(i)+c(i))\bmod 2 \quad [\text{Equation 16}]$$

In this case, c(i) indicates a scrambling sequence. Furthermore, a scrambling sequence generator is initialized by an initial value $c_{init}=(\lfloor n_s/2 \rfloor+1)\cdot(2N_{ID}^{cell}+1)\cdot 2^{16}+n_{RNTI}$ at the starting part of each subframe in which $n_{RNTI}$ is a C-RNTI. The blocks $\tilde{b}(0), \ldots \tilde{b}(M_{bit}-1)$ of scrambled bits should be QPSK-modulated. As a result, the blocks of the scrambled bits become the blocks d(0), . . . , $d(M_{symb}-1)$ of modulation symbols of a complex value.

The complex value symbols d(0), . . . , $d(M_{symb}-1)$ are block-wise spread as orthogonal sequence and $w_{n_{oc,0}}(\tilde{p})(i)$ and $w_{n_{oc,1}}(\tilde{p})(i)$. As a result, the sets $N_{SF,0}^{PUCCH}+N_{SF,1}^{PUCCH}$ of values of $N_{sc}^{RB}$ are determined according to Equation 17.

$$y_n^{(\tilde{p})}(i) = \qquad \text{[Equation 17]}$$

$$\begin{cases} w_{n_{oc,0}^{(\tilde{p})}}(\bar{n}) \cdot e^{j\pi \lfloor n_{cs}^{cell}(n_s,l)/64 \rfloor/2} \cdot d(i) & n < N_{SF,0}^{PUCCH} \\ w_{n_{oc,1}^{(\tilde{p})}}(\bar{n}) \cdot e^{j\pi \lfloor n_{cs}^{cell}(n_s,l)/64 \rfloor/2} \cdot d(N_{sc}^{RB} + i) & \text{otherwise} \end{cases}$$

$$\bar{n} = n \bmod N_{SF,0}^{PUCCH}$$

$$n = 0, \ldots, N_{SF,0}^{PUCCH} + N_{SF,1}^{PUCCH} - 1$$

$$i = 0, 1, \ldots, N_{sc}^{RB} - 1$$

In this case, $N_{SF,0}^{PUCCH} = N_{SF,1}^{PUCCH} = 5$ is used with respect to two slots of a subframe using the normal PUCCH format 3, $N_{SF,0}^{PUCCH} = 5$ is used with respect to the first slot of a subframe using the shortened PUCCH format 3, and $N_{SF,1}^{PUCCH} = 4$ is used with respect to the second slot. Furthermore, the orthogonal sequences $w_{n_{oc,0}}^{(\tilde{p})}(i)$ and $w_{n_{oc,1}}^{(\tilde{p})}(i)$ are given by Table 24.

TABLE 24

| | Orthogonal sequence $[w_{n_{oc}}(0) \Lambda w_{n_{oc}}(N_{SF}^{PUCCH} - 1)]$ | |
|---|---|---|
| Sequence index $n_{oc}$ | $N_{SF}^{PUCCH} = 5$ | $N_{SF}^{PUCCH} = 4$ |
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 +1 −1 −1] |
| 3 | [1 $e^{j6\pi/5}$ $e^{j2\pi/5}$ $e^{j8\pi/5}$ $e^{j4\pi/5}$] | [+1 −1 −1 +1] |
| 4 | [1 $e^{j8\pi/5}$ $e^{j6\pi/5}$ $e^{j4\pi/5}$ $e^{j2\pi/5}$] | — |

A resource used for the transmission of the PUCCH format 2/2a/2b is identified by the resource index $n_{PUCCH}^{(2,\tilde{p})}$ from the quantities $n_{oc,0}^{(\tilde{p})}$ and $n_{oc,1}^{(\tilde{p})}$ determined according to Equation 18.

$$n_{oc,0}^{(\tilde{p})} = n_{PUCCH}^{(3,\tilde{p})} \bmod N_{SF,1}^{PUCCH} \qquad \text{[Equation 18]}$$

$$n_{oc,1}^{(\tilde{p})} = \begin{cases} (3n_{oc,0}^{(\tilde{p})}) \bmod N_{SF,1}^{PUCCH} & \text{if } N_{SF,1}^{PUCCH} = 5 \\ n_{oc,0}^{(\tilde{p})} \bmod N_{SF,1}^{PUCCH} & \text{otherwise} \end{cases}$$

Mapping of Physical Resources to PUCCH Formats

The symbol block $z^{(\tilde{p})}(i)$ of a complex value is multiplied by an amplitude scaling coefficient $\beta_{PUCCH}$ in order to comply with transmit power $P_{PUCCH}$, and should be mapped to a sequence starring as $z^{(\tilde{p})}(0)$ with respect to resource elements REs. A PUCCH uses one resource block in each of the two slots of a subframe. The mapping of $z^{(\tilde{p})}(i)$ to a resource element (k,l) on an antenna port p and the mapping of a resource element not used for the transmission of a reference signal within a physical resource block used for transmission start from the first slot of a subframe and increase in order of the slot number.

A physical resource block used for PUCCH transmission in a slot $n_s$ is given by Equation 19.

$$n_{PRB} = \begin{cases} \left\lfloor \frac{m}{2} \right\rfloor & \text{if } (m + n_s \bmod 2) \bmod 2 = 0 \\ N_{RB}^{UL} - 1 - \left\lfloor \frac{m}{2} \right\rfloor & \text{if } (m + n_s \bmod 2) \bmod 2 = 1 \end{cases} \qquad \text{[Equation 19]}$$

In this case, a value of m is different depending on a format of a PUCCH format.

In the case of the PUCCH formats 1, 1a, and 1b, m is the same as Equation 20.

$$m = \begin{cases} N_{RB}^{(2)} & \text{if } n_{PUCCH}^{(1,\tilde{p})} < c \cdot N_{cs}^{(1)}/\Delta_{shift}^{PUCCH} \\ \left\lfloor \frac{n_{PUCCH}^{(1,\tilde{p})} - c \cdot N_{cs}^{(1)}/\Delta_{shift}^{PUCCH}}{c \cdot N_{cs}^{RB}/\Delta_{shift}^{PUCCH}} \right\rfloor + & \text{otherwise} \\ N_{RB}^{(2)} + \left\lceil \frac{N_{cs}^{(1)}}{8} \right\rceil \end{cases} \qquad \text{[Equation 20]}$$

$$c = \begin{cases} 3 & \text{normal cyclic prefix} \\ 2 & \text{extended cyclic prefix} \end{cases}$$

In the case of the PUCCH formats 2, 2a, and 2b, m is the same as Equation 21.

$$m = \lfloor n_{PUCCH}^{(2,\tilde{p})} / N_{sc}^{RB} \rfloor \qquad \text{[Equation 21]}$$

In the case of the PUCCH format 3, m is the same as Equation 22.

$$m = \lfloor n_{PUCCH}^{(3,\tilde{p})} / N_{SF,0}^{PUCCH} \rfloor \qquad \text{[Equation 22]}$$

If a serving cell is configured, when a sounding reference signal and the PUCCH format 1, 1a, 1b or 3 are transmitted at the same time, a shortened PUCCH format must be used if the last SC-FDMA symbol in the second slot of a subframe is empty.

FIG. 20 illustrates an example of the mapping of modulation symbols to a PUCCH, to which the present invention may be applied. FIG. 20 is only for convenience of description, and does not limit the scope of the present invention.

In FIG. 20, $N_{RB}^{UL}$ indicates the number of resource blocks in the uplink, and $0, 1, \ldots, N_{RB}^{UL} - 1$ means the number of physical resource blocks.

A 5G wireless communication system has an object of providing data delay that has been reduced about 10 times compared to the existing wireless communication system. In order to solve this problem, in 5G, it is expected that a wireless communication system using a new frame structure having a short TTI (e.g., 0.2 ms) will be proposed.

Furthermore, in the 5G system, it is expected that applications having various requirements, such as a high capacity, low energy consumption, a low cost, and a high user data rate in addition to low latency, coexist. As described above, it is expected that 5G will evolve into a system of a structure different from a conventional structure in order to support various types of applications from an application that requires ultra-low latency to an application that requires a high data transfer rate.

Accordingly, in order to minimize data reception delay of a UE, it is necessary to define a new frame structure different from the existing wireless communication system and the influence of a legacy UE attributable to the new frame structure must be minimized.

In the present invention, in order to provide a user with various services having different requirements, a system for providing one or more frame structures is applied to a specific UE.

That is, in the present invention, one or more service-specific subbands (or subband groups or band/carriers) are defined by configuring a frame structure for each subband (or subband group or band/carrier). For example, a short TTI frame structure for data transmission that requires a conventional 1 ms TTI frame structure and low latency for common data transmission may be configured for a specific UE.

Hereinafter, in this specification, a short TTI may be understood as being the same meaning as one short TTI subframe (or short subframe). That is, if both a control region and a data region are defined within one short subframe, a short TTI has a size including both the control region and the data region. If only the data region within a short subframe is defined, a short TTI has a size including only the data region.

Hereinafter, for convenience of description, an embodiment in which the present invention is applied in a the radio frame structure to which a normal CP of an FDD type has been applied. In this case, the present invention is not limited thereto, and the present invention may be identically applied to a radio frame structure of a TDD type or a radio frame structure to which an extended CP has been applied.

The structure of a physical uplink control channel (PUCCH) suitable for a short TTI proposed by this specification is described below.

In a next-generation communication system such as 5G, when information is exchanged, a scheme for achieving very short latency is taken into consideration. In other words, in a next-generation communication system, schemes supporting low latency service through difference compared to the previous generation mobile communications (3G, 4G, etc.) may be taken into consideration.

To this end, in a next-generation communication system, a structure in which the TTI is shortened is taken into consideration. Accordingly, in a next-generation communication system, a data and control information transport channel suitable for a short TTI needs to be newly defined. The present invention proposes a method of transmitting control information through a new uplink channel in a wireless communication system supporting a short TTI.

Hereinafter, for convenience of description, a terminal supporting a legacy LTE system is collectively referred to as a "legacy terminal", and a terminal supporting a next-generation communication system is collectively referred to as a "latency reduced (LR) terminal." In this case, the LR terminal may mean a terminal supporting a short TTI.

Furthermore, a next-generation communication system supporting a short TTI is collectively referred to as an "LR communication system."

Furthermore, in this specification, a user may mean a user equipment or a device used by a user, such as a terminal.

Multiplexing Method of PUCCHs Between Users in Short TTI

In the case of an LTE(-A) system (hereinafter referred to as an "Legacy system"), 1 TTI is defined as 14 symbols, 1 TTI is defined as 2 slots, and each slot is defined as 7 symbols.

Furthermore, a legacy system may multiplex the PUCCH transmissions of a maximum of 36 users (or a maximum of 36 terminals) using the orthogonal cover code (OCC) and cyclic shift (CS) of a base sequence within 1 slot.

Unlike in the legacy system, in the LR communication system, a short TTI may be defined in order to support low latency service.

In this case, the short TTI may mean a TTI in which the number of symbols included in 1 TTI is 1, 2, 3 or 4.

Accordingly, the LR communication system requires a new PUCCH structure capable of supporting a short TTI because a short TTI is defined.

The new PUCCH structure defined in the LR communication system may be considered to be divided into a case where multiplexing between a legacy terminal and an LR terminal is taken into consideration and a case where multiplexing between a legacy terminal and an LR terminal is not taken into consideration.

In various embodiments of the present invention, a base sequence may be used for the multiplexing of terminals. In this case, the generation of the base sequence is based on Equation 23.

$$\bar{r}(n) = e^{j\varphi(n)\pi/4}, \ 0 \leq n \leq 11 \qquad \text{[Equation 23]}$$

In this case, φ(n) contains phase information of each sequence element, and may be defined based on tables defined in a legacy LTE system (refer to Table 25 and Table 26).

Table 25 illustrates an example of phase information on a 12-length base sequence, and Table 26 illustrates an example of phase information on a base sequence of a length 24.

TABLE 25

| u | φ(0), . . . , φ(11) | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

TABLE 26

| u | φ(0), . . . , φ(23) |
|---|---|
| 0  | -1 3 1 -3 3 -1 1 3 -3 3 1 3 -3 3 1 1 -1 1 3 -3 3 -3 -1 -3 |
| 1  | -3 3 -3 -3 -3 1 -3 -3 3 -1 1 1 1 3 -1 3 -3 -3 1 3 1 1 1 -3 |
| 2  | 3 -1 3 3 1 1 -3 3 3 3 3 1 -1 3 -1 1 1 -1 -3 -1 -1 1 3 3 |
| 3  | -1 -3 1 1 3 -3 1 1 -3 -1 -1 1 3 1 3 1 -1 3 1 1 -3 -1 -3 -1 |
| 4  | -1 -1 -1 -3 -3 -1 1 1 3 3 -1 3 -1 1 -1 -3 1 -1 -3 -3 1 -3 -1 -1 |
| 5  | -3 1 1 3 -1 1 3 1 -3 1 1 -1 -1 3 -1 -3 3 -3 -3 -3 -1 1 1 |
| 6  | 1 1 -1 -1 3 -3 -3 3 -3 1 -1 -1 1 -1 1 1 -1 -3 -1 1 -1 3 -1 -3 |
| 7  | -3 3 3 -1 -1 -3 -1 3 1 3 1 3 1 1 -1 3 1 -1 1 3 -3 -1 -1 1 |
| 8  | -3 1 3 -3 1 -1 -3 3 -3 3 -1 -1 -1 -1 1 -3 -3 -3 1 -3 -3 -3 1 -3 |
| 9  | 1 1 -3 3 3 -1 -3 -1 3 -3 3 3 3 -1 1 1 -3 1 -1 1 1 -3 1 1 |
| 10 | -1 1 -3 -3 3 -1 3 -1 -1 -3 -3 -3 -1 -3 -3 1 -1 1 3 3 -1 1 -1 3 |
| 11 | 1 3 3 -3 -3 1 3 1 -1 -3 -3 -3 3 3 -3 3 3 -1 -3 3 -1 1 -3 1 |
| 12 | 1 3 3 1 1 1 -1 -1 1 -3 3 -1 1 1 -3 3 3 -1 -3 3 -3 -1 -3 -1 |
| 13 | 3 -1 -1 -1 -1 -3 -1 3 3 1 -1 1 3 3 3 -1 1 1 -3 1 3 -1 -3 3 |
| 14 | -3 -3 3 1 3 1 3 1 3 1 1 3 -1 -1 3 1 -3 -1 3 1 1 3 3 -1 |
| 15 | -1 -1 1 -3 1 3 -3 1 -1 -3 -1 3 1 -1 -3 -3 -1 -1 -3 -3 3 3 -1 |
| 16 | -1 -3 3 -1 -1 -1 -1 1 1 -3 3 1 3 3 1 -1 1 -3 1 -3 1 1 -3 -1 |
| 17 | 1 3 -1 3 3 -1 -3 1 -1 -3 3 3 3 -1 1 1 3 -1 -3 -1 3 -1 -1 -1 |
| 18 | 1 1 1 1 1 -1 3 -1 -3 1 1 3 -3 1 -3 -1 1 1 -3 -3 3 1 1 -3 |
| 19 | 1 3 3 1 -1 -3 3 -1 3 3 3 -3 1 -1 1 -1 -3 -1 1 3 -1 3 -3 -3 |
| 20 | -1 -3 3 -3 -3 -3 -1 -1 -3 -1 -3 3 1 3 -3 -1 3 -1 1 -1 3 -3 1 -1 |
| 21 | -3 -3 1 1 -1 1 -1 1 -1 3 1 -3 -1 1 -1 1 -1 -1 3 3 -3 -1 1 -3 |
| 22 | -3 -1 -3 3 1 -1 -3 -1 -3 -3 3 -3 3 -3 -1 1 3 1 -3 1 3 3 -1 -3 |
| 23 | -1 -1 -1 -1 3 3 3 1 3 3 -3 1 3 -1 3 -1 3 3 -3 3 1 -1 3 3 |
| 24 | 1 -1 3 3 -1 -3 3 -3 -1 -1 3 -1 3 -1 -1 1 1 1 1 -1 -1 -3 -1 3 |
| 25 | 1 -1 1 -1 3 -1 3 1 1 -1 -1 -3 1 1 -3 1 3 -3 1 1 -3 -3 -1 -1 |
| 26 | -3 -1 1 3 1 1 -3 -1 -1 -3 3 -3 3 1 -3 3 -3 1 -1 1 -3 1 1 1 |
| 27 | -1 -3 3 3 1 1 3 -1 -3 -1 -1 3 1 -3 -3 -1 3 -3 -1 -3 -1 -3 -1 |
| 28 | -1 -3 -1 -1 1 -3 -1 -1 1 -1 -3 1 1 -3 1 -3 -3 3 1 1 -1 3 -1 -1 |
| 29 | 1 1 -1 -1 -3 -1 3 -1 3 -1 1 3 1 -1 3 1 3 -3 -3 1 -1 -1 1 3 |

Furthermore, the cyclic shift (CS) of a base sequence may be the same as Equation 24.

$$r^{(\alpha)}(n)=e^{j\alpha n}\bar{r}(n),\ 0\leq n<11 \quad \text{[Equation 24]}$$

In this case, α may mean a cyclic shift index.

Furthermore, the OCC of a base sequence may be defined based on Tables 27 to 29. Table 27 means a length-3 discrete Fourier transform (DFT) sequence, Table 28 means a 4-length Walsh sequence, and Table 29 means a 2-length Walsh sequence.

TABLE 27

| Sequence index | Orthogonal sequences |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

TABLE 28

| Sequence index | Orthogonal sequences |
|---|---|
| 0 | [+1 +1 +1 +1] |
| 1 | [+1 -1 +1 -1] |
| 2 | [+1 -1 -1 +1] |
| 3 | [+1 +1 -1 -1] |

TABLE 29

| Sequence index | Orthogonal sequences |
|---|---|
| 0 | [1 1] |
| 1 | [1 -1] |

Furthermore, in various embodiments of the present invention, a Zadoff-Chu sequence may also be taken into consideration for the multiplexing of terminals in addition to the base sequence.

The multiplexing of terminals may include multiplexing terminals using the aforementioned base sequence and the CS and OCC of the base sequence.

Hereinafter, in an LR communication system proposed by the present invention, PUCCH structures that may be used for the multiplexing of terminals are described.

PUCCH Structure for Multiplexing Legacy Terminal and LR Terminal

In order for an LR terminal and a legacy terminal to be multiplexed, a new PUCCH structure needs to be designed based on a structure in which a TTI is 14 symbols.

The new PUCCH structure may be basically configured to properly assign an OCC and/or CS combination for each length of each TTI or for each length group of a TTI.

In this case, in order to configure an OCC and/or CS combination for each length of each TTI or for each group of the length of a TTI, an eNB may use higher layer signaling independent from a terminal for each TTI length or TTI length group. For example, a higher layer signal may be configured in a starting offset form for a PUCCH resource index. In other words, an eNB may notify a terminal of information on a configuration for the resource of a PUCCH for each TTI length or each TTI group using a higher layer signal.

Furthermore, in order to configure an OCC and/or CS combination for each length of each TTI or each length group of a TTI, an eNB may directly notify a terminal of an OCC index and/or an CS index.

In the present invention, basically, assuming the transmission of a 12-subcarrier unit corresponding to 1 RB, a 12-length base sequence is described as an example. However, this is only for convenience of description, and does not limit the scope of the present invention.

In other words, if an uplink signal is transmitted in multiple RB units (e.g., 2 RBs), a base sequence for configuring a new PUCCH may be extended to a sequence of a different length (e.g., length 24). For example, if an uplink signal is transmitted in a 2-RB unit, a 24-length base sequence may be used as shown in Table 25.

Furthermore, in the following examples, if a latency reduced (LR)-PUCCH is transmitted without taking into consideration multiplexing with a legacy PUCCH, the positions and/or number of demodulated reference signals (DMRSs) of an LR-PUCCH may vary. In this case, the LR-PUCCH may mean a PUCCH structure using a short TTI.

"A and/or B" used in this specification may be construed as having the same meaning as that "at least one of A and B is included".

FIG. 21 illustrates detailed examples of a PUCCH based on each TTI length, to which the present invention may be applied. FIG. 21 is only for convenience of description, and does not limit the scope of the present invention.

PUCCH Structure when TTI is 7 Symbols

FIG. 21(a) illustrates an example of an LR-PUCCH structure in a TTI configured as 7 symbols (or including 7 symbols).

In the case of the LR-PUCCH structure in which a TTI includes 7 symbols, the PUCCH structure of one slot unit (or symbol) of legacy LTE may be applied in the same manner. Accordingly, the multiplexing of a legacy terminal and an LR terminal may be performed using both OCC and a CS within the 7 symbols.

As shown in FIG. 21(a), OCC may be applied to a DMRS region, that is, 3 DMRS symbols, as a 3-length DFT sequence. OCC may be applied to an ACK/NACK region, that is, 4 ACK/NACK symbols, as a length-4 Walsh sequence.

Furthermore, if a 12-length base sequence and CS is used with respect to the entire region (7 symbols), an eNB may multiplex and support a maximum of 36 terminals.

More specifically, the CS indices 0 to 3 of 12 CS indices may be allocated to legacy terminals, and the CS indices 4 to 11 thereof may be allocated to LR terminals. Accordingly, 12 legacy terminals and 24 LR terminals may transmit information (or a PUCCH) to an eNB at the same time.

PUCCH Structure in which TTI Includes 5 Symbols

FIG. 21(b) illustrates an example of an LR-PUCCH structure in a TTI configured as 5 symbols. In this case, a legacy terminal and an LR terminal may be multiplexed using both OCC and a CS.

In this case, the legacy terminal and the LR terminal may be divided based on an allocated CS index.

For example, if a 12-length base sequence is used, a No. 4 CS index may be allocated to a legacy terminal, and a No. 8 CS index may be allocated to an LR terminal. In the case of the legacy terminal, a total of 12 legacy terminals may transmit PUCCHs at the same time because OCC using a 3-length DFT sequence is applied to four CS indices and a DMRS region. In contrast, LR terminals may be divided every four based on the position of a TTI in which 8 CS indices are transmitted, and OCC using length-3 and length-2 DFT sequences is applied to a DMRS region and a data region. Accordingly, a maximum of 16 LR terminals may transmit PUCCHs at the same time. As a result, a total of 28 legacy terminals and LR terminals may be multiplexed. In other words, in such a case, a total of 28 terminals may transmit PUCCHs at the same time.

PUCCH Structure in which TTI Includes 4 Symbols

FIG. 21(c) illustrates an example of an LR-PUCCH structure in a III configured as 4 symbols.

Unlike in the case where the number of symbols of a TTI is 7 and 5, the region of the LR-PUCCH in the TTI configured as 4 symbols may go crisscross and overlap. Accordingly, if an overlap region between LR-PUCCH regions occurs, there is a difference from the case where the TTI is 7 symbols in terms of multiplexing capability.

In this case, a legacy terminal and LR terminals may be multiplexed using the CS indices of a 12-length base sequence. However, unlike in the aforementioned two cases (i.e., the number of symbols of a TTI is 7 and 5), the transmission region of LR terminals may be divided into two parts. Accordingly, in order to multiplex the legacy terminal and the LR terminals, 12 CS indices may be divided into three groups every four.

In this case, the legacy terminal may apply OCC to the DMRS region using a 3-length DFT sequence and may apply OCC to the ACK/NACK region using a 4-length Walsh sequence. In contrast, the LR terminal may apply OCC to the DMRS region and the ACK/NACK region using a 2-length Walsh sequence. As a result, in the case of FIG. 21(c), if the CS index and the OCC are applied as in the example, a total of 28 legacy terminals and LR terminals may be multiplexed. That is, the 28 terminals may transmit PUCCHs at the same time.

PUCCH Structure in which TTI Includes 3 Symbols

FIG. 21(d) illustrates an example of an LR-PUCCH structure in a TTI configured as 3 symbols. If a 12-length base sequence is used for PUCCH transmission, a legacy terminal and LR terminals may be multiplexed by properly distributing CS indices. For example, CS indices 0 to 3 may be allocated to the legacy terminal, and CS indices 4 to 11 may be allocated to the LR terminals. In this case, 12 legacy terminals and 8 LR terminals may transmit PUCCHs at the same time because the legacy terminals may apply OCC to a DMRS region using a 3-length DFT sequence and apply OCC to an ACK/NACK region using a 4-length Walsh sequence.

PUCCH Structure in which Multiplexing is Performed Using Only LR-PUCCHs

FIGS. 21(a) to 21(d) show examples of cases where a legacy terminal and an LR terminal are multiplexed. However, an LR-PUCCH structure in which OCC and/or a CS for each length of each TTI are combined may also be applied to a case where an LR terminal is not multiplexed with a legacy terminal.

In this case, LR-PUCCHs may be multiplexed in such a manner that LR terminals transmit an LR-PUCCH so that it corresponds to a 1-slot (i.e., 7 symbols) unit used by a legacy terminal.

FIG. 22 illustrates a PUCCH structure when only LR-PUCCHs are multiplexed, to which the present invention may be applied. FIG. 22 is only for description, and does not limit the scope of the present invention.

Referring to FIG. 22, in the case of an LR-PUCCH in which the length of a TTI is 4 (or configured as four symbols), an LR-PUCCH structure in which a symbol for DMRS transmission and a symbol for ACK/NACK transmission are alternately disposed is possible. In this case, since it is not necessary to take into consideration multiplexing with a legacy terminal, a DMRS position may be configured as in FIG. 22, by taking into consideration slot hopping within each TTI.

In this case, the CS index of a sequence (or a base sequence) for a DMRS is differently configured in a shared symbol. Accordingly, multiplexing between terminals whose PUCCH transmission region overlap may be performed.

In contrast, if the same LR terminal continues to transmit an LR-PUCCH in two TTIs, it may be configured to use the same cyclic shift index in the two TTIs. In this case, an eNB may transmit information on the configuration to the terminal through higher layer signaling.

Furthermore, in various embodiments of the present invention, if an LR-PUCCH is transmitted to correspond to a 1-slot (7 symbols) unit used by a legacy terminal, an LR terminal does not share a DMRS symbol, but may transmit the LR-PUCCH to an eNB using TTIs of different lengths. For example, by configuring the lengths (or transmission units) of LR-PUCCHs to be 3 symbols and 4 symbols, respectively, the LR terminal may transmit the LR-PUCCH based on a 7-symbol unit. In the aforementioned example, the same LR-terminal has been illustrated as transmitting LR-PUCCHs configured as different lengths. However, the LR-PUCCHs of different lengths may be transmitted by different terminals.

In this specification, the length (or transmission unit) of an LR-PUCCH may mean the length of a TTI in which the LR-PUCCH is transmitted.

Structure Applicable Regardless of TTI Length
PUCCH Structure Using Base Sequence Assuming that a short TTI in an LR communication system includes 7 symbols based on a frame structure used in a legacy terminal, a DMRS symbol for channel estimation and a symbol in which ACK/NACK information is transmitted may be divided and defined for the PUCCH transmission of a terminal.

However, in addition to the case where a DMRS symbol and the symbol of ACK/NACK information are divided, ACK/NACK information need to be classified if PUCCH transmission is performed using only a DMRS symbol. For example, in a system in which a TTI is one symbol, it is determined that a symbol for ACK/NACK is difficult to be discontiguously allocated. Accordingly, ACK/NACK should be classified using only a DMRS symbol. Furthermore, an LR terminal may repeatedly use a PUCCH structure when a TTI is one symbol in order to transmit an LR-PUCCH in a TTI configured as a plurality of symbols. If such a method is used, unlike in the existing legacy PUCCH transmission method, there are effects in that latency time taken for the entire communication process can be reduced because the time necessary for channel estimation can be reduced and frequency hopping can be applied to a case where a TTI is configured as 2 symbols.

A PUCCH structure capable of classifying ACK/NACK information using only a DMRS symbol is described because it is necessary to classify ACK/NACK using only the aforementioned DMRS symbol.

In the following description, a terminal may mean the aforementioned LR terminal. Furthermore, a PUCCH may mean the aforementioned LR-PUCCH.

FIG. 23 illustrates the structure of a PUCCH using a base sequence to which the present invention may be applied. FIG. 23 is only for convenience of description, and does not limit the scope of the present invention.

Referring to FIG. 23, in a new structure proposed by the present invention, basically, CS indices may be properly assigned for each TTI length. In this case, one or more pairs of CS indices may be allocated to terminals using the same TTI length. Furthermore, terminals using different TTI lengths may be multiplexed because a different CS index is properly assigned to each TTI length.

In this case, an eNB may configure (or allocate) a CS index by performing independent higher layer signaling on a terminal for each TTI length or each TTI length group. Furthermore, a scheme for an eNB to previously define a CS index to be used based on the transmission position of an allocated PUCCH and to select the defined CS index may be taken into consideration. In this case, the eNB may previously have shared information on a CS index and a PUCCH transmission position corresponding to the CS index with a terminal.

In order to transmit 1-bit ACK/NACK information using only a DMRS symbol, as shown in FIG. 23, CS indices may be divided into two regions (or two groups). For example, 12 CS indices may be divided into the region in which ACK is transmitted (CS indices 0 to 5) and the region in which NACK is transmitted (index 6 to 11) and configured. That is, a terminal receives the CS indices 0 and 6 allocated thereto, and may transmit a PUCCH using the CS index 0 in the case of ACK and may transmit a PUCCH using the CS index 6 in the case of NACK. In other words, the terminal may transmit a PUCCH using only one CS index of the allocated two CS indices depending on whether it will transmit ACK or NACK. In this case, what the terminal transmits a PUCCH using a CS index may mean that the terminal transmits a base sequence to which the CS index has been applied through the symbol of the PUCCH.

If CS indices are grouped depending on ACK/NACK, CS indices corresponding to each group may be configured contiguously and/or discontiguously. For example, a terminal may use only three CS index pairs, that is, (0,6), (2,8), and (4,10), through a method of using only the CS indices 0, 2, and 4 without using all the CS indices 0 to 5 when it transmits ACK and using only the CS indices 6, 8, and 10 without using all the CS indices 6 to 11 if it transmits NACK.

Furthermore, in various embodiments of the present invention, as shown in FIG. 23, a method of alternately designating CS indices to ACK/NACK without dividing the CS indices into two regions may be taken into consideration. In other words, CS indices are not divided into two regions and ACK/NACK may be distinguished based on a CS index. For example, the CS index pair (0,6) may be configured to correspond to (ACK, NACK), and the CS index pair (1,7) may be configured to correspond to (NACK, ACK).

In the aforementioned method, a case where a PUCCH includes only one symbol has been described. However, the method may be applied to a TTI of multiple symbol units (or a TTI configured as multiple symbols) through a method, such as the repetitive transmission. If the method is applied to a TTI of multiple symbol units, a CS index may be allocated to a different pair for each symbol.

Furthermore, if the aforementioned method is used, terminals using various TTI lengths may be multiplexed. For example, in FIG. 23, while a terminal whose TTI includes 4 symbols receives the CS index pair (0, 6) allocated thereto and transmits ACK/NACK, a terminal whose TTI includes 2 symbols may receive another pair (e.g., (1,7)) allocated thereto other than the CS index pair (0,6) and may transmit a PUCCH twice. For another example, two terminals whose TTI includes 2 symbols may receive different CS index pairs (e.g., (1,7) and (2,8)) allocate thereto, respectively, and may sequentially transmit PUCCHs every 2 symbols in the 4-symbol interval.

Furthermore, if the aforementioned method is used in a plurality of symbol unit TTIs, terminals may be multiplexed by applying OCC. In other words, terminals may transmit PUCCHs at the same time by applying OCC to multiple symbols. For example, if a TTI includes 2 symbols, 2 terminals may be multiplexed by applying a 2-length Walsh sequence to the 2 symbols. For another example, if a TTI includes 3 symbols, three terminals may be multiplexed by applying a 3-length DFT sequence to the 3 symbols.

Furthermore, in various embodiments of the present invention, in order to improve multiplexing capability between terminals, a CS index and OCC may be applied together. For example, although the CS index pair (0,6) is allocated to 4 terminals whose TTI includes 4 symbols, if a 4-length Walsh sequence is applied, the 4 terminals may be multiplexed. The aforementioned multiplexing method may be identically applied to the following contents using the structure of FIG. 23.

Furthermore, in various embodiments of the present invention, a PUCCH structure using a base sequence may be used to transmit 2-bit ACK/NACK.

FIG. 24 illustrates another PUCCH structure using a base sequence to which the present invention may be applied. FIG. 24 is only for convenience of description, and does not limit the scope of the present invention. In this case, a CS index may be used to transmit 2-bit ACK/NACK information.

Referring to FIG. 24, the CS indices of a base sequence may be divided into four sections (or regions or groups). For example, if it is necessary to transmit information NACK, ACK corresponding to 2 bits, a terminal may receive CS index pairs (0,3) and (6,9) allocated thereto, and may transmit NACK using the CS index 3 and transmit ACK using the CS index 6.

In this case, in the case of a system capable of transmitting two streams, a terminal may transmit two sequences having different CS indices at the same time.

In contrast, in the case of a system capable of transmitting only one stream at once, a terminal may divide each sequence into different resources (resources) and transmit the sequence. If each sequence is divided into different resources and 2-bit ACK/NACK information is transmitted, a terminal may transmit the 2-bit ACK/NACK information using the CS index pair (ACK1,NACK1) in a specific resource and transmit the 2-bit ACK/NACK information using the CS index pair (ACK2,NACK2) in another resource. Furthermore, another terminal may transmit 2-bit ACK/NACK information using the CS index pair (ACK2, NACK2) in a specific resource and transmit the 2-bit ACK/NACK information using the CS index pair (ACK1, NACK1) in another resource. In other words, terminals may be multiplexed because transmitted resources are distinguished.

Furthermore, if 2-bit ACK/NACK is divided into different resources and transmitted, a terminal may transmit the 2-bit ACK/NACK using different resources in twice using the (ACK/NACK) configuration of FIG. 23 without any change. Alternatively, if each bit is transmitted in a different resource, a terminal may change a CS index for each bit.

In this case, an eNB may transfer (transmit) information on a CS index configuration, such as that described above, to a terminal through higher layer signaling.

Furthermore, in various embodiments of the present invention, a terminal may transmit ACK/NACK using a structure (structure, such as FIG. 23) compressed into 1 bit by bundling ACK/NACK information of two bits or more. In this case, the bundling may be spatial bundling. Furthermore, in the case of 2-bit ACK/NACK using AND operation, the 2-bit ACK/NACK may be mapped to 1 in the case of ACK, and may be mapped to 1 if one NACK is included.

A method of bundling and transmitting 2-bit ACK/NACK as 1 bit may be divided into a bundling mode and a 2-bit ACK/NACK transmission mode, that is, two modes and changed according to circumstances.

In this case, an eNB may transmit information on the configuration of a mode to a terminal through higher layer signaling and/or downlink control information (DCI). Alternatively, an eNB may transmit information on the configuration of a mode to a terminal using an implicit method based on a control channel element (CCE) index.

FIG. 25 illustrates yet another PUCCH structure using a base sequence, to which the present invention may be applied. FIG. 25 is only for convenience of description, and does not limit the scope of the present invention. In this case, a CS index may be used to transmit 2-bit ACK/NACK information.

Referring to FIG. 25, a terminal may map 2-bit ACK/NACK to one CS index and transmit it. In this case, an eNB may transmit the configuration of the CS index to a terminal through higher layer signaling.

In various embodiments of the present invention, if coverage of a terminal is low, transmission power of the terminal may need to be concentrated on a small number of resource regions and transmitted In this case, the coverage of the terminal may mean a transmittable range based on the transmit power of the terminal. In this case, the terminal may adjust the length of a sequence used for PUCCH transmission. For example, a terminal may transmit information (or a PUCCH) using a unit smaller than one resource block (RB) (1 RB) of legacy LTE using a length-6 Zadoff-Chu sequence.

In contrast, if coverage of a terminal is high, the terminal may configure the length of a sequence to be longer and transmits information. That is, a user may transmit information using sequences of various lengths based on a coverage environment.

The method of transmitting ACK/NACK information using the CS index of the base sequence may be applied to a terminal operation in which coverage of the terminal is taken into consideration. For example, the CS index pairs 0 and 3 of a length-6 Zadoff-Chu sequence may be configured to correspond to 1-bit ACK and NACK, respectively.

Furthermore, in the case of 2-bit ACK/NACK information, a terminal may transmit a corresponding sequence by making (ACK,ACK), (ACK, NACK), (NACK, NACK), and (NACK, ACK) correspond to the CS indices 0, 2, 3, and 5, respectively, or may transmit the sequence through bundling as in the case of 1-bit ACK/NACK. Different terminals may transmit information using a code division multiplexing (CDM) method using different CS index pairs through the method.

Furthermore, if the length of a sequence is half the existing sequence, two different terminals may be subjected to frequency division multiplexing (FDM) into two regions within one resource block (RB). In this case, each user may transmit information using each frequency-divided region.

In this case, an eNB may transmit the resource element (RE) mapping rule of a short PUCCH (sPUCCH), transmitted in a specific TTI, to a terminal within a resource block through higher layer signaling and/or downlink control information (DCI). In this case, the resource block has been defined as 12 subcarriers*7 symbols in legacy LTE. In the case of a short TTI, the size of a resource block may be defined in various manners. In other words, in the present invention, a resource block may be defined as 12 subcarriers*an N symbol (symbols).

Furthermore, in various embodiments of the present invention, a method for a terminal to transmit a PUCCH through a single tone (or using a single tone method) may be taken into consideration. More specifically, a terminal may map CS indices included in an allocated CS index pair to the RE index of 1 RB, and may transmit PUCCHs using an on/off method. For example, if a terminal receives CS index pairs (0,3,6,9) allocated there to for 2-bit ACK/NACK and selects the CS index 3 based on the results of the decoding of downlink (DL) data, the terminal may transmit a given signal within an RE index 3 within the allocated RB instead of cyclically shifting a sequence (or a base sequence) by 3 and transmit the sequence.

The method of mapping information to an RE index and transmitting the information using the on/off method may also be applied to a case where information is transmitted over multiple symbols or a multi-tone method. For example, if information is transmitted through multiple RBs, a terminal may transmit PUCCHs as a tone corresponding to the number of RBs using the corresponding RE index of each RB.

In the aforementioned methods, a sequence may be a sequence using a pseudo noise (PN) sequence in addition to the Zadoff-Chu sequence. A terminal may configure a sequence and a modulated RE together and transmit a PUCCH.

The aforementioned contents have been described based on a case where the number of REs transmitting ACK/NACK is one. However, in various embodiments of the present invention, one or more REs in which HARQ-ACK is transmitted may be configured as a resource element group (REG) unit, such as 1, 2, 4, 6, or 12. An REG may be differently configured for each terminal. In this case, an eNB may transmit the number of REs that form the REG to a terminal through higher layer signaling and/or physical layer signaling. Furthermore, one or more REs within an REG may be formed of contiguous REs or may be formed of discontiguous REs. In this case, the REs that configure the REG may be configured over multiple symbols.

Furthermore, if a terminal transmits a sequence and a modulated RE together (In this case, the sequence may be used as a reference signal (RS)), the ratio of the sequence and the modulated RE may be set based on various options depending on a total number of REs. For example, if a terminal transmits a PUCCH using 6 REs, the ratio of a sequence and a modulated RE may be variously set like 1:5, 2:4, 3:3, 4:2, or 5:1.

In this case, the setting of the ratio may be previously set in a system or an eNB may transmit the setting of the ratio to a terminal through higher layer signaling and/or physical layer signaling.

Furthermore, in various embodiments of the present invention, the REG configured based on the method may be repeated and transmitted. A repetition level may be configured to be optionally 1, 2, 4, or 8 and transmitted. In this case, an eNB may transmit information on (or configuration) the repetition level to a terminal through higher layer signaling and/or physical layer signaling. In this case, the repetition may be applied in the frequency axis. Furthermore, if a PUCCH including multiple symbols is transmitted, the repetition may be applied in the time axis.

In this case, if PUCCH transmission is repeated in the frequency axis, a terminal may transmit the PUCCH in a frequency-contiguous manner, and may configure the PUCCH in a frequency-discontiguous manner and transmit the PUCCH. If the frequency-contiguous method is used, multiplexing capability between terminals can be improved by applying a frequency OCC. In contrast, if PUCCH transmission is repeated in the time axis, multiplexing capability can be improved by applying OCC (e.g., a Walsh or DFT sequence) having a lengthy corresponding to the number of symbols.

Furthermore, in addition to the aforementioned repetition method, a total number of REs in multiple RBs (e.g., 2 RBs) and multiple symbols may be configured into one REG and transmitted. In this case, if the total number of REs in the multiple RBs or multiple symbols is transmitted as one REG, inter-cell interference may be problematic because the length of a sequence is short. Accordingly, in order to reduce inter-cell interference, an inter-cell transmission region may be configured using the FDM method.

In this case, FDM may be configured (performed) in an REG unit between cells. For example, the eNB of each cell may classify resources that may be allocated from each cell to terminals using a method of calculating the index of a starting RE upon REG unit transmission based on a total number of cells that classify resources through a cell identifier (ID) and/or FDM. Furthermore, the eNB of each cell may allocate resources by notifying a terminal of one or multiple indices of such starting REs. In this case, the eNB may notify (or transfer) a terminal of the index(es) through higher layer signaling and/or physical layer signaling.

Furthermore, if CDM is possible within each REG, multiplexing between terminals may be performed using a CDM method.

Furthermore, in addition to the aforementioned REG unit FDM method, a transmission region may be previously designated in a frequency band for each cell. In this case, each inter-cell transmission region may be configured in a frequency-contiguous or -discontiguous manner.

In this case, the inter-cell transmission region may be determined using a cell identifier (ID). For example, if each inter-cell transmission region is configured in a frequency-contiguous manner, the number of REs of each inter-cell transmission region may be determined based on the number of cells that perform FDM on resources and divide the resources with them. Furthermore, a cell ID may be used to denote the RE index of a starting point in a plurality of transmission. For another example, if the inter-cell transmission region is configured in a frequency-discontiguous manner (in this case, assuming that the size of the discontiguously configured region is identically configured), an offset value may be calculated using the number of discontiguous resources per cell and the number of cells that perform resources and divide the resources with them. Accordingly, the RE index of the starting point of each discontiguous resource may be determined. In this case, a system may separately define the number of discontiguously configured regions. In other words, the system may individually define the number of discontiguously configured regions.

Furthermore, multiplexing between terminals may be performed using a CDM (a Zadoff-Chu sequence or a frequency OCC), FDM and/or TDM method (configured in multiple symbols) between terminals within the transmission region of each cell.

FIG. 26 illustrates an example of an FDM method between transmission regions for each cell, to which the present invention may be applied. FIG. 26 is only for description, and does not limit the scope of the present invention.

Referring to FIG. 26, a region in which uplink control information (UCI) may be transmitted within one symbol is configured to be a total of 1000 from 0 to 999 based on an RE index in a frequency-contiguous manner within a system. Furthermore, if the number of cells that divide resources with them through FDM is 4, a 250 RE region is allocated to each cell. In this case, the index of the starting RE of each region may be determined using a cell ID.

FIG. 26(a) illustrates each cell transmission region if the 250 RE region of each cell is configured in a frequency-contiguous manner.

In contrast, FIG. 26(b) illustrates the transmission region of each cell if 5 discontiguous resources are configured for each cell. More specifically, if 5 discontiguous resources (assuming the same size) are configured for each cell, the 250 REs may be configured as the discontiguous REs of a 50 unit. In this case, the starting index of the discontiguous resource per cell (starting index, that is, the index of the starting RE) may be determined using the number of discontiguous resources and a cell identifier (ID).

In this case, if repetition transmission for a PUCCH is performed in an REG unit using multiple symbols and discontiguous frequency resources or REs that form an REG are configured over multiple symbols and discontiguous frequency resources, a terminal needs to transmit a PUCCH by distributing the PUCCH to the max in the time axis and/or frequency axis. A multiplexing effect can be maximized because a terminal distributes and transmits a PUCCH.

As in FIG. 26, if an UCI transmission region is configured in a total of 250 REG units, assuming that the number of cells that divide resources with them through FDM and a repetition level are 10 and 5 times, a total of 25 REGs are distributed in a frequency band and configured for each cell. In this case, the 25 REGs may be distributed and configured in the frequency band in a frequency-contiguous or frequency-discontiguous manner. In this case, if OCC is applied to use multiplexing capability to the max, a terminal may transmit a PUCCH by repeatedly applying the transmission region structure of cells to the time axis. In contrast, if OCC is not applied, a terminal may transmit a PUCCH by cyclically shifting a transmission position in the frequency axis within a transmission resource using an offset value.

As described above, an eNB may transmit ACK/NACK information using the sequence of a DMRS symbol (i.e., using only a DMRS symbol).

Furthermore, in addition to ACK/NACK information, the PUCCH structure using a base sequence proposed by the present invention may also be used for a) a case where a scheduling request between an eNB and a user is taken into consideration, b) a case where multiplexing users is taken into consideration, and c) a case where transmit diversity related to an antenna port is taken into consideration.

Furthermore, in various embodiments of the present invention, the cases a), b) and/or c) may be taken into consideration in parallel.

Case where SR Transmission in PUCCH Structure Using Base Sequence is Taken into Consideration FIG. 27 illustrates an example in which ACK/NACK and a scheduling request (SR) are transmitted together using a base sequence, to which the present invention may be applied. FIG. 27 is only for description, and does not limit the scope of the present invention.

Referring to FIG. 27, a terminal may transmit an SR along with ACK/NACK information using a cyclic shift index in a positive SR region or using a cyclic shift index in a negative SR region. In other words, the CS indices of a base sequence are configured to be mapped to an SR and ACK/NACK information at the same time.

In this case, an eNB may transmit information on the ACK/NACK information and SR region configuration to a terminal through higher layer signaling.

Furthermore, the eNB may transmit a PUCCH resource index to a terminal along with the configuration. Although the same cyclic shift index is used, multiplexing capability between terminals can be improved based on the PUCCH resource index because a transmission resource position is different set.

Furthermore, although terminals using different TTIs coexist, an eNB may transmit a PUCCH resource index and/or offset to the terminal for each TTI through higher layer signaling.

In various embodiments of the present invention, when a terminal transmits ACK/NACK using the structure of FIG. 23, the terminal may use a base sequence different from a base sequence used to transmit the ACK/NACK in order to transmit an SR. For example, in the legacy LTE system, if base sequences are subdivided into groups within 30 base sequence sets, the base sequences belonging to different groups may be used for ACK/NACK information and SR transmission. In other words, a terminal may use a base sequence belonging to a first group in order to transmit an SR, and may use a base sequence belonging to a second group in order to transmit ACK/NACK information.

In this case, an eNB may transmit information on the base sequence to the terminal through higher layer signaling.

Furthermore, if multiple terminals use the same base sequence in resources through which SRs are transmitted, a method of multiplexing the SRs using different CS indices based on the same base sequence may be taken into consideration.

Furthermore, the SRs of multiple terminals may be multiplexed using different base sequences within a base sequence group used for the SRs. Such a method may be identically applied to a case where 2-bit ACK/NACK information is transmitted (e.g., the method described in FIG. 24). In this case, an eNB may transmit ACK/NACK and an SR configuration to the terminals through higher layer signaling. In other words, the eNB may transmit information on the ACK/NCK and SR configuration to the terminals through higher layer signaling.

Furthermore, in the case of ACK/NACK information of two bits or more, a terminal may compress the ACK/NACK information into 1 bit by bundling the ACK/NACK information, and may transmit it along with an SR. In this case, the bundling may be spatial bundling, for example. 2-bit ACK/NACK may be mapped to 1 if the two bits are ACK and may be mapped to 0 if any one of the two bits is NACK using AND operation. In this case, an eNB may transmit information on the ACK/NACK information and SR configuration to the terminal through higher layer signaling.

Furthermore, if a PUCCH is transmitted using a CS index for an SR and ACK/NACK, a terminal may use a single tone or multiple tones. In this case, a CS index for an SR and ACK/NACK is mapped to an RE index, and a PUCCH may be transmitted using the on/off method of a signal transmitted through a corresponding RE. In this case, a mapping relation between the CS index and the RE index needs to be shared between an eNB and the terminal.

Multiplexing Between Terminals in PUCCH Structure Using Base Sequence

In the aforementioned description, a case where LR terminals that transmit PUCCHs using a base sequence are multiplexed has been generally described.

However, if the CS index pair of a base sequence is divided into a legacy terminal and an LR terminal and allocated (or configured), multiplexing between the legacy terminal and the LR terminal may be performed. For example, in FIG. 21, if a legacy PUCCH structure including 7 symbols is taken into consideration, the CS index pairs (0,6), (1,7), and (2,8) may be allocated to the legacy terminal and the CS index pairs (3,9), (4,10), and (5,11) may be allocated to the LR terminal. In this case, an eNB may allocate an index pair to a legacy terminal so that PUCCH transmission using a base sequence can be performed or may perform control so that CS indices not included in a CS index pair allocated to an LR terminal are allocated to a legacy terminal and legacy PUCCH transmission is performed.

FIG. 28 illustrates an example of multiplexing between terminals using a 4-symbol unit TTI and terminals using a 7-symbol unit TTI, to which the present invention may be applied. FIG. 28 is only for description, and does not limit the scope of the present invention.

Referring to FIG. 28, if terminals using a 4-symbol unit TTI share one symbol (the fourth symbol), they may transmit LR-PUCCHs based on 7 symbols, that is, one slot unit of a legacy terminal. Alternatively, FIG. 28 may show a case where the same terminals transmit an LR-PUCCH using a TTI of a 4-symbol unit, share one symbol, and transmit an LR-PUCCH using a next TTI of a 4-symbol unit (i.e., if the same terminal continuously transmit LR-PUCCHs over two TTIs). In FIG. 28, one symbol indicates a symbol in which a base sequence s transmitted.

In this case, the transmission unit of an LR-PUCCH may be extended to various symbol units (e.g., 2 symbols, 3 symbols or 5 symbols). Furthermore, if the transmission unit of an LR-PUCCH is extended to various symbol units, the number of symbols sharing two TTIs (or two LR-PUCCHs) may be extended to multiple symbols.

In this case, as described above, different terminals may be divided into CS index pairs and multiplexed. Furthermore, an eNB may transmit information on such a CS index pair to a terminal through higher layer signaling.

If the same terminals continuously transmit LR-PUCCHs over two TTIs as described above, they may use a CS index differently for each TTI in order to transmit the LR-PUCCH. In this case, the terminals may overlap the CS index in the middle shared symbol and transmit the LR-PUCCHs. In contrast, the CS index used in the shared symbol may be defined separately from that of an LR-PUCCH.

FIG. 29 illustrates an example in which a CS index for a symbol shared between TTIs is allocated, to which the present invention may be applied. FIG. 29 is only for description, and does not limit the scope of the present invention.

Referring to FIG. 29(a), CS indices 5 and 11 may be reserved for a shared symbol. In this case, the CS indices 5 and 11 are not used as a CS index pair, and may be allocated for LR-PUCCH transmission according to circumstances.

First, if the same terminals continuously transmit (ACK, ACK) or (NACK, NACK) in contiguous TTIs, the terminals may transmit LR-PUCCHs using the same cyclic shift index pair as a previous TTI.

However, if information transmitted in contiguous TTIs, such as (ACK, NACK) or (NACK, ACK), has a different type, the CS index of a shared symbol may be problematic because a CS index allocated to each TTI is different.

In this case, the problem may be solved because the index of a shared symbol is differently (as a reserved index) allocated. Referring to FIG. 29(b), if the same terminals transmit (ACK, NACK) in contiguous TTIs, the terminals may transmit LR-PUCCHs using the CS index 5 in the shared symbol. If (NACK, ACK) is transmitted, the user may transmit an LR-PUCCH using the CS index 11 in the shared symbol.

Furthermore, in other embodiments of the present invention, a user may transmit an index allocated to a shared symbol for the four symbols of the second TTI. For example, if (ACK, NACK) is transmitted, a user may transmit LR-PUCCHs using the CS index 0 up to the third symbol of the first TTI and using the CS index 5 during the 4 symbols (including the shared symbol) of the second TTI.

In this case, the number of CS indices reserved for the shared symbol may vary. Furthermore, an eNB may transmit information on a configuration related to the reserved CS index to the terminal through higher layer signaling.

Furthermore, the method of separately allocating a CS index for a shared symbol may also be applied to a case where an LR-PUCCH indicative of 2-bit ACK/NACK information is transmitted. In this case, if a terminal transmits an LR-PUCCH in a 1-RB unit, a cyclic shift index for transmitting 2-bit ACK/NACK information may be insufficient. In this case, the terminal may convert the 2-bit ACK/NACK information into 1-bit ACK/NACK information through bundling, and may transmit an LR-PUCCH using a CS index for the 1-bit ACK/NACK information.

In various embodiments of the present invention, an eNB may notify a user of the configuration of a PUCCH using a base sequence through higher layer signaling.

Furthermore, the configuration of a PUCCH may be implicitly configured through the first control channel element (CCE) index of a PDCCH. If the configuration of a PUCCH is implicitly configured, a cyclic shift index corresponding to an (ACK, NACK) pair used for LR-PUCCH transmission may be changed every TTI. Accordingly, if an LR-PUCCH is transmitted as a structure sharing a symbol, an operating method suitable for a case where a terminal continuously transmits (ACK,ACK) and (NACK, NACK) in addition to a case where a terminal continuously transmits (ACK, NACK) and/or (NACK, ACK) in neighbor TTIs may need to be taken into consideration.

FIG. 30 illustrates an example in which the same terminals transmit LR-PUCCHs in neighbor TTIs sharing a symbol, to which the present invention may be applied. In the case of FIG. 30, it is assumed that the configuration (or setting) of an LR-PUCCH is implicitly changed every TTI. FIG. 30 is only for convenience of description, and does not limit the scope of the present invention.

Referring to FIG. 30, although different pairs of CS indices are allocated to a terminal in order to transmit LR-PUCCHs in neighbor TTIs, respectively, the terminal may be configured to use a CS index set in a TTI (e.g., one of neighbor TTIs in the case of the same terminals), that is, a base, in a shared symbol. In this case, the CS index set (or allocated) in the TTI may mean a CS index allocated to the terminal in order for the terminal to transmit an LR-PUCCH in the corresponding TTI. In this case, an eNB may transmit the setting to a terminal through higher layer signaling and/or DCI.

Furthermore, the eNB may previously perform a configuration so that the terminal receives the same cyclic shift index pair allocated thereto for LR-PUCCH transmission in neighbor TTIs based on an offset value. In this case, the eNB may transmit information on the offset value to the terminal through higher layer signaling and/or DCI.

Furthermore, the same cyclic shift index may be allocated to terminals that transmit LR-PUCCHs in the same TTI, and multiplexing between the terminals may be performed as OCC is applied.

FIG. 31 illustrates an example in which OCC is applied to UEs using the same TTI, to which the present invention may be applied. FIG. 31 is only for description, and does not limit the scope of the present invention.

Referring to FIG. 31, the same cyclic shift index (a CS index 6 in FIG. 31) is allocated to UEs (a UE 3 and a UE 4) that transmit LR-PUCCHs in the same TTI unit, and OCC is applied to the UEs. In other words, multiplexing between users may be performed through OCC between users to which the same cyclic shift index is allocated. In this case, an eNB may transmit information on the configuration of the CS index and OCC to the UEs through higher layer signaling and/or DCI.

In various embodiments of the present invention, in addition to the structure shown in FIG. 31, if an LR-PUCCH is transmitted to correspond to the existing 1 slot unit (7 symbols) of a legacy terminal, an LR terminal may transmit the LR-PUCCH through TTIs of different lengths without sharing a symbol.

FIG. 32 illustrates examples in which a terminal transmits an LR-PUCCH without sharing a symbol, to which the present invention may be applied. FIG. 32 is only for description, and does not limit the scope of the present invention.

Referring to FIG. 32(a), a terminal may configure the transmission units (or lengths) of LR-PUCCHs to be 3 symbols and 4 symbols, respectively, and transmit the LR-PUCCHs. In this case, a symbol shared between the LR-PUCCHs may not be present while all the 7 symbols are used.

Furthermore, referring to FIG. 32(b), a terminal may empty one symbol between the transmitted LR-PUCCHs. In this case, the terminal may configure the LR-PUCCHs to be 3 symbols and 3 symbols, respectively, and transmit them. In other words, the terminal may transmit the LR-PUCCH using a TTI configured as 3 symbols.

Furthermore, referring to FIG. 32(c), if a sounding reference signal is transmitted in a specific symbol (e.g., the last symbol), a terminal may empty a corresponding specific symbol, may adjust the length of an LR-PUCCH or a legacy PUCCH, and may transmit the PUCCH.

In various embodiments, the transmission unit of an LR-PUCCH may be extended to various symbol units. For example, a terminal may transmit an LR-PUCCH based on TTIs configured as various numbers of symbols.

Furthermore, in various embodiments of the present invention, if LR terminals are multiplexed, a terminal whose ACK/NACK bit is 1 bit and a terminal whose ACK/NACK bits are 2 bits may be multiplexed into a structure, such as that described above. For example, if two terminals whose ACK/NACK bit is 1 bit and two terminals whose ACK/NACK bits are 2 bits are scheduled, an eNB may allocate CS index pairs (1,7) and (4,10) to the thermals whose ACK/NACK bit is 1 bit and allocate CS index pairs (0,3,6,9) and (2,5,8,11) to the terminals whose ACK/NACK bits are 2 bits, so the terminals may be multiplexed.

Furthermore, in various embodiments of the present invention, in allocating a CS index pair, a method of increasing flexibility may be taken into consideration. In this case, an eNB may allocate multiple CS index pair pools to a terminal through higher layer signaling (e.g., RRC signaling). Upon actual transmission, the eNB may allocate a CS index pair to the terminal through signaling, such as ACK/NACK resource indicator/indication (ARI). For example, a method for an eNB to allocate (0,6), (1,7), and (2,8) to a specific terminal as a CS index pool and to allocate one index pair through ARI according to a scheduling situation may be taken into consideration.

In other words, a CS index may be allocated to a terminal using a two-stage method for an eNB to allocate CS index pairs available for a specific terminal through higher layer signaling and to allocate a CS index to be actually used for the terminal through signaling, such as ARI.

Furthermore, in various embodiments of the present invention, if the aforementioned ACK/NACK information is transmitted along with an SR, different base sequences (root indices) may be used between terminals in order to improve multiplexing between the terminals.

In this case, as in the legacy LTE system, a different base sequence is allocated (or selected) for each cell at a specific point of time. More specifically, multiples base sequences may be determined based on a base sequence and/or a specific criterion for each cell. Different terminals transmit PUCCHs using multiple base sequences determined according to the method, thereby being capable of improving multiplexing capacity between terminals.

In this case, as an example of the specific criterion, a cross correlation between sequences or intercell interference attributable to cell planning may be taken into consideration.

In this case, an eNB may transmit information on a base sequence determined according to the aforementioned method to a terminal through higher layer signaling. Furthermore, the eNB may transmit information on a set (or group) of multiple available base sequences to the terminal. In this case, the terminal may select one or more of the base sequences included in the received base sequences, and may transmit a PUCCH.

Transmit Diversity in PUCCH Structure Using Base Sequence

If a PUCCH is transmitted in a short TTI, performance may be deteriorated compared to a case where a PUCCH is transmitted in a long TTI. In this case, if a terminal transmits a PUCCH using a specific antenna port that belongs to multiple antenna ports and that is determined to have high performance, performance can be improved. Accordingly, a method of compensating for performance deterioration may include the following method using transmit diversity.

In various embodiments of the present invention, if a terminal transmits a PUCCH through 2 symbols or more (in a TTI of 2 symbols or more), a method using transmit diversity, wherein an antenna is differently selected for each symbol, may be used. In this case, the aforementioned configuration may be used. For transmit diversity, a different resource may be allocated for each antenna port. In other words, in order to improve performance, a method of allocating a different CS index for each antenna port may be taken into consideration.

FIG. 33 illustrates an example in which a CS index is allocated for each antenna port, to which the present invention may be applied. FIG. 33 is only for convenience of description, and does not limit the scope of the present invention.

Referring to FIG. 33, the CS indices of a base sequence are allocated for each antenna port in order to use transmit diversity upon 1-bit ACK/NACK transmission. In one embodiment, CS indices 0 to 5 may be allocated to an antenna port 0, and CS indices 6 to 11 may be allocated to an antenna port 1.

For example, if a terminal transmits 1-bit ACK/NACK information, a different CS index pair pool may be configured for each antenna port. If a CS index is allocated to a terminal, a CS index pair (0,3) may be allocated to the antenna port 0 and a CS index pair (6,9) may be allocated to the antenna port 1. In this case, if a terminal transmits ACK, the terminal may transmit a PUCCH using the CS index 0 with respect to the antenna port 0 and using the CS index 6 with respect to the antenna port 1.

Furthermore, in addition to the aforementioned method, a different CS index pair may be allocated for each antenna port while maintaining the configuration of FIG. 23 (the division of ACK/NACK into two regions) without any change.

For another example, if 2-bit ACK/NACK information is transmitted, a terminal may transmit a PUCCH using the same method as that of FIG. 33 through ACK/NACK bundling. Furthermore, a different CS index pair may be allocated for each antenna port while maintaining the configuration of FIG. 25 without any change.

More specifically, if a terminal transmits 2-bit ACK/NACK information based on the configuration of the CS index pair pool shown in FIG. 25, the CS index pair (0, 3, 6, 9) may be allocated to the antenna port 0 and the CS index pair (2, 5, 8, 11) may be allocated to the antenna port 1.

PUCCH Structure Using Frequency OCC

The aforementioned methods may be contents regarding a method of configuring a PUCCH in one symbol length (or including that a unit in which a PUCCH is transmitted is one symbol length or that a TTI in which a PUCCH is transmitted is one symbol) using a base sequence. In contrast, another method of configuring a PUCCH in one symbol length includes a method of applying OCC in the frequency region. A method of configuring a PUCCH of one symbol length by applying OCC in the frequency region is described below.

FIG. 34 illustrates an example of a PUCCH to which OCC is applied in a frequency region, to which the present invention may be applied. FIG. 34 is only for convenience of description, and does not limit the scope of the present invention.

FIG. 34 is an example in which one symbol length with respect to a time axis and 12 subcarriers with respect to a frequency axis are taken into consideration, and is a structure in which a total of 12 REs may be used. FIG. 34 takes into consideration 12 subcarriers in the frequency axis, for description, and does not limit the scope of the present invention. In other words, a PUCCH (one symbol in the time axis) having one symbol length may be configured by taking into consideration 24 subcarriers (in this case, using a total of 24 REs).

In this case, available REs may be properly distributed for a reference signal (RS) and data and OCC may be applied in the frequency region. In this case, as the number of REs for an RS and an OCC length are changed, multiplexing capability may be adjusted. In other words, since the number of REs for an RS and the OCC length are differently allocated, the capability of user multiplexing can be adjusted, and detailed examples thereof are shown in FIG. 35.

FIG. 35 illustrates an example of the number of REs for an RS and OCC applied accordingly, to which the present invention may be applied. In FIG. 35, a 12-length base sequence has been illustrated as being used according to a 12-RE structure, but this is only for convenience of description and does not limit the scope of the present invention.

Referring to FIG. 35(a), 2 REs of the total of 12 REs is used to transmit an RS, the remaining 10 REs are used to transmit data, and OCC is applied in the frequency axis. In this case, a known sequence (e.g., a 2-length Walsh sequence) may be applied to the RE for transmitting an RS, and thus two terminals may be multiplexed. That is, users may be divided using the sequence of a length corresponding to the number of REs used to transmit an RS.

In FIG. 35(a), #1, #2, and #2' show an example of OCC which may be applied to an RE region for transmitting data other than an RS. In this case, one terminal uses the #1 OCC and the other terminal uses the #2 or #2' OCC, so the two different terminals may be multiplexed.

Referring to FIG. 35(b), 3 REs of the total of 12 REs are used to transmit an RS, the remaining 9 REs are used to transmit data, and OCC is applied in the frequency axis. As in the case where the number of REs for transmitting an RS is 2, a known sequence (a 3-length sequence) may be applied to REs for transmitting an RS, so three terminals may be multiplexed.

In this case, in FIG. 35(a), #1, #2, and #3 show an example of OCC which may be applied to the RE region for transmitting data other than an RS. In this case, one terminal uses the #1 OCC, another terminal uses the #2 OCC, and yet another terminal uses the #3 OCC, so the three different terminals may be multiplexed.

Furthermore, in various embodiments of the present invention, multiplexing between various numbers of terminals may be performed by extending the structure in the time axis and/or the frequency axis without any change and applying corresponding OCC.

PUCCH Structure Capable of Transmitting Multiple Bits

If a terminal transmits control information to an eNB, a large amount of bits compared to ACK/NACK information that may be expressed using 1 bit is required in order to transmit channel state information (CSI).

Assuming that CSI transmitted in an LR system is transmitted as the size of 20 bits as in a legacy system, if quadrature phase shift keying (QPSK) is applied, a total of 10 symbols may occur.

In this case, if a terminal transmits information using a structure in which the information is transmitted using a symbol unit of the 10 symbols, the terminal occupies multiple symbols. In this case, in order for the terminal to transmit CSI information, the terminal needs to occupy multiple symbols. Accordingly, the aforementioned structure may not be suitable for transmitting a PUCCH for CSI information in the LR system.

Accordingly, there is a need for a new PUCCH structure in which a terminal using a short TTI transmits CSI. To this end, in the present invention, a structure such as FIG. 36 may be taken into consideration. In the structure of FIG. 36, multiplexing between terminals is possible by properly applying a CS and OCC.

FIG. 36 illustrates an example of a PUCCH structure in which multiple bits may be transmitted, to which the present invention may be applied. FIG. 36 is only for convenience of description, and does not limit the scope of the present invention.

Referring to FIG. 36, if a TTI includes 3 symbols (i.e., a TTI including 3 symbols in the time axis), two different terminals may be multiplexed using two CS indices with respect to a DMRS region and using a 2-length Walsh sequence with respect to a data region. The same is true of a case where a TTI includes 4 symbols. Furthermore, if a TTI includes 4 symbols, two different terminals may be multiplexed if a 2-length Walsh sequence is used in each of the DMRS region and the data region.

In this case, since the region in which data is transmitted is configured as a total of 12 subcarriers, a terminal may transmit CSI (or information on CSI) using 10 of the 12 subcarriers, and may transmit ACK/NACK information and/or a scheduling request (SR) using the remaining 2 subcarriers.

Furthermore, as in the method, a terminal may transmit uplink control information (UCI) at the same point of time (or a symbol in the same time axis), but the terminal may combine only some configuration information of the UCI and transmit it. For example, a terminal may transmit only one of ACK/NACK and SR information or may transmit only two pieces of information of CSI, ACK/NACK, and an SR at the same time.

For example, if information on ACK/NACK and CSI are transmitted together, a terminal may map both the information on ACK/NACK and the CSI to 12 REs. For another example, a terminal may map only CSI to a data RE, and may transmit ACK/NACK information using an RS. For yet another example, a terminal may implicitly transmit ACK/NACK information by differently transmitting an RS sequence based on ACK/NACK.

If the multiple pieces of information are transmitted together, a terminal may transmit the pieces of information using contiguously configured subcarriers or subcarriers configured at specific interval (i.e., discontiguously).

Furthermore, in various embodiments of the present invention, if a carrier aggregation (CA) is taken into consideration, a terminal may use a structure, such as FIG. 36, in order to transmit multiple ACK/NACK information. For example, if it is necessary to transmit 10-bit ACK/NACK information for a total of 5 component carriers (CC), a terminal may convert the 10-bit ACK/NACK information into 24-bit information by applying coding to the 10-bit ACK/NACK information, and map the 24-bit information to 12 REs by applying QPSK modulation. Furthermore, a method for a terminal to transmit multiple bits using one RE by applying higher order modulation may be taken into consideration.

Unlike in the aforementioned frequency division duplex (FDD), if time division duplex (TDD) is taken into consideration, a terminal may need to transmit multiple ACK/NACK information based on an UL/DL configuration at once. In this case, the terminal may transmit multiple bits by applying ACK/NACK bundling or higher order modulation.

Furthermore, in various embodiments of the present invention, a PUCCH structure in which multiple bits can be transmitted may be extended multiple RB units in the frequency axis. Furthermore, multiplexing between terminals may also be applied. In other words, a terminal may transmit a PUCCH for transmitting multiple bits in multiple RB units in the frequency axis. In this case, multiplexing between terminals may be taken into consideration.

FIG. 37 illustrates an example of a PUCCH structure using multiple RBs for transmitting multiple bits, to which the present invention may be applied. FIG. 37 is only for convenience of description, and does not limit the scope of the present invention.

Referring to FIG. 37, UEs (UE 1 and UE 2) transmit PUCCHs for transmitting multiple bits in a 2-RB unit. In this case, a sequence is used for multiplexing between UEs with respect to the region for transmitting an RS (means a DMRS in FIG. 37). Furthermore, different UEs may use an interleaving method of transmitting data with respect to the region for transmitting data.

Furthermore, in various embodiments of the present invention, a UE may transmit multiple bits using a PUCCH having a comb structure.

FIG. 38 illustrates an example of a PUCCH structure having a comb structure in which multiple bits may be transmitted, to which the present invention may be applied. FIG. 38 is only for convenience of description, and does not limit the scope of the present invention.

Referring to FIG. 38, a terminal may transmit each DMRS and data every other subcarrier.

In this case, for the estimation of channel information, DFT may not be applied to a subcarrier (DMRS subcarrier) for transmitting the DMRS, but DFT may be applied to a subcarrier (data subcarrier) for transmitting data. Alternatively, DFT may not be applied to both the subcarriers of the two cases.

In this case, in order to transmit CSI using a TTI configured as one symbol in an LR system, a terminal may transmit CSI having a size different from that of a legacy system. For example, a terminal may have CSI configured as 5 REs for multiplexing with ACK/NACK information and may have ACK/NACK information configured as 1 RE.

Furthermore, in the aforementioned comb structure, the positions and/number of subcarriers for transmitting a DMRS may vary.

In various embodiments of the present invention, a terminal may transmit an LR-PUCCH based on the 1 slot unit (7 symbols) of a legacy terminal using the aforementioned comb structure.

FIG. 39 illustrates an example of a PUCCH structure having a comb structure for a DMRS, to which the present invention may be applied. FIG. 39 is for convenience of description and does not limit the scope of the present invention.

Referring to FIG. 39(*a*), if terminals using a 4-symbol unit TTI (a TTI including 4 symbols) share one symbol, they may transmit LR-PUCCH based on 7 symbols, that is, the 1 slot unit of a legacy terminal. In this case, the transmission unit of the LR-PUCCH may be extended to various symbol units. Accordingly, the number of symbols shared between the LR-PUCCHs may be extended to a multiple number.

Referring to FIG. 39(*b*), a DMRS region (or a region for transmitting a DMRS) may have a comb structure, such as FIG. 38. One LR-PUCCH structure included in FIG. 39(*a*) includes the DMRS region of 2 symbols.

In this case, in the case of the fourth symbol (fourth symbol in the time axis) of the LR-PUCCH, a terminal has to empty a subcarrier region other than the DMRS region and transmits the LR-PUCCH for multiplexing with the LR-PUCCH transmitted in a next TTI. However, in the third symbol, the terminal may empty a subcarrier region other than the DMRS region or fill the subcarrier region with data and transmit the PUCCH.

Furthermore, a sequence used to transmit a DMRS may be determined based on the amount (or number) of resources for the frequency axis in which the LR-PUCCH is transmitted. For example, if a PUCCH is transmitted in a 1-RB unit as in the legacy system, a 6-length computer-generated base sequence may be used in a DMRS region. In this case, the DMRS region to which the 6-length computer-generated base sequence is applied may be the fourth symbol of FIG. 39(*b*) (a symbol corresponding to an overlap region in FIG. 39(*a*)).

In contrast, if 1 RB is transmitted in a region (e.g., the third symbol of FIG. 39(*b*)) not overlapping the region of the LR-PUCCH transmitted in a neighbor TTI, a terminal may transmit a PUCCH by applying a 12-length computer-generated base sequence to the DMRS region.

Unlike in FIG. 39, if a PUCCH is transmitted using 2 RBs, a terminal may extend the structure of FIG. 39(*b*) to the case of 2 RBs, and may transmit a PUCCH by applying the 12-length computer-generated base sequence to the DMRS region.

As shown in FIG. 39, in addition to the case where a TTI includes 4 symbols, in various embodiments of the present invention, a terminal may transmit LR-PUCCHs configured with multiple symbols lengths based on the 1 slot (7 symbols) unit of a legacy terminal.

FIG. 40 illustrates other examples of a PUCCH structure using a DMRS comb structure to which the present invention may be applied. FIG. 40 is only for convenience of description, and does not limit the scope of the present invention. Referring to FIG. 40, a DMRS is transmitted using all of subcarriers within a symbol.

Referring to FIG. 40(a), a terminal can avoid a case where a symbol overlaps between LR-PUCCHs transmitted in respective TTIs by differently transmitting the lengths of the LR-PUCCHs in 4 symbols and 3 symbols.

Furthermore, referring to FIG. 40(b), a terminal may transmit LR-PUCCHs with some symbol (the fourth symbol in FIG. 40(b)) empty other than symbols in which the LR-PUCCHs are transmitted.

In this case, the terminal may transmit a DMRS using all of subcarriers within a comb structure and/or symbol. In the case, multiplexing between terminals may be performed using a computer-generated base sequence.

Furthermore, in various embodiments of the present invention, the length (transmission unit) of an LR-PUCCH to which the structure is applied may be extended to various symbol units.

In the description of FIG. 38, the comb structure for the aforementioned PUCCH takes into consideration a TTI of one symbol unit. However, in various embodiments of the present invention, the comb structure of a multi-symbol unit TTI (e.g., 2 symbols or 3 symbols) may be taken into consideration.

FIG. 41 illustrates examples of a PUCCH structure having a comb structure in which a multi-symbol unit TTI is taken into consideration, to which the present invention may be applied. FIG. 41 is only for convenience of description, and does not limit the scope of the present invention.

FIG. 41(a) illustrates an example of a PUCCH structure having a comb structure of a 2-symbol unit TTI for transmitting multiple bits. In this case, two terminals may be multiplexed over 2 symbols.

For example, for multiplexing between terminals, a 2-length Walsh sequence is applied (or used) to a region for transmitting data. Furthermore, in the case of a region for transmitting a DMRS, a length-4 sequence (e.g., a length-4 Zadoff-Chu sequence or a 4-length computer generated sequence) may be divided into the DMRS regions of FIG. 41(a) and transmitted. In this case, the length-4 sequence may be mapped to 4 DMRS regions (4 REs) using CS indices. In other words, a terminal may apply the length-4 sequence to the 4 DMRS regions, and may perform multiplexing between terminals by applying a CS corresponding to a CS index to the applied sequence.

In this case, an eNB may transmit information on the aforementioned configuration to the terminal through higher layer signaling.

Furthermore, FIG. 41(b) illustrates an example of a PUCCH structure configured as a comb structure of a 3-symbol unit TTI for transmitting multiple bits. In this case, three terminals may be multiplexed over the three symbols.

For example, for multiplexing between terminals, a 3-length DFT sequence is applied to the region for transmitting data. Furthermore, in the case of the region for transmitting a DMRS, a length-6 sequence (e.g., a length-6 Zadoff-Chu sequence or a 6-length computer-generated sequence) may be divided into DMRS regions and transmitted. In this case, the length-6 sequence may be mapped to the 6 DMRS regions (6 REs) using CS indices. In other words, a terminal may apply the length-6 sequence to the 6 DMRS regions, and may perform multiplexing between terminals by applying CS corresponding to the CS indices to the applied sequence. In this case, the sequence applied to the DMRS may be divided into multiple symbols and transmitted.

In this case, an eNB may transmit information on the aforementioned configuration to the terminal through higher layer signaling.

Furthermore, in addition to the method of dividing a sequence of a specific length into multiple symbols with respect to the region for transmitting a DMRS in the aforementioned structure and transmitting the sequence, a method of allocating a shift value indicative of a DMRS transmission position for each terminal and transmitting the DMRS in one symbol only for each terminal may be taken into consideration. In other words, a method of multiplexing terminals at the transmission position of a DMRS may be taken into consideration. For example, in the case of FIG. 41(a), if a shift value indicative of a DMRS transmission position for each user is allocated, one terminal transmits a DMRS in a first symbol only and the other terminal may transmit a DMRS in a second symbol only and vice versa.

Furthermore, in addition to the structure of FIG. 41, a specific symbol may be set as a DMRS transmission symbol, and a DMRS region may be divided based on FDM within a corresponding symbol. A terminal may transmit a DMRS to a corresponding position with reference to a shift value.

In this case, an eNB may transmit information on the aforementioned configuration to the terminal through higher layer signaling.

Frequency Hopping of PUCCH in Short TTI

In order to achieve a frequency diversity effect if a PUCCH is transmitted in the LR system, a structure in which a frequency is hopped in a slot unit may be taken into consideration. In this case, if the multiplexing of an LR terminal and a legacy terminal is taken into consideration, a method of applying frequency hopping in a slot unit (7 symbols) may be taken into consideration.

However, if multiplexing with a legacy terminal is not taken into consideration, a new frequency hopping structure for a PUCCH for multiplexing between LR terminals may need to be defined. In this case, the new frequency hopping structure may also be applied to a case where multiplexing with a legacy terminal is taken into consideration.

The new frequency hopping structure for an LR-PUCCH which may be applied to various embodiments of the present invention is described below.

FIG. 42 illustrates an example of a PUCCH structure of a 4-symbol TTI and a frequency hopping structure for the PUCCH, to which the present invention may be applied. FIG. 42 is only for convenience of description, and does not limit the scope of the present invention.

Referring to FIG. 42, a scheme for dividing a TTI by half if the TTI is an even-numbered symbol unit (or a TTI including even-numbered symbols) and performing frequency hopping in a slot unit may be taken into consideration.

In this case, as in FIG. 42(a), a terminal may configure a symbol for transmitting ACK/NACK, UCI or data and a symbol for transmitting a DMRS every other symbol, and may transmit PUCCHs.

If frequency hopping is performed on the PUCCH structure, such as FIG. 42(a), half of the region in which ACK/NACK is transmitted and half of a DMRS region for channel estimation may be disposed within a PUCCH as in FIG. 42(*b*). In this case, the positions and/or number of the region for transmitting a DMRS may vary.

FIG. 43 illustrates an example of a frequency hopping structure when a PUCCH is transmitted in a 1-symbol TTI and a 2-symbol TTI, to which the present invention may be applied. FIG. 43 is only for convenience of description, and does not limit the scope of the present invention.

Referring to FIG. 43, if a PUCCH is configured based on a 1-symbol TTI and a 2-symbol TTI, a terminal may use the comb structure of FIG. 38 for channel estimation.

If a TTI includes one symbol, as in FIG. 43(*a*), a user may transmit a PUCCH in two regions (two regions divided based on the frequency). This may be similar to a discontiguous UL transmission method.

If a TTI includes 2 symbols, as in FIG. 43(*b*), a user may transmit a PUCCH using one symbol per slot.

In various embodiments of the present invention, in the case of a PUCCH structure in which transmission is performed based on a base sequence, a region for transmitting a DMRS and a region for transmitting data do not need to be divided. In other words, in the case of an LR-PUCCH structure in which transmission is performed based on a base sequence, a symbol for transmitting a DMRS and a symbol for transmitting data do not need to be separately configured in the time. Accordingly, a PUCCH may be transmitted by applying a method using a base sequence to the structure such as FIG. 43.

In this case, when slot hopping is performed, a CS index may be differently set in a region included in each slot. In other words, a CS index allocated to a region included in a first slot and a CS index allocated to a region included in a second slot may be set as different values.

FIG. 44 illustrates an example of frequency hopping when a PUCCH is transmitted using a 2-symbol TTI based on a base sequence, to which the present invention may be applied. FIG. 44 is only for convenience of description, and does not limit the scope of the present invention.

Referring to FIG. 44, if a TTI includes 2 symbols, a transmission method based on a base sequence may be applied to the structure of FIG. 43 and a different CS index may be applied for each slot.

In this case, as in the aforementioned method using a base sequence, a multiplexing method between terminals using CS indices may be performed. Furthermore, the aforementioned methods for ACK/NACK information and/or SR transmission may be applied to the structure.

Furthermore, since the structure may be configured in one symbol unit on the time axis, it can be applied to a case where a PUCCH is transmitted through frequency hopping in a TTI including multiple symbols. In this case, the structure may be applied to a case where a PUCCH is transmitted through frequency hopping in a TTI including multiple odd-numbered symbols.

FIG. 45 illustrates an example of PUCCH transmission to which frequency hopping has been applied in a TTI including odd-numbered symbols, to which the present invention may be applied. FIG. 45 is only for convenience of description, and does not limit the scope of the present invention.

Referring to FIG. 45(*a*), if a TTI includes 3 symbols, a terminal may transmit a PUCCH using one symbol in a slot 0 and using two symbols in a slot 1. In this case, for channel estimation in the slot 0 using one symbol, the terminal may transmit the PUCCH using a comb structure unlike in the slot 1.

Referring to FIG. 45(*b*), if a TTI includes 7 symbols, a terminal may transmit a PUCCH using a different number of symbols in each slot. For example, a terminal may transmit a PUCCH using 3 symbols in a slot 0 and using 4 symbols in a slot 1.

As in the examples, if a PUCCH is transmitted through frequency hopping in a TTI including multiple odd-numbered symbols, an eNB may transmit information on a CS index, a PUCCH resource index and/or an offset to be used for PUCCH transmission to a terminal through a higher layer signal.

Furthermore, in various embodiments of the present invention, an eNB may determine whether or not to apply the frequency hopping operation used to transmit a PUCCH according to circumstances. In other words, an eNB may determine whether or not to apply the frequency hopping operation to PUCCH transmission based on a communication network environment. For example, if the number of terminals that have accessed an eNB is many, the eNB may operate in such a way as to increase multiplexing capability by applying OCC without applying frequency hopping. For another example, if the number of terminals that have accessed an eNB is small, an eNB may operate in such a way as to apply frequency hopping.

In this case, the eNB may transmit a configuration regarding whether or not to apply the frequency hopping operation to a terminal through higher layer signaling and/or DCI. Furthermore, the eNB may transmit a configuration regarding whether or not to apply the frequency hopping operation to the terminal using an implicit method. For example, the eNB may implicitly transmit the configuration regarding whether or not to apply the frequency hopping operation to the terminal using a function of a CCE index.

Furthermore, in various embodiments of the present invention, in the case of the configuration of FIG. 45(*b*), a TTI structure to which frequency hopping has been applied (or a PUCCH structure to which frequency hopping has been applied) and a shorter TTI structure to which frequency hopping has not been applied (or a PUCCH structure of a shorter transmission unit on the time axis to which frequency hopping has been applied) may coexist.

FIG. 46 illustrates examples of multiplexing between a PUCCH structure to which frequency hopping has been applied and a PUCCH structure to which frequency hopping has not been applied, to which the present invention may be applied. FIG. 46 is only for convenience of description, and does not limit the scope of the present invention.

Referring to FIG. 46(*a*), a structure in which a frequency-hopped TTI is 7 symbols (or a frequency-hopped PUCCH structure when a TTI includes 7 symbols) and a structure in which a not-frequency-hopped TTI includes 3 symbols (or a not-frequency-hopped PUCCH structure when a TTI includes 3 symbols) may coexist. In this case, OCC cannot be applied to a DMRS region. Terminals may be multiplexed as many as the number of CS indices. In this case, a PUCCH transmitted in each slot as a structure in which TTI includes 3 symbols may have been transmitted by the same terminal or may have been transmitted by different terminals.

Referring to FIG. 46(*b*), a terminal may transmit a not-frequency-hopped PUCCH in a slot 0 when a TTI includes 3 symbols, and may transmit a not-frequency-hopped PUCCH in a slot 1 when a TTI includes 4 symbols. Accordingly, not-frequency-hopped PUCCHs may be multiplexed with a frequency-hopped PUCCH in a slot unit transmitted when a TTI is 7 symbols. In this case, the multiplexing capability of users can be improved by applying OCC (length-2 OCC) of a length 2 to a DMRS region and a data region with respect to terminals having a TTI of 4 symbols.

In the embodiments of the present invention, for multiplexing between PUCCHs transmitted using different TTIs, an eNB may transmit information on a CS index, a PUCCH resource index and/or an offset to be use for the multiplexing to terminals using different TTIs through a higher layer signal.

In various embodiments of the present invention, a method of transmitting an uplink control channel of a system may be configured by mixing the described methods.

For example, an eNB (or a higher network node or a terminal) may select one of a PUCCH transmission method configured as a DMRS symbol (or a symbol for transmitting a DMRS) and a data symbol (or a symbol for transmitting data) and a PUCCH transmission method using a base sequence so that the method is configurable according to circumstances in a system.

More specifically, in a transmission environment including 2 symbols (or a transmission environment using a TTI including 2 symbols), whether frequency hopping is possible is determined depending on each method. In this case, an eNB (or a higher network node or a terminal) may select a transmission method based on the number of terminals within a system or coverage of a terminal. Accordingly, multiplexing performance or a bit error rate/block error rate (BER/BLER) performance can be improved. In this case, the eNB may transmit a configuration (or information on the configuration) to a terminal through higher layer signaling and/or DCI.

In addition, in various embodiments of the present invention, multiple PUCCH formats may be defined in a system, multiple types of TTI lengths or numerologies may be supported, and transmission through multiple RBs (e.g., 2 RBs) may be supported. In this case, definition for a corresponding indication method may be necessary.

For example, multiple types of TTI lengths and/or numerologies (or a set according to combinations between them and a corresponding PUCCH format and/or RB (e.g., the number of RBs) may be previously configured. In this case, the configuration may be previously defined in a system or an eNB may transmit the configuration to a terminal through higher layer signaling. Furthermore, a method for an eNB to dynamically indicate a combination to be used for transmission within the configuration to a terminal through DCI may be taken into consideration.

Furthermore, PUCCH format may be determined depending on the type of UCI to be transmitted and/or a payload size. In this case, the determination may be previously defined in a system, or an eNB may transmit the determination to a terminal through higher layer signaling. Furthermore, in the state in which a PUCCH format has been determined, a method for an eNB to dynamically transmit a TTI length and/or an RB (e.g., the number of RBs and/or the index) and/or numerology to be used for PUCCH transmission to a terminal may also be taken into consideration.

FIG. 47 illustrates an example of a process for a method for a terminal to transmit uplink information to which the present invention may be applied. FIG. 47 is only for convenience of description, and does not limit the scope of the present invention.

At step S4701, a UE receives information on a CS index configuration indicative of the configuration of a CS index group (or set) from an eNB. In this case, the cyclic shift index group is related to uplink signal transmission. In this case, the UE may receive the information on the CS index configuration from the eNB through higher layer signaling, downlink control information and/or a control channel element.

Furthermore, the CS index group may include one or more CS index groups. In this case, the one or more CS index groups may indicate one of a positive scheduling request and a negative scheduling request. For example, a first CS index group may indicate the positive scheduling request, and the second CS index group may indicate the negative scheduling request. Additionally, the one or more CS index groups may indicate an antenna port in which an uplink signal is transmitted.

Furthermore, each of the one or more CS index groups may include at least one subgroup. In this case, the at least one subgroup may be used to indicate ACK/NACK information. For example, a first CS index subgroup may indicate ACK information, and a second CS index subgroup may indicate NACK information.

Furthermore, the CS index configuration may be used for an uplink control channel of a short TTI that may include symbols less than or equal to 7 symbols.

Furthermore, the information on the CS index configuration may be differently configured for each TTI. For example, a CS index configuration of a TTI including one symbol may be different from a CS index configuration of a TTI including 2 symbols.

At step S4703, the UE may determine a CS index in order to generate a specific uplink signal. In this case, the UE may use the received information on the CS index configuration. More specifically, the UE may determine a CS index corresponding to specific uplink information to be transmitted to the eNB using the received information on the CS index configuration.

In one embodiment, the UE may determine a scheduling request and information on ACK/NACK in order to determine the CS index, and may identify a CS index corresponding to the determined ACK/NACK information.

At step S4705, the UE may generate a specific uplink signal using the determined CS index and a base sequence of a specific length. In this case, the specific uplink signal may indicate ACK/NACK information and scheduling request information. In this case, the number of CS indices used to generate the specific uplink signal may be determined based on a specific length of a base sequence.

Furthermore, the base sequence of a specific length may be a sequence applied to a demodulation reference signal (DMRS).

Furthermore, if the ACK/NACK information includes at least 2 bits, the UE may compress the ACK/NACK information into information of 1 bit by bundling the ACK/NACK information.

At step S4707, the UE may transmit the generated specific uplink signal to the eNB through an uplink control channel.

In various embodiments of the present invention, the uplink signal of a legacy UE and the uplink signal of an LR UE or uplink signals between LR UEs may be multiplexed based on the determined CS and the base sequence of a specific length.

Furthermore, in various embodiments of the present invention, the UE may further receive information on the resource index of the uplink control channel from the eNB. In this case, the UE may transmit the specific uplink signal to the eNB by mapping the specific uplink signal to a resource indicated by the received resource index information.

General Apparatus to which the Present Invention May be Applied

FIG. 48 illustrates an example of the internal block diagram of a wireless communication apparatus to which the present invention may be applied.

Referring to FIG. 48, the wireless communication system includes an eNB 4810 and multiple UEs 4820 disposed within the region of the eNB 4810.

The eNB 4810 includes a processor 4811, a memory 4812, and a radio frequency (RF) unit 4813. The processor 4811 implements the functions, processes and/or methods proposed in FIGS. 1 to 47. The layers of a radio interface protocol may be implemented by the processor 4811. The memory 4812 is connected to the processor 4811 and stores various types of information for driving the processor 4811. The RF unit 4813 is connected to the processor 4811 and transmits and/or receives a radio signal.

The UE 4820 includes a processor 4821, a memory 4822 and an RF unit 4823. The processor 4821 implements the functions, processes and/or methods proposed in FIGS. 1 to 47. The layers of a radio interface protocol may be implemented by the processor 4821. The memory 4822 is connected to the processor 4821 and stores various types of information for driving the processor 4821. The RF unit 4823 is connected to the processor 4821 and transmits and/or receives a radio signal.

The memory 4812, 4822 may be located inside or outside the processor 4811, 4821 and may be connected to the processor 4811, 4821 by various known means.

Furthermore, the eNB 4810 and/or the UE 4820 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The methods for transmitting uplink data in a wireless communication system of this specification have been described based on an example in which they are applied to the 3GPP LTE/LTE-A system, but may be applied to various wireless communication systems, such as a 5G system, in addition to the 3GPP LTE/LTE-A system.

The invention claimed is:

1. A method of transmitting an uplink control channel in a wireless communication system supporting a short transmission time interval, comprising:
   receiving configuration information for transmitting an uplink control channel, through higher layer signaling;
   generating a sequence based on a specific cyclic shift index; and
   transmitting the uplink control channel for transmitting uplink control information, using the generated sequence,
   wherein the uplink control information is indicated based on the specific cyclic shift index,
   wherein the uplink control information includes 1-bit Hybrid Automatic Repeat Request (HARQ)-ACK information or 2-bit HARQ-ACK information,
   wherein, when the uplink control information is the 1-bit HARQ-ACK information, the specific cyclic shift index is one of two pre-configured cyclic shift indices, and
   wherein, when the uplink control information is the 2-bit HARQ-ACK information, the specific cyclic shift index is one of four pre-configured cyclic shift indices.

2. The method of claim 1, wherein the two pre-configured cyclic shift indices are mapped ACK information and NACK information, respectively.

3. The method of claim 1, wherein the four pre-configured cyclic shift indices are mapped {ACK, ACK} information, {ACK, NACK} information, {NACK, ACK} information, and {NACK, NACK} information, respectively.

4. The method of claim 1, wherein the uplink control information further includes control information representing whether scheduling request is present.

5. The method of claim 1, wherein the configuration information for transmitting the uplink control channel includes information for a transmission resource of uplink control channel determined based on a cyclic shift index.

6. A terminal for transmitting an uplink control channel in a wireless communication system supporting a short transmission time interval, comprising:
   a transceiver for transmitting and receiving a radio signal; and
   a processor operatively connected to the transceiver,
   wherein the processor is configured to:
   receive configuration information for transmitting an uplink control channel, through higher layer signaling;
   generate a sequence based on a specific cyclic shift index; and
   transmit the uplink control channel for transmitting uplink control information, using the generated sequence,
   wherein the uplink control information is indicated based on the specific cyclic shift index, wherein the uplink control information includes 1-bit Hybrid Automatic Repeat Request (HARQ)-ACK information or 2-bit HARQ-ACK information, wherein, when the uplink control information is the 1-bit HARQ-ACK information, the specific cyclic shift index is one of two pre-configured cyclic shift indices, and wherein, when the uplink control information is the 2-bit HARQ-ACK information, the specific cyclic shift index is one of four pre-configured cyclic shift indices.

7. The terminal of claim 6, wherein the two pre-configured cyclic shift indices are mapped ACK information and NACK information, respectively.

8. The terminal of claim 6, wherein the four pre-configured cyclic shift indices are mapped {ACK, ACK} information, {ACK, NACK} information, {NACK, ACK} information, and {NACK, NACK} information, respectively.

9. The terminal of claim 6, wherein the uplink control information further includes control information indicating whether scheduling request is present.

* * * * *